US012433693B2

(12) United States Patent
Schmitz et al.

(10) Patent No.: US 12,433,693 B2
(45) Date of Patent: Oct. 7, 2025

(54) ROTARY AND LINEAR ACTUATED ROBOTIC CATHETER STEERING SYSTEM

(71) Applicants: Gregory P. Schmitz, Los Gatos, CA (US); Paul Andrew Doyle, San Jose, CA (US)

(72) Inventors: Gregory P. Schmitz, Los Gatos, CA (US); Paul Andrew Doyle, San Jose, CA (US)

(73) Assignee: SyncRobotix, Inc., Los Gatos, CA (US)

( * ) Notice: Subject to any disclaimer, the term of this patent is extended or adjusted under 35 U.S.C. 154(b) by 0 days.

(21) Appl. No.: 18/887,964

(22) Filed: Sep. 17, 2024

(65) Prior Publication Data

US 2025/0009440 A1    Jan. 9, 2025

Related U.S. Application Data

(63) Continuation-in-part of application No. 18/634,962, filed on Apr. 14, 2024, now Pat. No. 12,127,805, which is a continuation-in-part of application No. 18/593,893, filed on Mar. 2, 2024, now Pat. No. 12,127,804, which is a continuation-in-part of
(Continued)

(51) Int. Cl.
*A61B 1/00* (2006.01)
*A61B 34/20* (2016.01)
*A61M 25/01* (2006.01)

(52) U.S. Cl.
CPC ......... *A61B 34/20* (2016.02); *A61M 25/0133* (2013.01)

(58) Field of Classification Search
CPC ......... A61B 34/20; A61B 34/30; A61B 34/71; A61B 18/1492; A61B 2034/301; A61B 2034/303; A61B 2034/715; A61B 1/0057; A61B 1/01; A61B 1/0051; A61B 1/00071; A61B 1/05; A61B 1/00156; A61B 1/005–01; A61B 1/00112;
(Continued)

(56) References Cited

U.S. PATENT DOCUMENTS 7,074,179 B2 * 7/2006 Wang ..................... A61B 34/37
414/2
11,033,342 B2   6/2021  Schmitz
(Continued)

*Primary Examiner* — Anh Tuan T Nguyen
*Assistant Examiner* — James Edward Boice
(74) *Attorney, Agent, or Firm* — Stephen E. Zweig

(57) ABSTRACT

A catheter driving system is configured to navigate various medical catheters through complex narrow tissue openings or between organs and tissue planes, which may include lung bronchi pathway openings of 3 millimeters or less. These catheters may comprise one or more sections and optional steering cables. The catheter driving device comprises at least one rotary actuator configured to rotate at least one region of the catheter and at least one steering cable actuator configured to apply flexing force to control the direction of the catheter. To prevent the rotary actuator from tangling the steering cables, the system is further configured to rotate at least one steering cable along with the rotation of the rotated catheter region. This cable rotation may be 1:1 (e.g., synchronously) with the catheter rotation or may be configured to vary somewhat to accommodate catheter twisting, spring action, windup, and other effects.

22 Claims, 54 Drawing Sheets

Related U.S. Application Data application No. 18/422,454, filed on Jan. 25, 2024, now Pat. No. 12,127,737, which is a continuation-in-part of application No. 18/324,493, filed on May 26, 2023, now Pat. No. 11,950,765.

(60) Provisional application No. 63/679,382, filed on Aug. 5, 2024, provisional application No. 63/618,832, filed on Jan. 8, 2024, provisional application No. 63/603,757, filed on Nov. 29, 2023, provisional application No. 63/499,218, filed on Apr. 29, 2023.

(58) Field of Classification Search
CPC ........... A61B 2562/00318; A61B 2017/00318; A61B 8/42; A61M 25/0133
USPC ............... 600/424, 130, 149, 146, 137, 114; 604/264; 606/130
See application file for complete search history.

(56) References Cited

U.S. PATENT DOCUMENTS

| | | | |
|---|---|---|---|
| 2008/0045859 A1* | 2/2008 | Fritsch | A61B 18/148 600/567 |
| 2011/0319708 A1* | 12/2011 | Shapiro | A61B 1/00133 600/104 |
| 2014/0165772 A1* | 6/2014 | Okazaki | A61B 1/0052 74/490.04 |
| 2016/0150945 A1* | 6/2016 | Okamoto | A61B 1/00101 600/114 |
| 2017/0042412 A1* | 2/2017 | Takemoto | H04N 23/56 |
| 2017/0065365 A1* | 3/2017 | Schuh | A61B 90/50 |
| 2019/0046009 A1 | 2/2019 | Wood et al. | |
| 2019/0246873 A1* | 8/2019 | Lu | A61B 1/0623 |
| 2019/0320874 A1* | 10/2019 | Yu | A61B 1/00006 |
| 2020/0253670 A1 | 8/2020 | Doisneau et al. | |
| 2021/0022816 A1 | 1/2021 | DeBuys et al. | |
| 2021/0100627 A1 | 4/2021 | Soper et al. | |
| 2021/0137620 A1 | 5/2021 | Wallace et al. | |
| 2021/0282624 A1* | 9/2021 | Nichols | A61B 1/0057 |
| 2022/0087755 A1 | 3/2022 | Romo et al. | |
| 2022/0273189 A1* | 9/2022 | Knutson | A61B 10/04 |
| 2022/0304550 A1 | 9/2022 | Romo et al. | |
| 2022/0313375 A1 | 10/2022 | Zhang et al. | |
| 2022/0355075 A1* | 11/2022 | Simaan | A61M 25/0133 |
| 2023/0338103 A1* | 10/2023 | Witte | A61B 34/30 |

\* cited by examiner

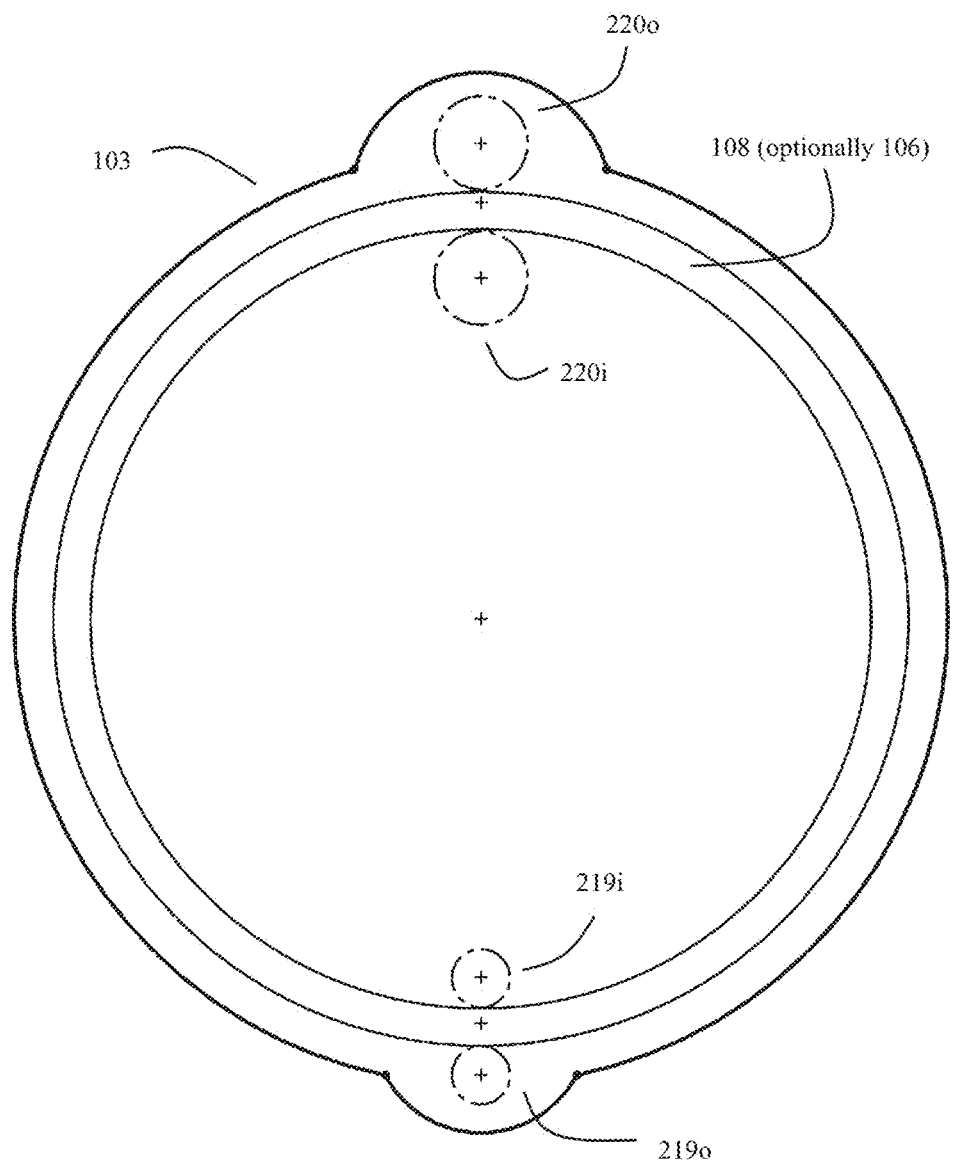

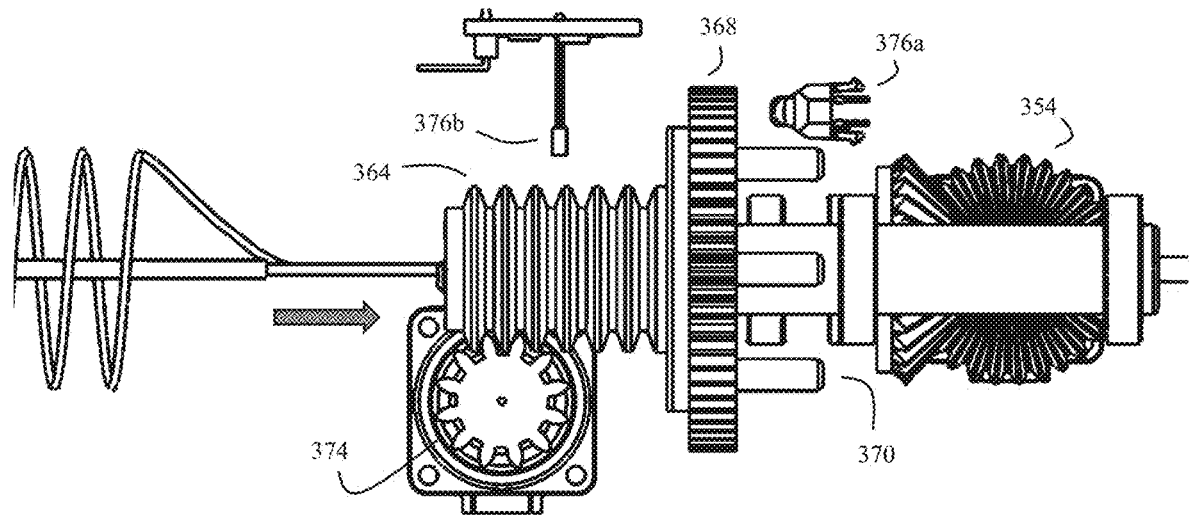
Fig. 27
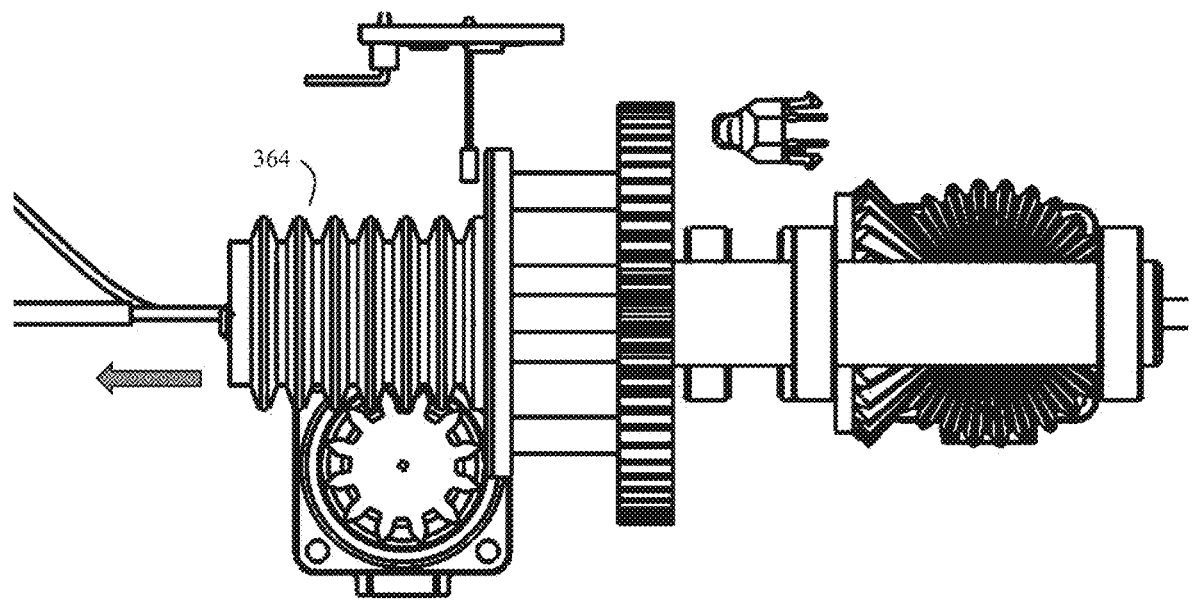

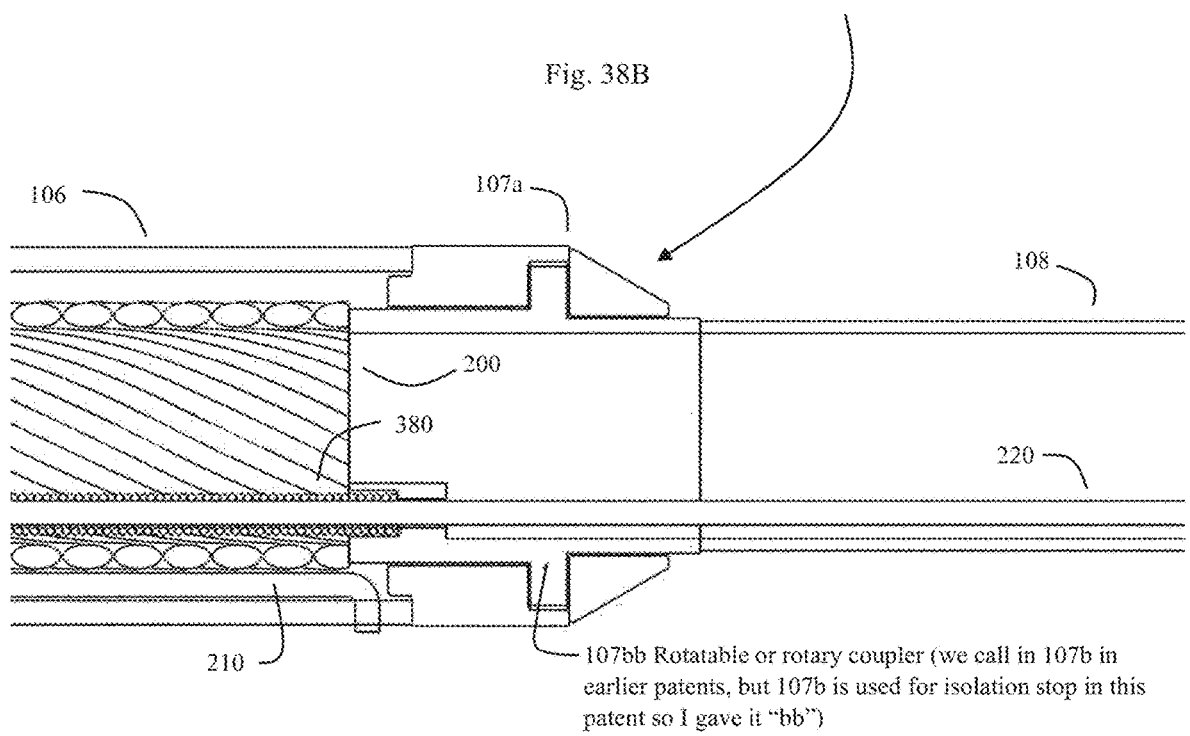

Fig. 39
| Cable/Wire Locations | Single Stage Catheter |
|---|---|
| Interior | 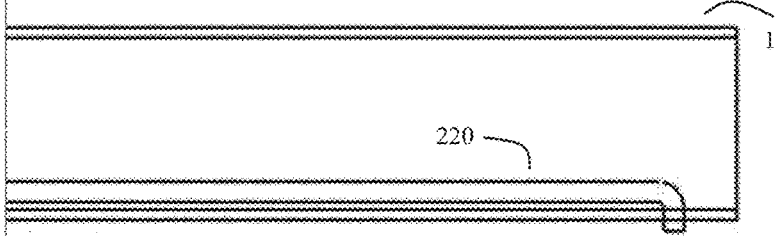 |
| Exterior | 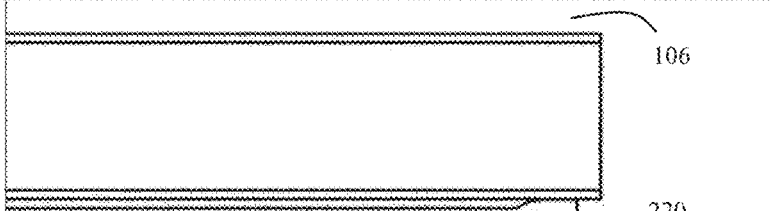 |
| Tool Plate | 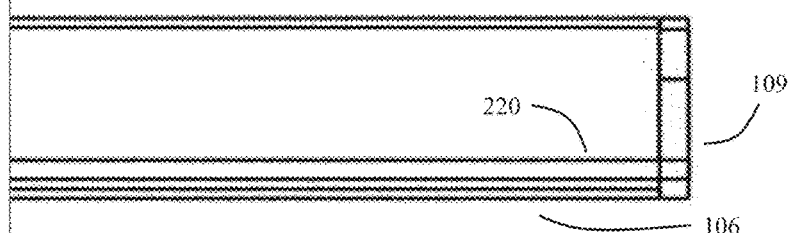 |

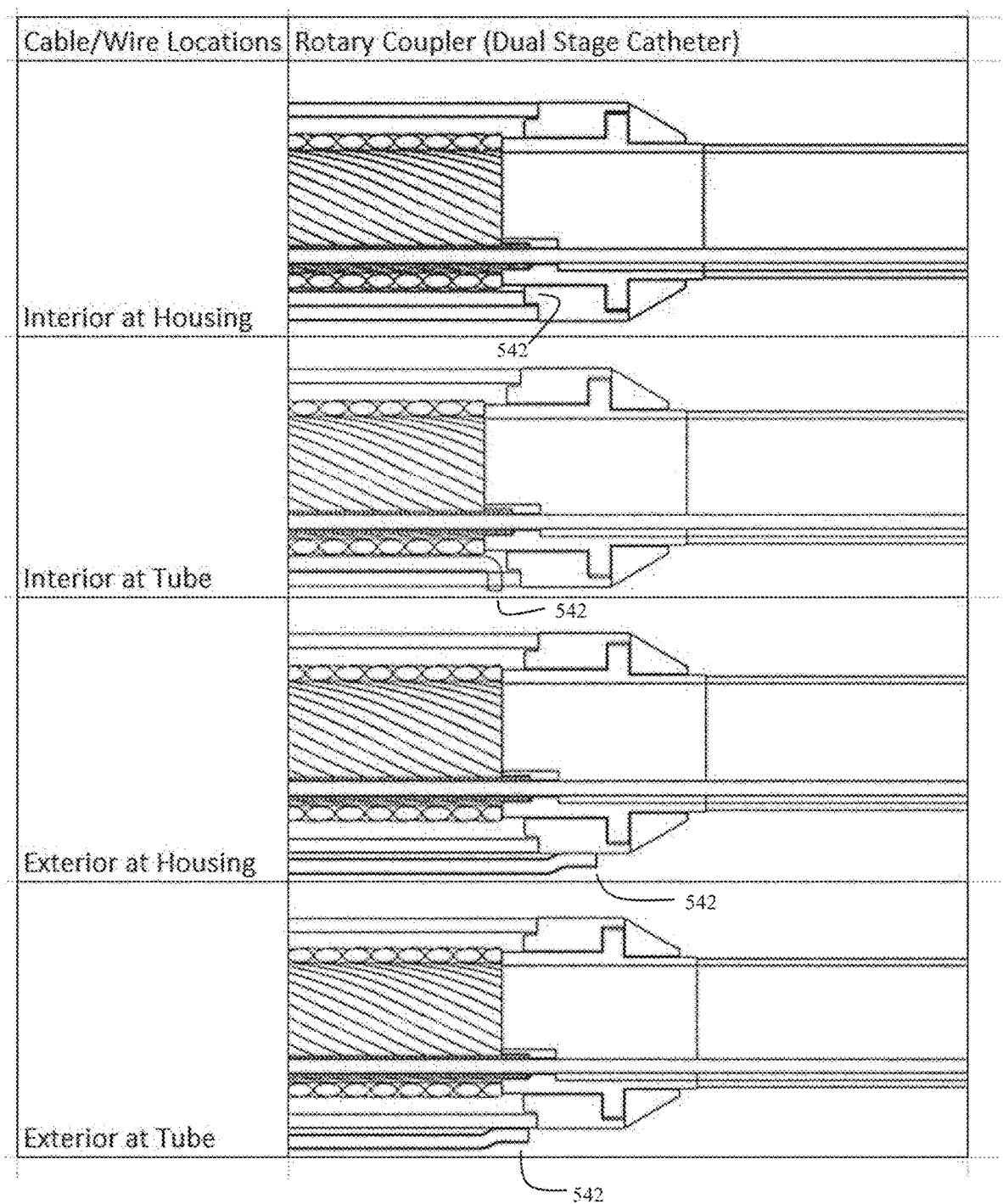

Fig. 42
| Types | Tips |
|---|---|
| Open |  |
| Open Rounded Edge |  |
| Open Ring Rounded Edge |  |
| Tool Plate with Ports |  |
| Round Closed or with Ports | 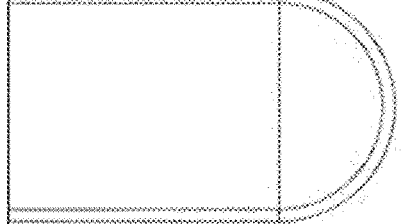 |
| Point Closed or with Ports | 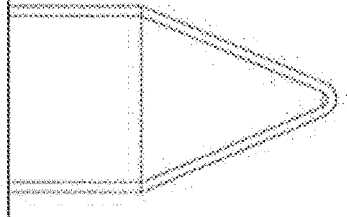 |

ROTARY AND LINEAR ACTUATED ROBOTIC CATHETER STEERING SYSTEM

CROSS-REFERENCE TO RELATED APPLICATIONS

This application claims the priority benefit of U.S. provisional patent application 63/679,382, filed Aug. 5, 2024; This application is also a continuation in part of U.S. patent application Ser. No. 18/634,962, filed Apr. 14, 2024; application Ser. No. 18/634,962 was a continuation in part of U.S. patent application Ser. No. 18/593,893, filed Mar. 2, 2024; application Ser. No. 18/593,893 was a continuation in part of U.S. patent application Ser. No. 18/422,454, filed Jan. 25, 2024; application Ser. No. 18/422,454 was a continuation in part of U.S. patent application Ser. No. 18/324,493, filed May 26, 2023; application Ser. No. 18/422,454 also claimed the priority benefit of U.S. provisional application 63/603,757 filed Nov. 29, 2023, and U.S. provisional application 63/618,832, filed Jan. 8, 2024; application Ser. No. 18/324,493 claimed the priority benefit of U.S. provisional application 63/499,218, filed Apr. 29, 2023. The entire contents of all of these applications are incorporated herein by reference.

BACKGROUND OF THE INVENTION

Field of the Invention

This invention is in the field of robotic surgery, as well as robotic systems and methods for operating surgical catheters and bronchoscopes.

Description of the Related Art

Medical and surgical catheters, and more specialized versions of such catheters, such as bronchoscopes, are medical devices commonly used for medical diagnosis and treatment. Such "snake-like" devices are designed to traverse various body lumens, such as arteries, veins, portions of the urinary, gastrointestinal, and reproductive systems, and various portions of the respiratory system and lungs. These devices are frequently used for other surgical applications as well.

Some medical devices are formed from long continuous tubes, often from medical-grade polymers. Other such devices may comprise articulated sections formed from a plurality of smaller components often linked together by flexible joints. Such articulated devices themselves may often then be covered with an optional flexible medical plastic grade polymer as well.

Some of these medical devices are intended for direct manipulation by the surgeon or other healthcare professional. Other such devices may also have various motorized, processor-controlled, and even robotically driven accessories. These are often used for greater precision and control.

Examples of such devices include various US patents and patent applications, such as Wallace, US20210137620 A1; Romo, US20220087755 A1 and US20220304550 A1; Zhang US US20220313375A1; Souper US20210100627 A1; and Schmitz, U.S. Pat. No. 11,033,342 B2.

Other prior art techniques include electroporation. Electroporation is an energy modality of pulsed electric fields in micro and nanosecond domains that, if delivered through a micro-bronchoscope, could be used to deliver genes for immune response, initiate necrosis, or initiate an immunogenic response.

Despite these advances, further advances in this art would be desirable.

BRIEF SUMMARY OF THE INVENTION

This application is focused on an improved drive system for actuated rotation and steering of a single or multi-stage catheter where a cable (also known as the steering cable or wire) is rotated along (often synchronously) with the catheter for any such actuated rotation.

Although the systems and methods disclosed herein can be used for many different (human) medical and veterinary (e.g., animal health) purposes, the present invention was initially inspired, in part, by a consideration of difficult-to-treat lung diseases and the inadequacies of prior art manual and robotic bronchoscopes.

Thus, this disclosure will discuss both the structure of the lungs and the utility of these improved methods for lung disease in some detail. Note, however, that this extensive discussion of lung structure and improved bronchoscopes is not intended to be limiting. The improved medical drive devices disclosed herein may be used for a wide variety of medical and veterinary diagnostic and surgical purposes.

About the Structure of the Lung and the Limitations of Prior Art Bronchoscopes

The bronchus of the lungs can be viewed as following a natural Fibonacci pattern of a typical tree where the branches divide and reduce in size as they get further out for the main trunk or, in this case, the Trachea. FIG. 1, which shows the lung bronchus system, shows the size reduction of the bronchial tree as the air moves from the larynx (10), down the Trachea (12), and divides into the Primary Bronchus (14), the Secondary Bronchus (16), the Tertiary Bronchus (18), and lastly the many Bronchiole (20).

The bronchus pathways reduce in diameter as the branches move outward and downward away from the Trachea. For example, going from Subsegmental (Tertiary) to Terminal Bronchi (before the Bronchiole), the diameter usually steps down from about 5 mm (millimeter) down to about 1 mm. This results in about a thousand terminal bronchi that are located in the outer third of the lungs (22). Many lung disorders, such as lung tumors, can occur in this region.

Unfortunately, this outer third portion of the lungs (22) is largely inaccessible to prior art bronchoscopes. This is because prior art bronchoscopes, including robotically driven bronchoscopes, typically have a minimum diameter of 3.5 to 4.2 mm. Such devices are also difficult to maneuver through the many twisting of the bronchial tree because such devices have limited flexibility (e.g., limited or large articulation radii).

Prior art bronchoscopes and robotic bronchoscopes have about a 4 mm diameter and an 18-20 mm articulation radius. These prior art bronchoscopes are typically single-stage catheters, often of continuous diameter, which are introduced into the lung with the aid of an introducer sheath. Occasionally, medical practitioners attach a 19-22 gauge (~1 mm) flexible nitinol needle to the distal tip of the bronchoscope and use this wire tip to reach still further into the lungs for lesion biopsy. However, such wire tips have limited flexibility and maneuverability (limited articulation) and are thus often unsatisfactory for this purpose. At a bronchial diameter of 4 mm, there are roughly 50 bronchi that can be accessed with prior art robotic bronchoscopes. As the bronchial diameter reduces to 3 mm, there are approximately 100 bronchi that can be accessed with a 3 mm robotic bronchoscope, if one existed.

Although not limited to small diameter situations, the invention at least initially inspired by the insight that improved bronchoscopes with diameters below 3 mm can provide a 6 to 20-fold greater opportunity to detect and treat currently inaccessible cancerous lesions in the outer third of the lung. So, at 3 mm, we, in effect, have a "biometric transition point" where prior art bronchoscopes fail to proceed further along the ever-smaller diameter lung bronchi.

3 mm diameter bronchoscope could access about 100 currently inaccessible bronchi 2.5 mm diameter bronchoscope could access about 300 currently inaccessible bronchi 1 mm diameter bronchoscope could access about 1000 currently inaccessible bronchi The invention is based on further insight that using prior art flexible needles to extend the range is inadequate because such needles are not actively steerable. Such needles have a high risk of tearing through delicate vascular structures because their trajectory will be approximately a straight path when they exit the prior art bronchoscope.

The invention is also based, in part, on the insight that what is needed is an improved catheter steering device that is capable of driving various types of sophisticated medical catheters, such as the previously described bronchoscope that may have very narrow distal diameters. The described device thus comprises an improved drive system with the ability to drive this improved bronchoscope, or indeed any medical catheter, with higher control and precision. In some embodiments, this improved system may also utilize an introducer sheath.

FIG. 2 shows a close-up of the various lung bronchus and bronchi pathways, showing the path transition points (104) where a second, narrower stage of a two-stage bronchoscope (100) can extend out from a wider first stage (See FIG. 3). The wider first stage (106) can guide the device through the larger diameter bronchus pathways and position the narrower second stage (108) to then proceed further through the ever-narrowing segmental bronchi and into the appropriate bronchiole nearest the target (often a potential lesion or tumor).

The challenges of such an improved device should be appreciated. As shown in FIG. 2, the bronchi branches take many sharp turns. For best performance, the improved bronchoscope device needs to articulate and navigate these ever-smaller diameter paths. Thus again, at the Tertiary or Subsegmental Bronchi (3-6 mm diameter, 18), there are about 38 branches. But when the device is traversed beyond the 3 mm Tertiary branches, there are potentially a thousand or more (1000) branches in the Terminal Bronchi (the outer ⅓rd of the lungs 22). Ideally, the design would allow the operator to articulate or manipulate the tip of the bronchoscope through each branch without punching through or otherwise damaging the delicate vascular structures and/or bronchus walls.

The invention was also inspired, in part, by the insight that such an improved device should be able to do useful work once it reaches its destination. This includes an ability to robotically position useful sensors, such as cameras and lighting systems, obtain tissue biopsies, and administer effective therapy to tissue targets positioned at such difficult-to-reach locations.

As will be discussed, in some embodiments, the invention teaches robotic, processor-controlled systems and methods of flexing and unflexing various portions of a hollow catheter by using tensioning actuators to create and release tension (or the reverse force to tension could be applied to push a wire to cause compression and then release would also flex and unflex) on various catheter steering cables while also rotating these steering cables in a 1:1 ratio with actuator-controlled rotation of different portions of the hollow catheter. This enables the catheter to be driven into hard-to-reach portions of the body while at the same time ensuring that the various steering cables and rotation operations do not interfere with each other.

In some embodiments, the problem to be solved is how to use a rotational actuator to both rotate a medical catheter while also steering the catheter using one or more steering cables. As will be discussed, this requires a drive system configured to rotate the steering cables at roughly the same rate as the rotary actuator rotates the catheter so that the cables don't get tangled up (more importantly the predictability of the steering direction is maintained).

More specifically, the present invention focuses on systems and methods for keeping the steering cable and steering element rotationally synchronized with the catheter. This enables improved automated or manual control of the rotation of the steering vector as the catheter is inserted into the body and maneuvered or steered to the target.

The combination of rotation and steering provides a two degree of freedom system for each catheter stage that allows the catheter to navigate any branch or curve in a passageway in the body. This minimizes the number of cables controlling the catheter, reducing the diameter, increasing the inside cross-sectional area for tools/therapy devices, and allowing for a more flexible system with tighter radius of curvature, ultimately allowing greater access to previously unreachable sites with current methods.

Another way to analyze the problem is by considering the catheter's ID (inner diameter)/OD (outer diameter) ratio. Catheters are often steered by placing various steering materials (such as rods, cables, coils, and the like) inside the catheter. These steering materials tend to clutter up the interior of the catheter, thus reducing the catheter's ID. To shrink or reduce the diameter of the catheter, it is often desirable to reduce the amount of these steering materials, to increase the ID and thus the cross-sectional area. The ID/OD ratio would be 1 in the theoretically ideal catheter. This can't be fully realized, of course, but a useful design goal is to try to approach an ID/OD ratio of 1 or to use this ID/OD ratio as a metric for improving catheter performance. With a minimized OD and a maximized ID, the described device is smaller and more agile with a larger internal cross-sectional area for delivering therapy to sites, imaging, taking tissue samples from sites, or excising tissue from targeted sites. This architecture can be built in series, adding additional combinations of degrees of freedom as necessary.

The rotational actuator rotates the steering mechanism or actuator synchronously with the steering cable and the catheter along the length of the catheter up to the cable attachment point at the far distal portion of the catheter.

Even more specifically, the present invention focuses on a catheter steering device (such as FIG. 30-342) configured to direct an attached catheter (106 or 108 either individually or together) to traverse internal body passages. This catheter steering device generally comprises at least one rotary actuator (FIG. 22B, 350*r*1) and at least one steering cable actuator (FIG. 22B, 350*f*1).

This catheter steering device is configured to couple to a catheter (FIG. 30) (which may have one or more stages comprising a proximal (FIG. 30-106) and distal region (FIG. 30-108). Here, the proximal region is defined as the portion of the catheter that interfaces with the catheter steering device (outside of the patient's body), and the distal portion is defined as the other side, the "far end" of the catheter that enters the patient's body (usually for a medically useful purpose). The proximal region (FIG. 30-106) and distal region (FIG. 30-108) can be constructed from a continuous section for multiple sections.

The device has at least one steering cable actuator (FIG. 22B-350/1) configured to couple to at least one steering cable (e.g., FIG. 13-210 and/or FIG. 13-220; FIG. 14). In some embodiments, this steering cable may be a part of the catheter steering device, and the drive's steering cable can be attached to the catheter. However, this can cause sterility problems because it is often desirable to reuse the catheter steering device, and sterility may be broken when attaching this type of steering-device-attached steering cable to a presumably sterile catheter. Thus, in a preferred embodiment, the steering cable is part of the catheter and is sterilized along with the catheter.

The catheter steering device is also configured so that, considering the catheter, at least one rotary actuator, at least one steering cable, and at least one steering cable actuator:

A: the rotary actuator is configured to couple to the proximal region of the catheter (e.g., FIG. 23, FIG. 30, FIG. 30A).

B: the rotary actuator is also configured to transmit torque to rotate at least one catheter region (here termed the "rotated catheter region). (e.g. FIG. 30)

C: the steering cable actuator is configured to apply force to the steering cable to induce at least a portion of the catheter to flex and unflex (compare FIG. 28A with FIG. 29A).

The catheter steering device is also configured so that for any rotation caused by the rotary actuator, the rotary actuator is configured to rotate this at least one steering cable and its associated steering cable actuator along with the rotated catheter region (suitable designs include FIG. 25, 26 and FIG. 27 slidable pins 370 coupling a component of the steering cable actuator system 374 with the rotating assembly 368, 366, 354).

Applications: The Robotic Catheter Drive and Steering System disclosed herein is designed to traverse various body lumens, including arteries, veins, urinary, gastrointestinal, and reproductive systems, and various portions of the respiratory system and lungs. Additionally, there is the ability to traverse outside of the natural pathways. An example would be between organs in the abdominal area while maintaining a minimally invasive approach. An application would be passing through the abdominal laparoscopically with an ultra-thin micro-invasive multi-stage catheter with at least one transition housing and a rotary coupler. This application could be for applying a distal anchor to a tumor on the pancreas for biopsy and further delivering therapy.

Various medical applications for this system include but are not limited to, procedures such as biopsies, resection or debriding of tumors, shears, delivery of biologics and medications, neural tumor resections, delivery of embolization coils, lung biopsies, minimal portal access heart bypass, endoscopic submucosal dissection, transurethral procedures (TURP, bladder tumors) prostatectomy, hysterectomy, stem cell delivery, delivery of arthroscopic tools for tools, knee and hip procedures, or for trans nasal procedures (frontal sinus surgery, etc.). Other applications include low, medium, and high energy delivery, electroporation for drug delivery, or changing cellular structure applications.

BRIEF DESCRIPTION OF THE DRAWINGS

FIG. 5C shows a cross-section of an alternate embodiment of a suitable catheter employing an optional polymer jacket with spring/elastic-return features configured to oppose the force exerted by the tensioning cable(s).

FIG. 26 shows one extreme position of the device's linear circular gear rack.

FIG. 27 shows a different extreme position of the device's linear circular gear rack.

FIG. 38A shows an example of various catheter types that may be used in this system.

FIG. 38B shows a detail of the rotary coupler that may be used in certain types of catheters.

FIG. 39 shows various ways that a tensioning/steering cable/wire can be attached to at the far distal location of the catheter.

FIG. 40 shows some of the various ways that the proximal stage steering wire/cable (210) can be attached to a dual-stage catheter.

FIG. 42 shows an example of various types of catheter distal tips.

DETAILED DESCRIPTION OF THE INVENTION

Figure 1:
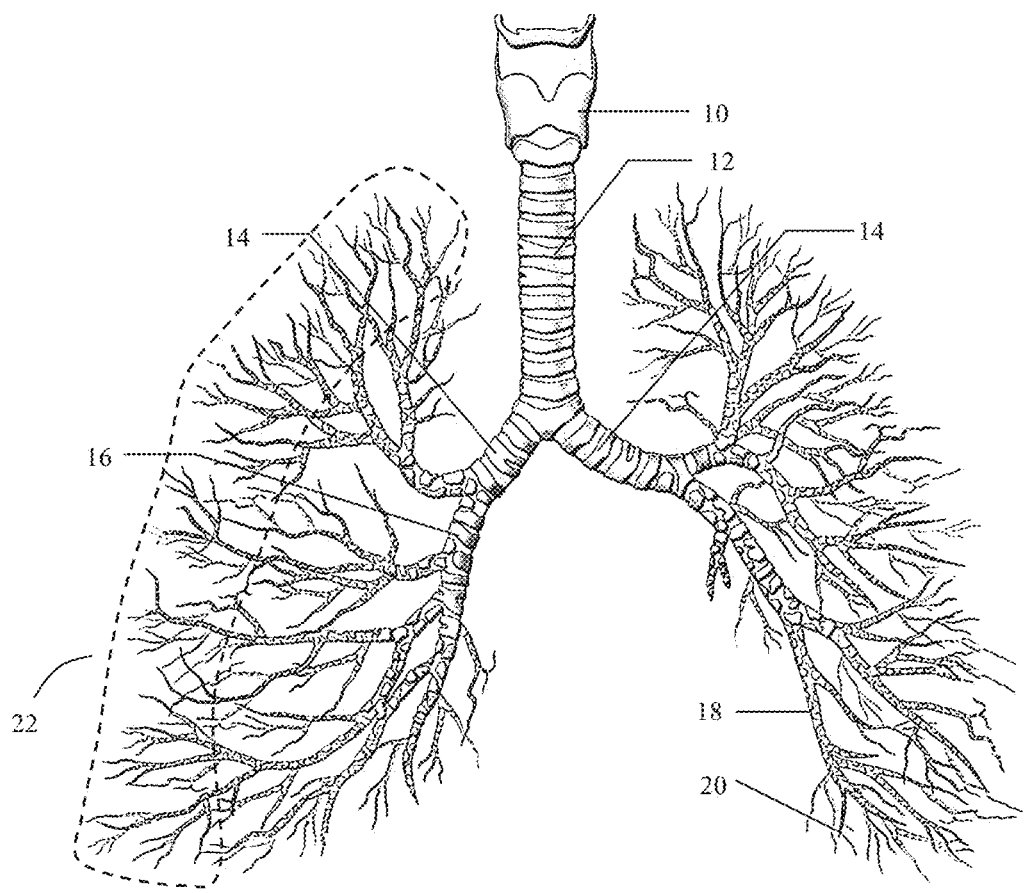
FIG. 1 shows the lung bronchus system.

Definitions: Unless superseded by a later or alternate definition, the following terminology will generally apply.

Actuator: a device or set of components and parts that provide motion powered by any type of power source, including air or fluid pressure differential, electricity, magnetism, or gravity.

Steering Cable Actuator: The actuator(s) that applies force to the steering cable(s), regardless of the details of the actuator construction. This force is generally directed along the axis of the steering cable.

Rotary actuator: The actuator(s) that apply rotary force (such as torque) to at least a portion of the catheter, regardless of the details of the actuator construction.

Synchronous motion: 1:1 motion by design, but not necessarily exactly 1:1. Synchronous motion may employ techniques of leading, lagging, or moving in proportion with another device or component, especially to help compensate for wind up of the thin flexible elements used to maximize the steering angle precision over the entire catheter length to the distal tip.

Along (in a non-rotary sense): The actuation can be located relative to the rotating drive body shaft or the catheter in any of the following scenarios, side-by-side, inline, concentric, offset non-concentric, parallel, or at an angle to the axis of rotation.

Along with: (rotary sense): To have two more elements rotate together synchronously such that their rotational offset from one another while being rotated is not substantially out of phase.

Force: a tensile or compressive force applied to pulling or pushing a cable or wire.

Steering: a force applied along the axis of a catheter resulting in a curling motion of a section of the catheter.

Steering element: a component of the steering actuation portion that pulls or pushes a wire or cable to induce a force in the catheter that causes it to flex, bend or curve.

Steering cable or wire: a thin flexible element intended to transmit steering force, either compressive or tensile. This element could be single strand or multi stranded and made of any material sufficiently strong and flexible to transmit the required force.

Steering Cable Location: The steering cable can be in the interior of the catheter, either concentrically or eccentrically to the axis of the catheter and or the axis of rotation, or can be captured on the exterior of the catheter body (also eccentric to the axis of catheter/ rotation) using a cable/wire channel (sheath or isolation coil) underneath or inside of a jacket that covers the entire catheter body.

Rotation: torque as applied to the body of the driveshaft or the entire catheter to cause rotation of the intended section of catheter Contact Drive: This type of drive system transmits force or torque through direct contact, such as gears, shafts, splines, screw or helical drive, etc. The contact can be off-axis or inline with the axis of rotation.

Non-Contact Drive: This type of drive system transmits force or torque to the component being acted on through an invisible force, most commonly electromagnetic fields, though other invisible methods could be employed. Non-contact can be off-axis or in-line with the axis of rotation.

Contact Coupler: A slidable drive coupler using pins, splines, bellows, keys, square, hex, octagonal, etc. (not limited to). and is slidable towards or away from the rotary drive portion.

Non-Contact Coupler: A slidable drive coupler using magnetic coupling either active or passive. Therefore, there is an invisible magnetic field keeping the two drive sections synchronous with one another.

Electronic Non-Contact Coupling: At least two or more actuators, e.g. one for the rotation of the catheter, and one for flexing the distal portion of the catheter wherein the flexing actuator is electronically synchronized to the rotary actuator. An additional actuator that is also electronically geared to the other two actuators can be used to rotate the proximal steering cable position relative to the position of the distal steering cable attachment and or either of the two other actuators.

Slidable along or near the axis of rotation: Where one or more actuators are rotationally constrained along the proximal rotation axis defined by the drive system, wherein axial movement of an actuator or component is free to slide along or near the axis.

Actuator System: a device that causes or drives linear or rotary motion by means of electro-magnetic, air or fluid pressure differential, vacuum, or gravity input via some external control.

Combination Actuator or Combined-Mode Actuator: a device wherein rotary and linear actuation is integrated together. Under process control, a solenoid or simple actuator could be used for shifting the power output of one process-controlled high-precession actuator. The intermittent shifting of actuation between rotational or linear output maintains an approximate 1:1: ratio between the distal stage steering cable and any rotation of the torque shaft/catheter via coupling. The combination actuator may comprise multiple mechanisms to create a slidable mechanical switch between applying power to the linear or rotary movement to pull or push the steering cable or wire or to rotate a catheter. These include but are not limited to the following off-axis or inline mechanisms for transmitting linear motion from a power source to the steering cable: bevel, spur, straight cut, or helical gears, belt and pulley drive, cogged belt drive, tape drive, direct friction drive between two wheels, etc.

A Combination Steering Cable Actuator: A Combination Actuator or Combined-Mode Actuator switched to control the steering cable.

Combination Rotary Actuator: A Combination Actuator or Combined-Mode Actuator switched to control the rotation of the catheter.

Dual Actuator System: At least 2 or more actuators, each have a linear and rotary actuator typically used for actuating a Dual Stage Catheter or two more catheters joined by transition housings and rotary couplers.

Telescoping Actuators: Two or more actuators, each have a linear and rotary actuator for driving at least one through hole or hollow catheter and at least one catheter passing through a through hole or hollow catheter.

Multiple Actuator System: Multiple actuators driving multiple catheters separated by transition housings and rotary couplers and or multiple catheters telescoping traversing independently and linearly along a manual or motorized stage.

Axis of Rotation: The proximal location of rotation of the catheter constrained by drive system.

Axis of the Catheter: a theoretical or imaginary line intersecting the center of the catheter. Also known as a neutral axis due to the ever-changing pathway of the flexible type of catheter. At the proximal region, the Axis of the Catheter is projected from the Axis of Rotation.

Rotary Coupler: A component of the Dual Stage Catheter where two elements of this catheter (torque and steerable section) are joined with the coupler in the middle. Further a Transition Housing joins proximal stage to the distal stage allowing both to rotate independently through the Rotary Coupler and Transition Housing. Both catheters dependently traverse linearly due to the coupling.

Transition Housing: For a Dual Stage Catheter, the Transition Housing is the component(s) that joins the proximal catheter stage to the distal catheter stage by capturing the Rotary Coupler.

The invention: In this disclosure, the invention will alternately be described as the invention, the device, the catheter steering device, the robotic system, and other variations. These terms are interconvertible, and using any given term in a specific context is not intended to be limiting.

Stiction: used to describe an external resistance imposed on the catheter that can cause the catheter to load up with torque or axial forces beyond a certain level while traversing the body internally. Also used interchangeably with friction. Swimming Catheter: a catheter enabled through rotary and linear actuation to output a "swimming" motion through twisting and spiraling in order to form moving wave motion that propels the catheter through torturous path or between tissue plane or organs.

Resposable: The reuse of an instrument or component up to a set number of cycle before disposal.

As previously discussed, there is a need to improve surgical procedures by reaching further into various areas of the body with the most minimally invasive approaches. In all instances, the body's internal pathways follow a sequence of narrowing branches. The further down the branch or vessel, the narrower the internal pathway becomes. This creates many challenges for engineers. It pushes the creative and technological limits.

Catheter development is dependent on efficient implementation of metals, polymers, and semiconductors. Metals provide for higher stress limits and thus smaller parts which enable the production of smaller tools. Stainless and Nitinol metals are used in the skeleton of catheters and micromechanical tools. Polymers are used for the skin and insulation of the catheter, allowing smooth interaction between the tool and the body's pathways. Silicon provides the sensing and feedback for producing smart embedded devices at the distal portion of the catheter. Other electronic embedded elements can include video cameras, such CMOS cameras, and LED lighting. The CMOS camera and pico-LEDs provide an important advantage by allowing more flexibility (less resistance) at the distal lead and along the catheter's length. This is due to the braided electrical wires for power, return and communication leads. Whereas fiber optic scopes and fiber optic lighting limit the radius of bend or articulation angle of the catheter due to the higher bending resistance of the glass fibers.

Advances in robotics and visualization systems are creating new opportunities in medicine. These new opportunities create advantages over manual-driven instruments. Stability is one of the advantages, which is easily recognizable when traditional manual surgical tools are attached to the robot. When catheters are robotically driven, several advantages can be leveraged: semi or full-autonomous pathfinding, a locked position, drive methods for traversing further, and tracking position relative to the target with a real-time C-arm surgical imaging device (CT or MRI).

Applying robotics to a catheter exhibits many challenges. Cost and performance should be well balanced due to a disposable cost model. New ideas that approach design for manufacturing (DFM) and cost from the initial challenge push both the creative and technological potentials.

The present invention tackles these challenges by exploiting advanced techniques in micro tool development coupled with robotics and visualization technology.

Description of Applications (Curing Pulmonary Diseases)

Robotic procedures and advances in real-time computer visualization of the body have opened entirely new approaches to targeting and curing many diseases. One such area is in the diagnosis and treatment of lung cancer. Most lung lesions are in the periphery of the lungs. Seventy percent of lung lesions are in the outer third of the lungs. This is a vast opportunity for applying micro-invasive technologies due to narrowing the bronchus in the periphery.

Current detection and treatment are limited by several shortcomings, even with the application of robotics. For robotic bronchoscopy, the catheter technology is limited by the disposable's cost constraints, which directly impacts the catheter size and mobility. Making devices smaller comes with many challenges, which, if not approached carefully, can create cost and performance disadvantages.

These constraints provide a unique opportunity for innovation. Reaching and treating currently inaccessible lesions in the outer third of the lungs is achievable by applying creative manufacturing methods. Developing a highly mobile sub 3 mm robotic micro-bronchoscope that can safely target the outer third of the lungs is desirable. This is an area of the lungs where a thoracic surgeon often applies a biopsy needle under fluoroscopy by going transthoracic to obtain a tissue sample. Although this is the standard of care for the hard-to-reach areas of the lungs, it comes at a price with a pneumothorax rate of 20%. Additionally, this procedure does not provide a targeted treatment or cure if the lesion is cancerous. It is only a diagnostic method. The cost of treating a 20% pneumothorax rate is a huge issue and a great opportunity for developing better treatment methods.

The outer third of the lungs (22) is where 70% of lung lesions are located. Going transluminal from the bronchus to the outer third provides the opportunity to biopsy (detect) and treat the lesion (if found to be cancerous) during the same procedure or in-situ. In addition to detecting and treating cancer, other illnesses, such as chronic bronchitis, could be treated with electroporation to elicit an immunogenic response. Another application would be targeted micro-lung-lavage at the Alveoli.

Figure 2:
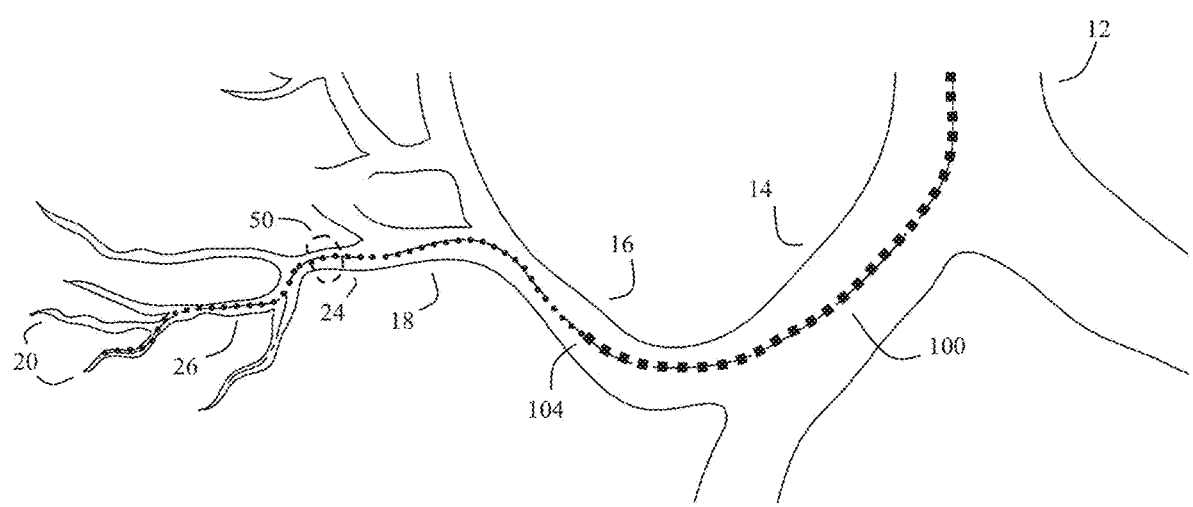
FIG. 2 shows the various bronchi structures and pathways.

FIG. 2 shows the trajectory paths from Primary (14) to Secondary (16) and then at the end of the Tertiary branch (18), where the pathway narrows to <3 mm in the subsegmental Bronchi. This is the transition to Terminal Bronchi. The thick dashed or broken line represents the path of a Bronchoscope (100). Along the scope's path, transition points are labeled. These points are labeled "End of Introducer Path" (104), "End of Proximal Path" (24), "Biometric Transition Point" (50), and "Distal Stage Path" (26). These labels represent some of the key areas along the length of the endoluminal catheter disclosed in this application.

As previously discussed, prior art robotic bronchoscopes have a diameter of about 4 mm and also have about a 18-20 mm articulation radius (turning radius). Although, in some prior art situations, a 19-22 gauge (~1 mm diameter) flexible nitinol needle can be attached to the tip of the bronchoscope for lesion biopsy, such needles are difficult to steer and tend to be unsatisfactory for many purposes.

Figure 3:
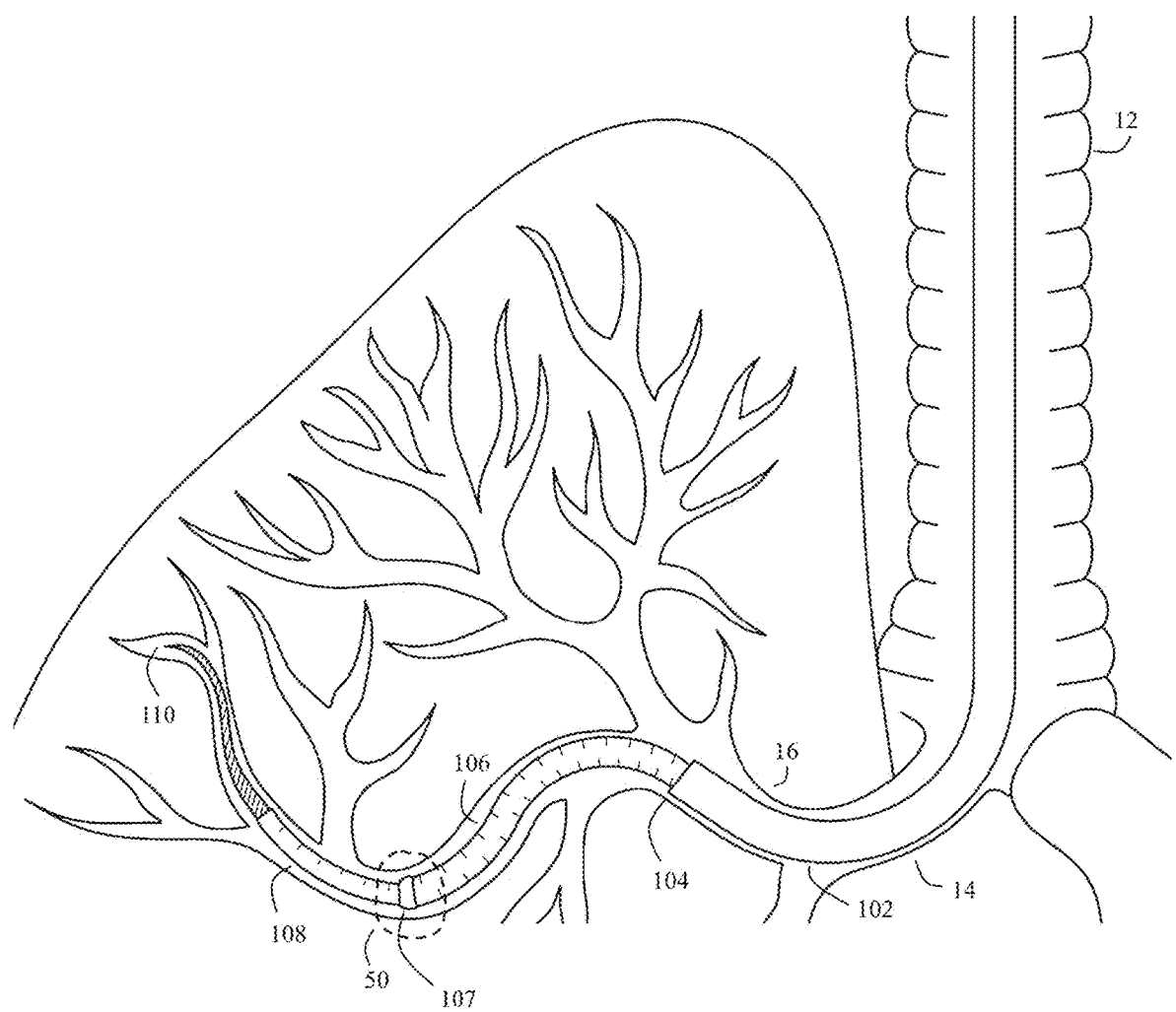
FIG. 3 shows a hypothetical path for a bronchoscope-type catheter reaching the outer ⅓rd of a lung.

Based on the trajectory path in FIG. 2 and FIG. 3, the "Biometric Transition Point" (50) can be viewed as the region of the lungs with bronchus and bronchi diameter of 3 mm or less, where prior art bronchoscopes stop.

As previously discussed, in some embodiments, the invention may be a catheter steering device for driving/steering various types of medical catheters, such as a bronchoscope with at least one stage and an optional introducer sheath (102) where the one or more stages (106) and (108) are robotically driven along the same axis. FIG. 3 shows a close-up of the path transition points where a two-stage bronchoscope may be divided (based on biometric data).

This is the challenge, especially where the bronchi branches take sharp turns. The narrowing of pathways below 3 mm diameter (50) creates a huge opportunity for an improved bronchoscope that can articulate and navigate these smaller diameter paths. For Tertiary or Subsegmental Bronchi (3-6 mm), there are 38 branches. When the bronchoscope is traversed beyond the 3 mm Tertiary branches (50), the opportunity rises to 1000 branches in the Terminal Bronchi (the outer third of the lungs 22). Beyond the Tertiary branches, this can be viewed as being a biometric transition in the design of the two-stage bronchoscope. The improved device and methods disclosed herein may, in some embodiments, be designed to penetrate this (3 mm diameter or less) region of the lungs (22) through reduced size and improved maneuverability. This allows the device to reach regions that are generally inaccessible to prior art manual or robotic bronchoscopes.

FIG. 3 shows the four main components of a two-stage embodiment of an improved catheter that may be driven by the present invention. This catheter comprises an introducer sheath (102), a proximal stage (106), a distal stage (108), and a probe or tool (110). At (107), there is an optional isolation transition coupler or junction where the proximal stage (106) is coupled or bonded, welded, or snaped together to the distal stage (108). As can be seen in FIG. 3, the distal stage (108) may have a much smaller outer diameter (OD) than the proximal stage (106). The device can be configured so that the surgeon or robot can manipulate the primary stage (106) and coupler, junction, or transition region (107) near the biometric transition point (50) and then use the distal stage (108) to proceed further into the outer third of the lungs (22) or other difficult to access region.

In a preferred embodiment, the surgeon, using the present invention, may manipulate (106), (107), and (108) in synchrony to get to a desired location near the target. Then, a tool or probe, such as (110), may slide out and extend to the target.

Thus, in some embodiments, the invention may be a catheter steering device for a one- or more-stage catheter for traversing internal body passages, this at least one-stage catheter device comprising a distal hollow catheter portion and a similar or different proximal hollow catheter portion (hollow does not always imply the far distal tip is open or through-hole). In the case where the invention is a one-stage catheter device, with the distal and proximal sides of the catheter being the same material, these sides will be termed the distal and the proximal portions. In the case where the invention used to drive a multi-stage catheter device with at least two stages, the distal side will be referred to as the distal stage, and the proximal side (which may be of a different material or dimensions) will often be referred to as the different proximal stage. In cases where it doesn't matter if we are talking about a catheter portion or stage, the term "stage/portion" may be used.

Considering the two-stage embodiment first, in this embodiment, the different proximal stage hollow catheter (106) comprises a hollow torque shaft (200). Here, one end of the distal stage hollow catheter (108) is affixed to an end of the hollow torque shaft (200) by either a junction, such as a region where the two sides are bonded, welded, or snaped together to each other (107j), or by an isolation transition coupler (107, 107a, 107a1, 107a2). The junction (107j) will generally have the same diameter as the larger of the two sections. If an isolation transition coupler, it may be configured (e.g., with an appropriate external diameter) to traverse an internal body passage (i.e., the objective internal body passage for that particular medical procedure. This may be determined using computational methods specific to anatomy/patient).

This isolation transition coupler (107, 107a, 107a1, 107a2) generally comprises a hollow cylindrical housing and in some designs has at least one distal coil stop (107b). As previously discussed, the isolation transition coupler (107, 107a, 107a1, 107a2) is configured to act as an intermediary joint between one end (e.g., the proximal end) of the distal stage hollow catheter (108) and (the distal end of the) hollow torque shaft (200, 106). This joint acts to couple the two stages so that torque applied to the (proximal) hollow torque shaft (200) is conveyed to the distal stage hollow catheter (108).

The at least one-stage device further comprises at least one steering cable type conduit (such as 220) that extends along the catheter from the proximal stage (often from the proximal end of the proximal stage) to the distal stage (often to the distal end of the distal stage). In some embodiments, at least one of these steering cables will comprise both a (steering) cable (220) and a surrounding isolation coil (380). In either case, the steering cable, with or without a surrounding isolation coil, will often be termed a "tensioning cable." Thus, some "tensioning cables" may have isolation coils, and some may not. Further description (i.e., drawings or text indicating if a particular steering cable/tensioning cable has an isolation coil) will help distinguish. In the absence of further description, then both options may be used.

For those tensioning cables comprising a steering cable (220) and a surrounding isolation coil (380), such tensioning cables will connect to their respective distal coil stop (107b) so that this particular distal coil stop acts as an isolation coil stop to prevent further distal movement and progression of the isolation coil (380). At the same time, the distal coil stop (107b) is configured (often with a suitable central hole 107c) so that the internal steering cable (220) itself can pass through the distal coil stop (107b). In other words, at the distal coil stop, further distal movement of the surrounding isolation coil (380) is blocked, but further distal movement and progression of the internal steering cable (220) is permitted.

The catheter may also be configured so that the hollow torque shaft, distal stage hollow catheter, and the isolation transition coupler further comprise a working channel (228). This working channel is configured to convey at least one other type of conduit (230, often a different type of conduit other than a steering cable 220) through the proximal stage/portion hollow catheter and the distal stage/portion hollow catheter, often to at least a distal tool plate (109) mounted on a distal end of the distal stage/portion hollow catheter (108). Alternatively, one or more steering cables (220) can be adhered or welded to the end of the catheter (108).

Note that at least one of the tensioning cables comprises at least one distal stage steering cable (220) that is often connected (220t affixed) to the distal tool plate (109) or at any location inside or outside of the far distal location of the tube being flexed. This at least one distal stage steering cable is configured to convey distal stage steering force to the distal tool plate (109) or the end distal end of the tube, causing the distal tool plate or distal end of the tube and the distal stage catheter to move or bend according to the distal stage steering force.

Figure 4A:
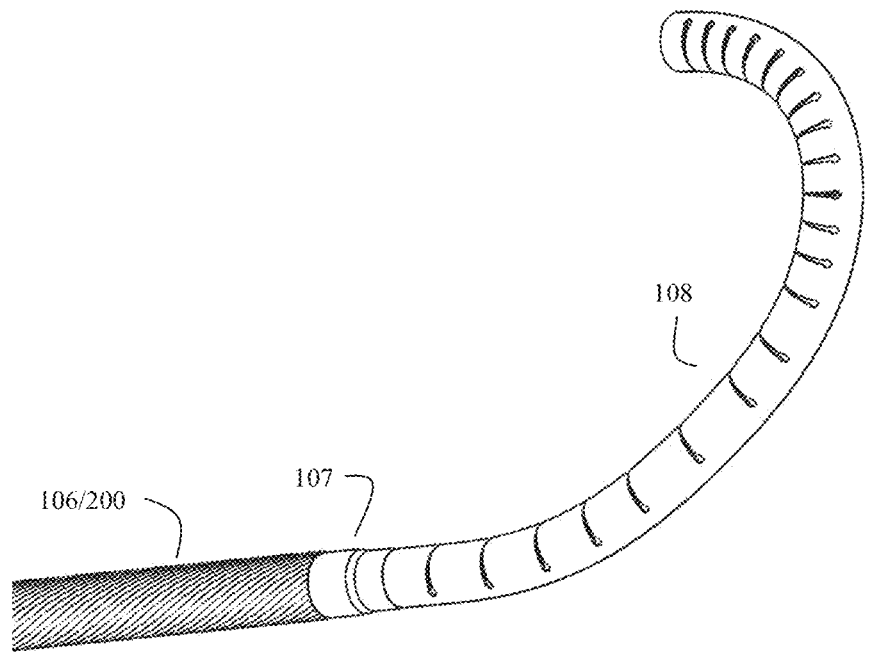
FIG. 4A shows the distal end of a catheter device that may be used in the invention's drive system, showing the distal end may comprise a highly flexible articulable distal section, an optional isolation transition coupler, and a proximal portion comprising a torque shaft or tube.

FIG. 4A shows the distal end of a simplified, highly maneuverable catheter device, which may be driven by the invention's catheter steering device, showing the catheter's distal end comprises a highly flexible articulable distal section (108), an optional isolation transition coupler (107), and a proximal portion (106) comprising a torque tube (200).

Figure 4B:
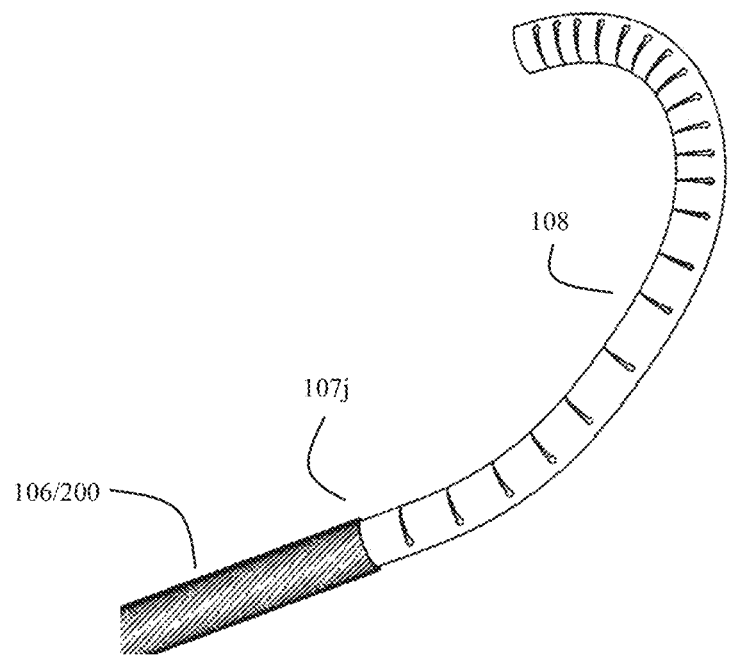
FIG. 4B shows the distal end of an alternate embodiment of this catheter device. Here, the catheter comprises a highly flexible, articulable distal stage joined (often by bonding or welding) to a proximal stage comprising a torque shaft or tube. There is no isolation transition coupler, but the two stages are distinct.

FIG. 4B shows the distal end of an alternate embodiment of the catheter device. Here, the catheter comprises a highly flexible, articulable distal stage (108) joined to a proximal stage comprising a torque shaft or tube (106/200) at a junction (107j). There is no isolation transition coupler, but the two stages are distinct.

Figure 4C:
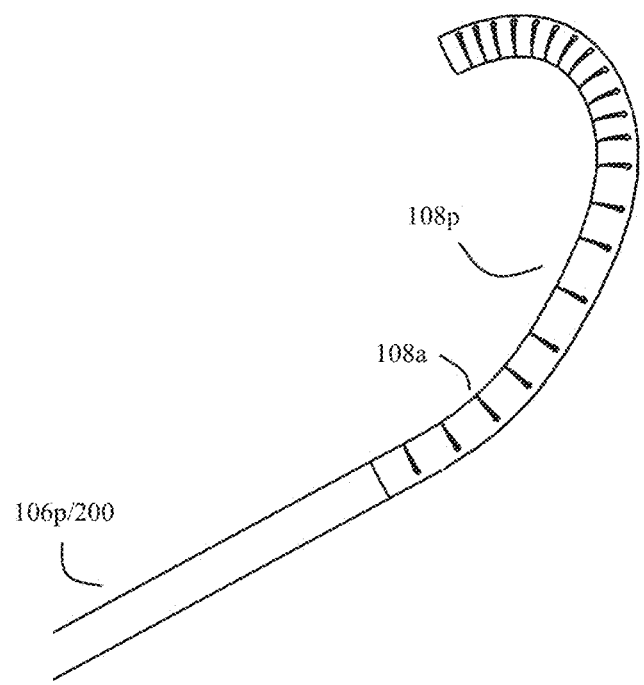
FIG. 4C shows the distal end of another embodiment of a suitable catheter device. Here, the catheter comprises a highly flexible, articulable distal portion that is continuous with a proximal portion configured to act as a torque shaft or tube. There is no isolation transition coupler. The two portions can be made of the same material, so no joint or junction is needed, but here, the distal portion is shown with a plurality of slits for greater maneuverability. The slits can be of any pattern that allows for flexure. In place of the slits, this could be a multi-durometer polymeric material with a stiffer backside and softer (lower durometer) inside (inside highly flexible area) where the cable pulls to compress this softer material.

FIG. 4C shows the distal end of another embodiment of a suitable catheter device. Here, the catheter comprises a highly flexible, articulable distal portion (108p) joined to a proximal portion (106p), here configured to act as a torque shaft or tube (100). There is no isolation transition coupler and no junction. The two portions are made of the same material, but here, the distal portion has a plurality of slits for (108a) greater maneuverability. The slits can be of any pattern that allows for flexure. In place of the slits, this could be a multi-durometer polymeric material with a stiffer backside and softer (lower durometer) inside (inside highly flexible area) where the cable pulls to compress this softer material.

Figure 5A:
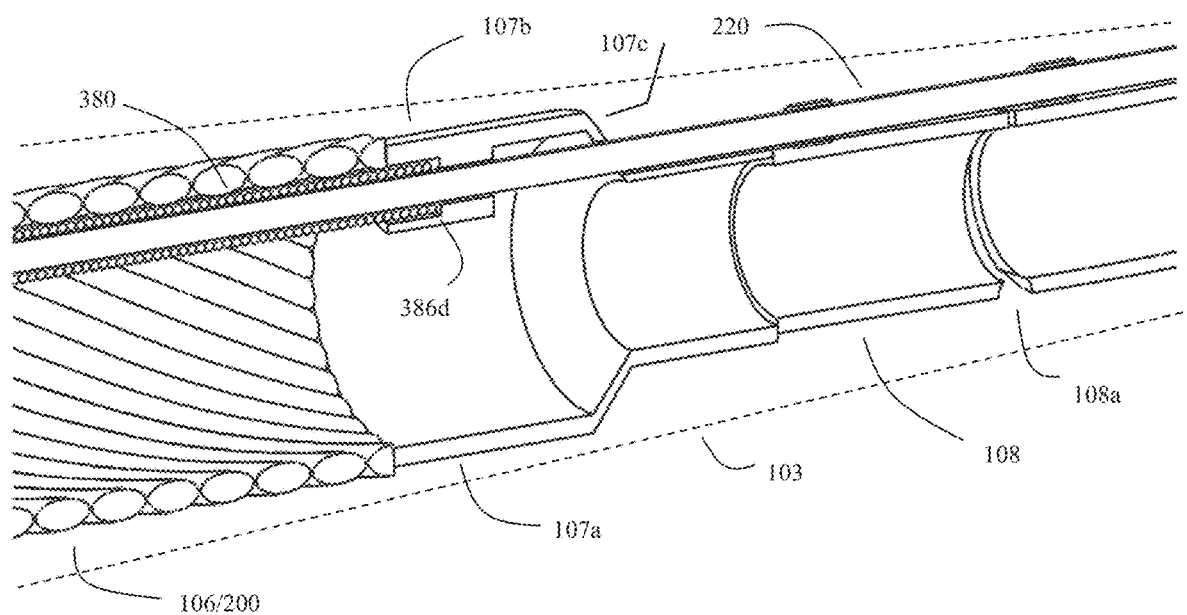
FIG. 5A shows a cross-section of one embodiment of the catheter. In this embodiment, the proximal portion of the cable is disposed inside the proximal portion of the catheter, and the distal portion of the tension cable is disposed along the exterior of the distal portion of the catheter.

FIG. 5A shows a cross-section of one embodiment of the catheter where the proximal portion of the tension cable (220, 380) is disposed inside the proximal portion of the catheter (106/200), but the distal portion of the tension cable (i.e., steering cable 220) is disposed along the exterior of the distal portion of the catheter (108).

Figure 5B:
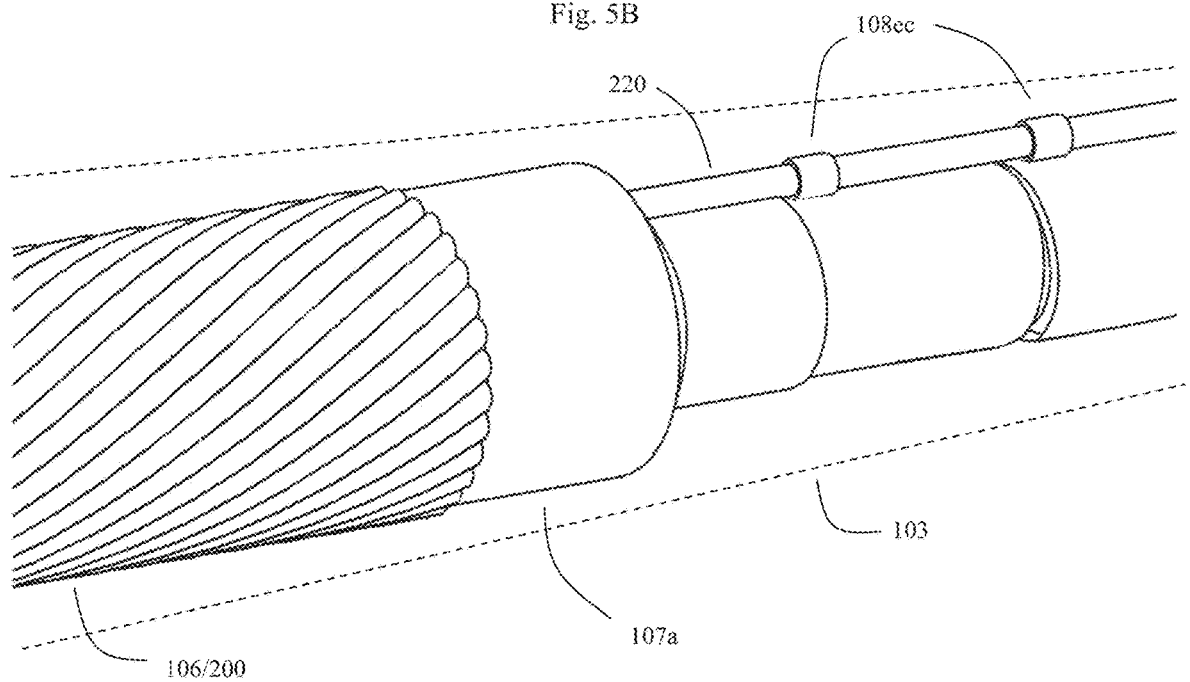
FIG. 5B shows the exterior of the catheter device previously shown in FIG. 5A.

FIG. 5B shows the exterior of the catheter device previously shown in FIG. 5A.

In this embodiment, the proximal side (108) torque shaft (200) is affixed to the distal stage (106) by way of an isolation transition coupler (107). This isolation transition coupler (107) will usually comprise a housing (107a) and at least one isolation coil stop (107b). The catheter will further comprise at least one steering cable (220). There are cases where the transition coupler has no isolation stop. In this case the coupler is just used as an intermediary joint to step down from proximal tube (106/200) diameter to the distal diameter (108). This might be for creating a biometric transition for fitting and maintaining column strength proximally.

As previously discussed, in some embodiments, this steering cable (220) is covered by a surrounding isolation coil (380) as the cable progresses up the proximal portion of the catheter until the isolation coil (380) encounters the isolation coil stop (107b). At the isolation coil stop, the further distal motion of the isolation coil is blocked, but the steering portion of the tensioning cable (220) itself can progress distally (often through a hole 107c in the isolation coil stop) and up the distal portion of the catheter (108), usually, until it hits an anchor point (220t) at the distal tool plate (109). See FIG. 9 and FIG. 12A, FIG. 21 (220). In some embodiments, the catheter may be further covered by an optional flexible polymer jacket (103).

This flexible polymer jacket (103) often differs from the optional sheath (102). The polymer jacket may comprise a biocompatible polymer selected to cushion and facilitate the passage of the catheter through narrow body openings. Examples of suitable polymers include hydrogels such as Pluronic (F127)/acrylic acid (AA) hydrogels, and the like. The jacket can be extruded with multiple pathways for housing conduits such as tensioning cable, return wire/spring, therapy device leads, vision/camera leads, etc.

More specifically, in some embodiments, any of the distal stage hollow catheter (108), proximal stage hollow catheter (106/200), and isolation transition coupler (107, 107a, 107a1, 107a2) may be surrounded on their exterior surfaces by a flexible polymeric jacket (103) which may be either continuous or discontinuous between sections.

In some embodiments, as shown in FIG. 5C, a suitable catheter may further comprise at least one elastic (219i or 219o) "or spring" element configured to oppose forces applied by at least one tensioning cable (220). (Here 2200 is a tensioning cable positioned outside of the catheter, optionally in or under a polymeric jacket, while 220i is a tensioning cable positioned inside the catheter.) This elastic element will often be positioned on the side of the catheter 180 degrees, opposite to the tensioning cables (220) that the elastic element is intended to counteract. (other angles are also possible and may be desirable if a slight catheter curve is desired). Additionally, two or mor elastic elements for one tensioning cable may be used as means of creating more stability or for biasing the curvature in a certain helix path. In some embodiments, one or more elastic elements may form a part of the flexible polymeric jacket. These elastic elements may be springs or spring materials such as nitinol, elastic polymer ligaments, or other elastic materials In these embodiments, the polymeric jacket (103) may have properties (elastic elements 219i or 219o) that cause the flexible portions of the catheter to return to a straight or other desired curvature once tension is released. These elastic elements could be a thicker elastic section, or a spring wire embedded in or under (219o) the elastic jacket. There could also be elastic biasing internally, such as a spring wire (219i), positioned inside the catheter 108 (or 106) that causes the catheter to return to straight or other desired curvature once tension is released.

FIG. 5C shows a cross-section of an alternate embodiment of the system employing this optional polymer jacket with spring/elastic-return features configured to oppose the force exerted by the tensioning cable(s). For the internal locations, these elements would run in an extruded tube which could be continuously formed with the catheter tube or could be an individually extruded internal lining.

Note that as previously discussed, in the embodiment shown in FIGS. 5A and 5B, the steering cable (220), as well as the surrounding isolation coil (380), first progresses along the interior of the torque shaft (200). However, further progress of the isolation coil (380) is blocked at the isolation coil stop (107b), and the tensioning cable/steering cable (220) then progresses through a hole in the isolation transition coupler (see FIG. 5A, 107c), and then along the exterior of the distal portion of the catheter (108). Here the steering cable (220) may optionally be held into position by various exterior clips (108ec) or a continuous lumen inside of or underneath a sheath. Note that these clips are loose enough to enable the steering cable (220) to move along the axis of the catheter but tight enough to hold the steering cable relatively close to the exterior side of the distal portion of the catheter (108). The clips 108ec are attached by bonding, welding, clipped, snap fit, formed or pushed out of tube 108. or alternately the exterior clips could be continuously formed as part of the catheter tube, and machined away as appropriate to guide the steering cable and allow flexibility of the catheter.

Note the distinction between the far distal end isolation coil (386d) and the isolation coil stop (107b). The far distal isolation coil end (386d) is where the isolation coil (380) ends on the distal side. By contrast, the isolation coil stop (107b) is the physical feature on the isolation transition coupler (107b) that prevents this isolation coil (380) from moving further in the distal direction. The isolation coil stop and transition coupler could simply be a bulkhead plate/disc or a ring with a hole to stop the coil and large enough to allow the steering cable to pass through.

Figure 6A:
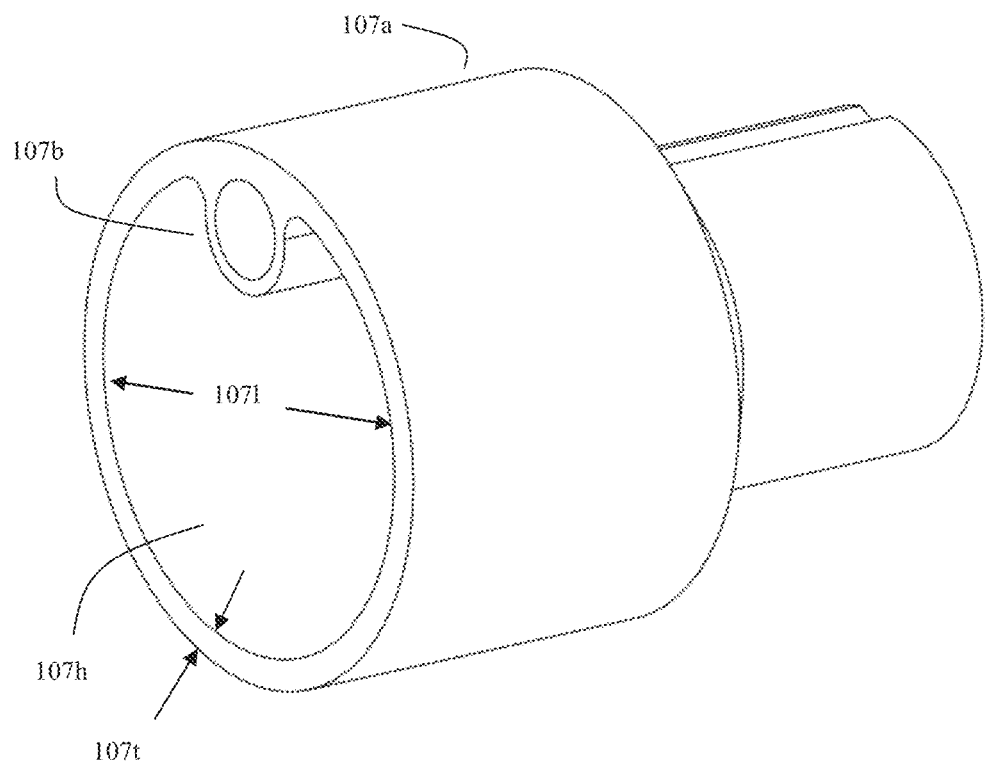
FIG. 6A shows a close-up of the first side of the optional isolation transition coupler previously shown in FIG. 5A and FIG. 5B.

FIG. 6A shows a close-up of one side of one embodiment of the optional isolation transition coupler (107a), showing the hollow interior (107b) and a detail of the front end of the distal coil stop (107b). Here the internal diameter of the larger side is shown as (107l). The thickness of the isolation transition coupler shell is shown as (107t). The external diameter of this portion is thus (107l)+2*(107t).

Figure 6B:
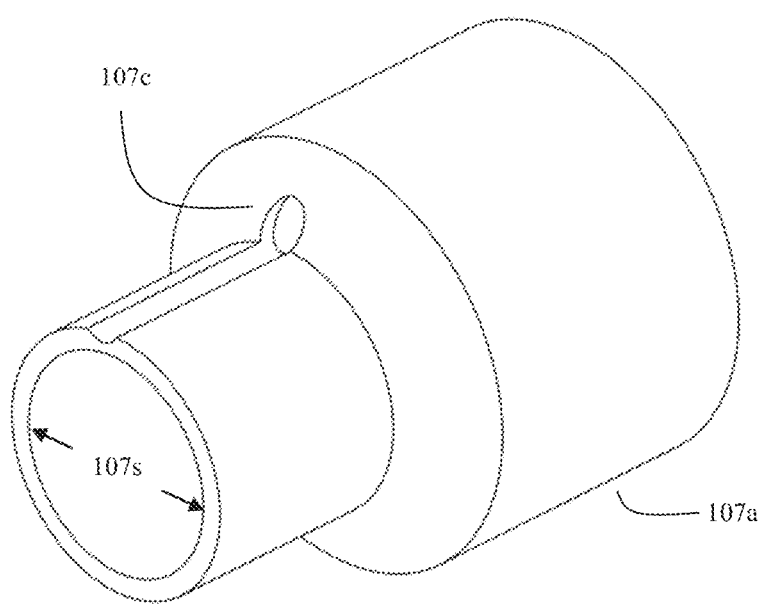
FIG. 6B shows a close-up of the other side of the optional isolation transition coupler previously shown in FIG. 5A and FIG. 5B.

FIG. 6B shows a close-up of the opposite side of this embodiment of the optional isolation transition coupler (107a), showing the exit hole (107c) by which the tensioning cable (220) can exit the distal coil stop. There the internal diameter of the smaller side is shown as (107s). Assuming that the thickness of the isolation transition coupler shell in this region is also (107t), then the external diameter of this portion is thus (107s)+2*(107t). Usually, the thickness of the transition coupler shell (107t) is less than 10 to 20 percent of (107l) or (107s).

The thickness of the isolation transition coupler wall (107t) is usually similar to the thickness of the catheter's proximal portion (106/200) and a distal portion (106), which in turn is usually less than 20 percent of the internal diameters (107s and/or 107l).

Note that the distal stage hollow catheter is usually tapered from a larger diameter (107l) at the proximal end of the isolation transition coupler to a smaller diameter (107s) at the distal end of the distal stage hollow catheter. In general, the device is configured to enable at least distal portions of the distal stage hollow catheter to be maneuvered through body lumens with internal open diameters of 3 millimeters or less. Thus, the sum of the dimensions of (107l)+2 times (107t) may often be 3 millimeters or less. In some embodiments, 107l is equal to 107s where the column strength is adjusted for the anatomy and the potential for sheaths and additional catheter bodies working in unison over long distances.

Figure 7A:
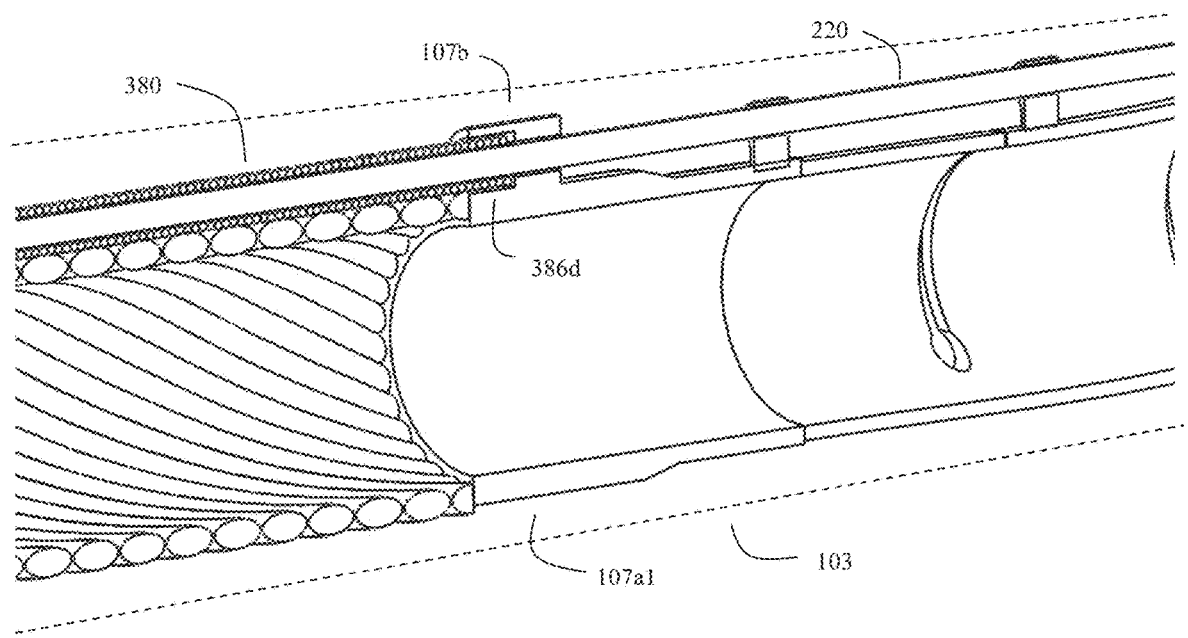
FIG. 7A shows a cross-section of a different embodiment of the catheter, where the proximal portion of the tension cable is disposed outside the proximal portion of the catheter, and the distal portion of the tension cable is also disposed along the exterior of the distal portion of the catheter.

FIG. 7A shows a cross-section of a different embodiment of the catheter where the proximal portion of the tension cable (220) is disposed outside the proximal portion of the catheter, and the distal portion of the tension cable (220) is also disposed along the exterior of the distal portion of the catheter. This version of the isolation transition coupler (107*a*1) lacks the exit hole (107*c*) previously shown in FIG. 6B. In this version, the distal coil stop (107*b*) is located on the outside of the isolation transition coupler. For this reason, this variant of the isolation transition coupler is here shown as (107*a*1), but otherwise will still be termed an "isolation transition coupler," and designations of (107 and 107*a*) are generally intended to refer to this variant as well.

Figure 7B:
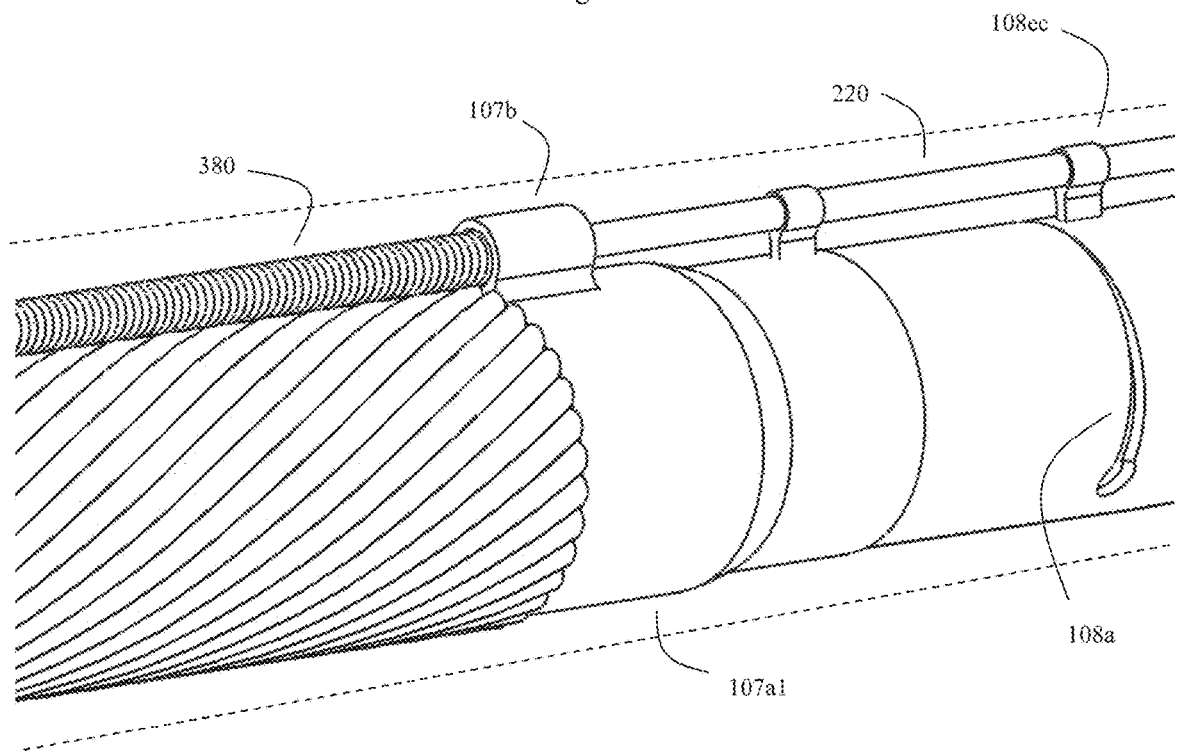
FIG. 7B shows the exterior of the catheter device previously shown in FIG. 7A.

FIG. 7B shows the exterior of the catheter device previously shown in FIG. 7A.

To expand on isolation coils: As previously discussed, in some embodiments, portions of at least one distal stage steering cable (220) are further disposed inside an isolation coil (380). This isolation coil (380) comprises a far-isolation-coil-end (FIG. 5A, 386*d*) and a near-isolation-coil-end (FIG. 28B, 382*n*). In this embodiment, each far-isolation-coil-end is attached proximate to a distal terminus of its corresponding steering cable (220) in a manner that allows the corresponding steering cable (220) to movably protrude past the far-isolation-coil-end (386*d*) while blocking the axial movement of the far-isolation-coil-end.

Further, each near-isolation-coil-end (382*n*) is attached proximate to its respective flexing actuator in a manner that allows the corresponding steering cable (220) to movably protrude past the near-isolation coil end (382*n*) while blocking axial movement of the near-isolation-coil-end.

FIGS. 4, 5, 7, 9 and 11 also show that at least the distal stage hollow catheter (108), and often the proximal stage hollow catheter (106/200) will often comprise a plurality of slits (106*a*, 108*a*) along at least a portion of their circumference. The slitted shaft for 106/200 is functional for both flexing and transmitting torque. These slits are configured to have positions and dimensions to facilitate traversal of the catheter device through a series of branching body lumens of progressively smaller internal diameters, such as shown in FIG. 3. These slits as they are referred are more general and used for demonstration. In reality there can be infinitely different patterns such as cuts that are not circumferentially following the diameter but are more complex with reliefs and other features that reduce stress and add a torque type feature in the cut of tube. The process for achieving intricates patterns would be performed on radial head for rotating and a laser for cutting. Alternatively, etching or EDM (electrical discharge machining) could also be employed for these intricate features.

Indeed, note that in some embodiments, any of the distal stage/portion and the proximal/stage portion comprise any of a woven, non-woven, or continuous material with a plurality of slits, integrate patterns, or other openings along at least a portion of their circumference. In general, this material will be selected to have positions and dimensions configured to enable the device to travel through a series of branching body lumens of progressively smaller internal diameters. These diameters, features, progressively changing to match the anatomy/patient could be determined through computational methods from historical and patient information.

Figure 8:
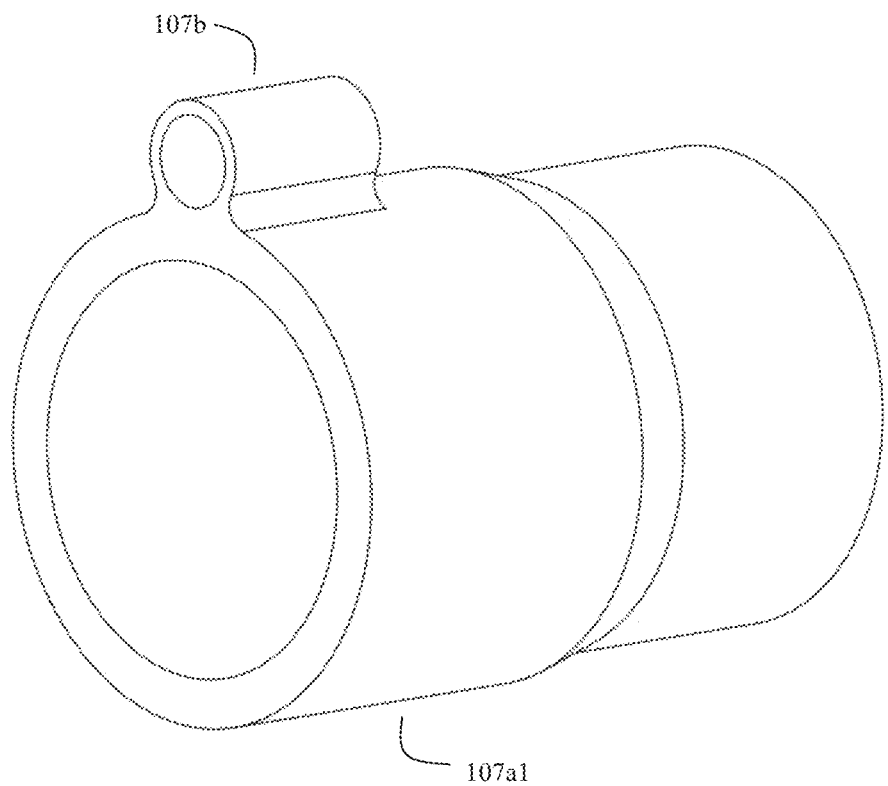
FIG. 8 shows a close-up of the optional isolation transition coupler previously shown in FIG. 7A and FIG. 7B.

FIG. 8 shows a close-up of the optional isolation transition coupler (107*a*1) previously shown in FIG. 7A and FIG. 7B.

Figure 9:
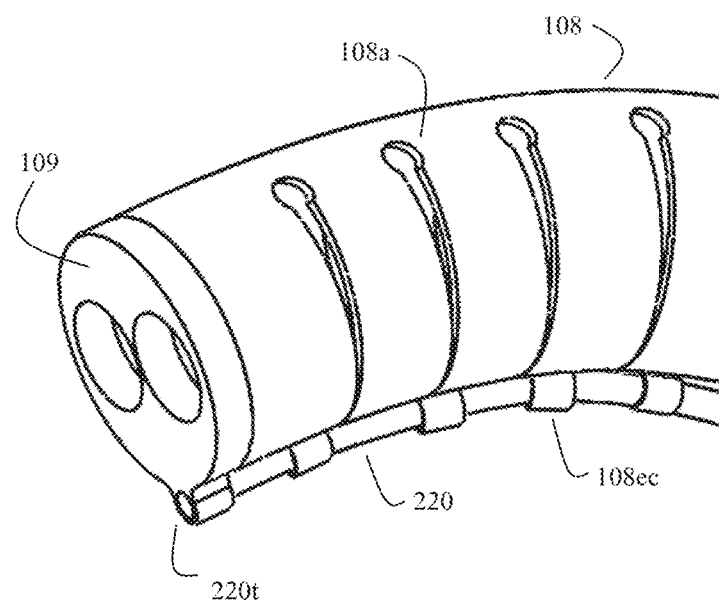
FIG. 9 shows a detail of the extreme distal end of a catheter where the tension cable is disposed outside of the distal catheter.

FIG. 9 shows a detail of the extreme distal end of a catheter where the tension cable is disposed outside of the distal portion of the catheter. In this embodiment, the steering cable (220) end of the tensioning cable terminates at the distal plate (109). It is terminated by being connected (e.g. adhered, gipped, welded, glued, swaged) at the termination region (220*t*). As a result, force or tension on this steering cable (220) end of the tensioning cable will cause the distal end of the catheter to bend in the direction of the applied force. As previously discussed, in some embodiments, there may be multiple steering or tensioning cables (See FIG. 14, 220, 222, 224, 226) configured to cause the distal end of the catheter to bend in multiple directions depending on the applied force. Each direction of bending is occasionally referred to as a "way", such as 1-way, 2-way, and so on.

Figure 10A:
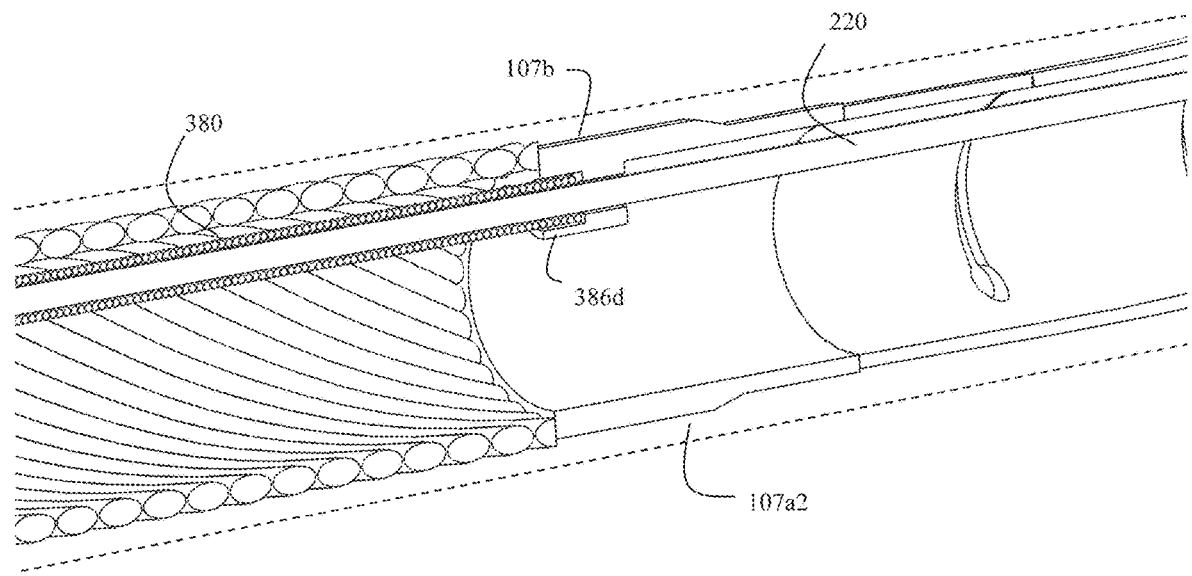
FIG. 10A shows a cross-section of a different embodiment of the catheter where both the proximal portion of the tension cable is disposed along the interior of the proximal portion of the catheter, and the distal portion of the tension cable is also disposed along the interior of the distal portion of the catheter.

FIG. 10A shows a cross-section of a different embodiment of the catheter where both the proximal portion of the tension cable is disposed along the interior of the proximal portion of the catheter, and the distal portion of the tension cable is also disposed along the interior of the distal portion of the catheter. This version of the isolation transition coupler also lacks the exit hole (107*c*) previously shown in FIG. 6B, and the distal coil stop (107*b*) is located inside the isolation transition coupler. For this reason, this variant of the isolation transition coupler is here shown as (107*a*2), but otherwise will still be termed an "isolation transition coupler," and designations of (107*a*) are generally intended to refer to this variant as well.

Figure 10B:
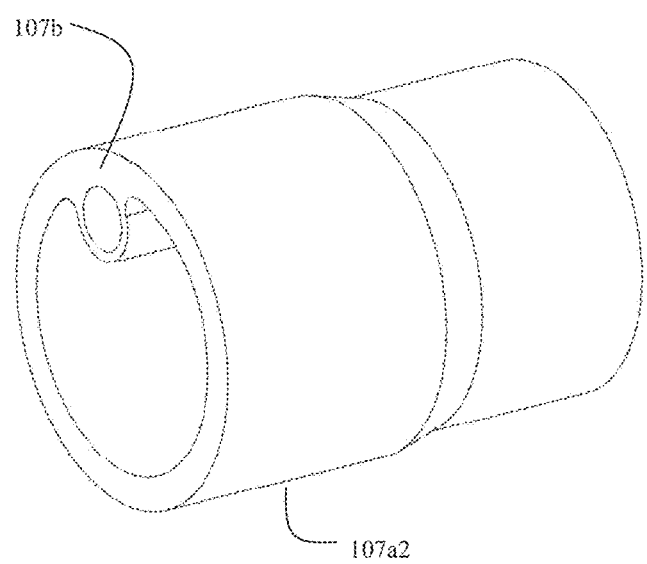
FIG. 10B shows a close-up of the optional isolation transition coupler previously shown in FIG. 10A.

FIG. 10B shows a close-up of the optional isolation transition coupler (107*a*2) previously shown in FIG. 10A.

Figure 10C:
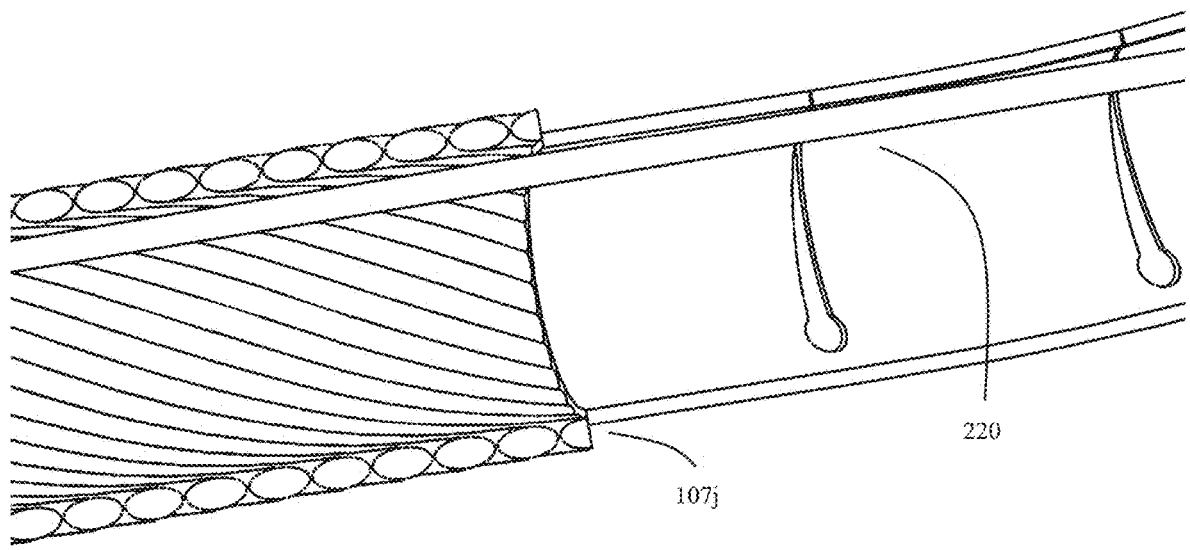
FIG. 10C shows a cross-section of an alternative embodiment of a two-stage catheter, where the distal stage is affixed to the end of the proximal stage by a junction. In this embodiment, the tension cable lacks an isolation coil and also lacks an isolation transition coupler.

FIG. 10C shows a cross-section of an alternative embodiment of a two-stage catheter where the distal stage is affixed to the end of the proximal stage by a junction (107*j*). There is no isolation transition coupler. In this embodiment, the steering cable/tension cable (220) lacks an isolation coil.

Figure 10D:
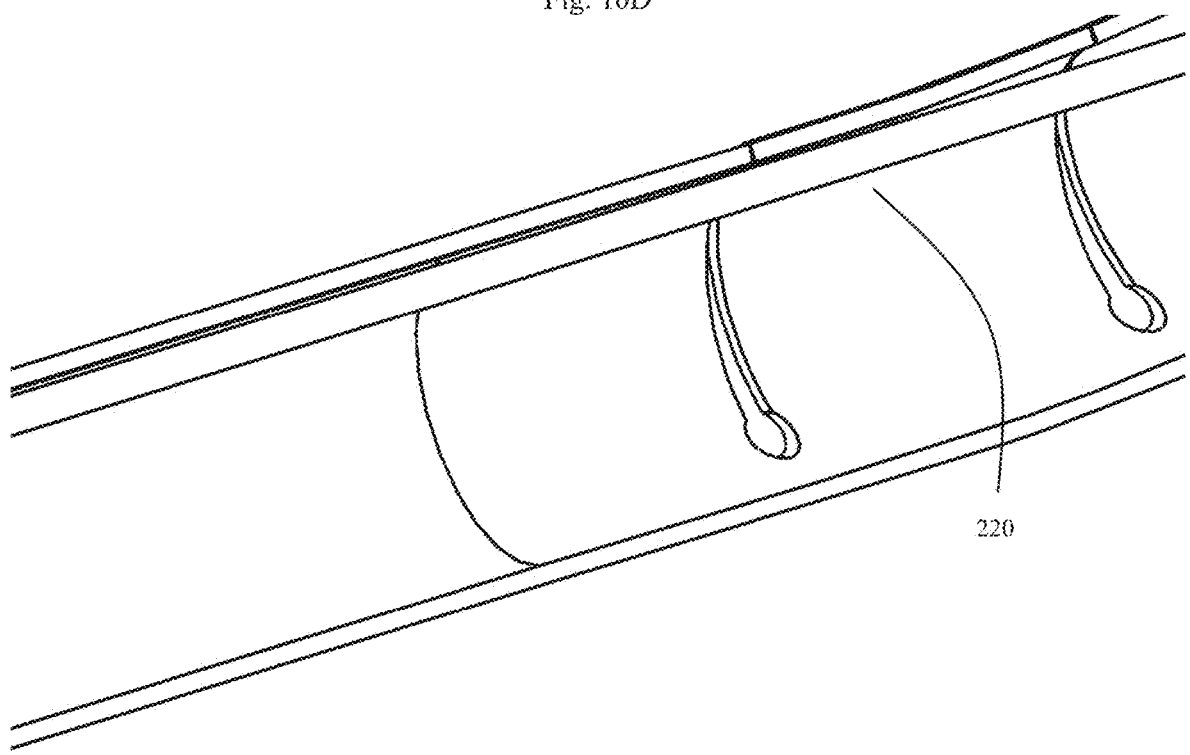
FIG. 10D shows a cross-section of a single-stage catheter. Here, the distal and proximal portions are part of the same catheter, and there is no junction or isolation transition coupler. In this embodiment, the tension cable also lacks an isolation coil.

FIG. 10D shows a cross-section of a single-stage catheter. Here, the distal and proximal portions are part of the same catheter, and there is no junction or isolation transition coupler. In this embodiment, the steering cable/tension cable (220) also lacks an isolation coil.

Figure 11:
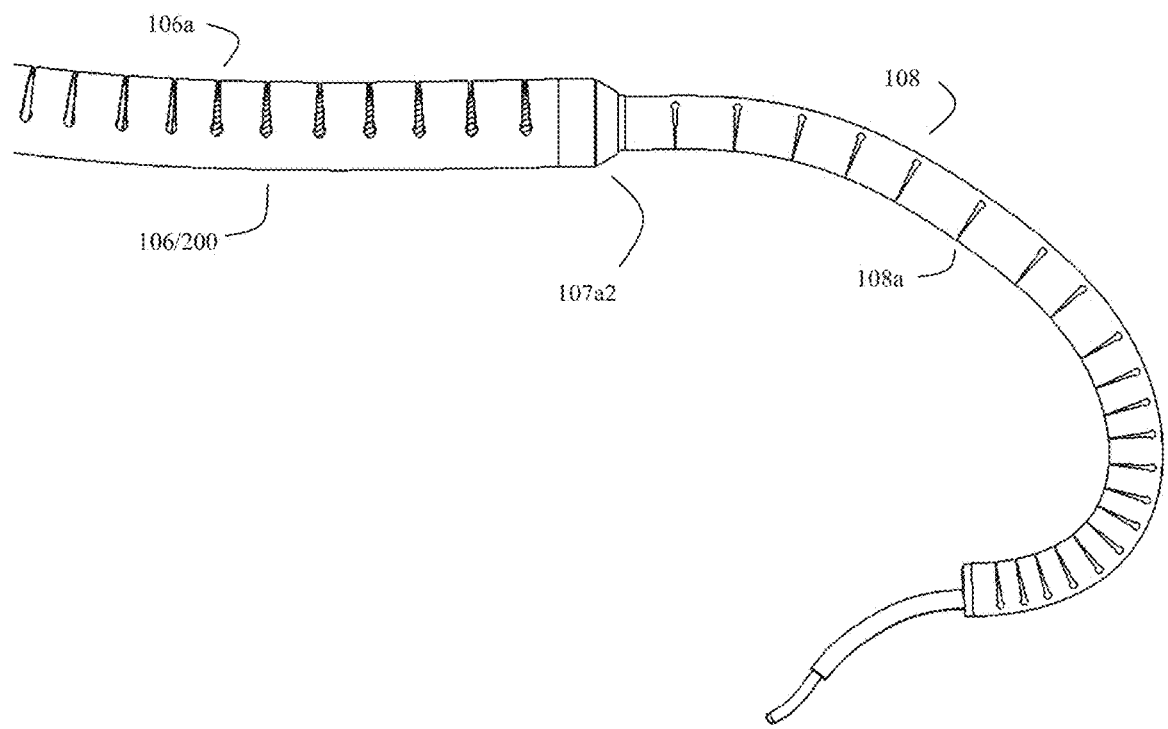
FIG. 11 shows how the flexible sections can be tailored to a patient's particular bronchi or other anatomy/passage, where the lesion location may be a more challenging area to reach due to some non-conformity.

FIG. 11 shows how the flexible sections (106 and 108) can be tailored (e.g., custom manufactured) to fit better a patient's particular bronchi (or other body lumen) where the lesion location (e.g., target) may be a more challenging area to reach due to some pathway non-conformity.

As previously discussed, FIG. 11 also shows that any of the distal stage hollow catheter (108) and the proximal stage hollow catheter (106) may further comprise a plurality of slits (such as 108*a*, 106*a*) along at least a portion of their circumference. The pattern of these slits can vary based on a number of engineering requirements as discussed earlier. These slits may have positions and dimensions that are configured to facilitate catheter traversal through a series of branching body lumens of progressively smaller internal diameters. Note that in some embodiments, the proximal stage hollow catheter (106) is itself used to provide torque to the distal stage hollow catheter (108). In this embodiment, the proximal stage hollow catheter (106) is also called the torque shaft (200). Again, hollow does not necessarily imply hollow through to the far distal tip.

In some embodiments, the structure of a patient's particular pathway may be obtained by scanning (e.g., by using a C-arm medical imaging scanner or other type scanner to scan the patient, and to create a computed 3D model of the patient). This computed 3D model can be generated before surgery. This pathway data from the model can be used to determine the ideal trajectory of the distal stage (108). This distal stage design could be automatically generated, such as by standard computer processors or AI methods, using current patient scans (e.g., CT/MRS generated 3D models and historical data/3D scans). This data can be used to determine how to construct the distribution and flexibility of any optional flexure joints (108*a*, 106*a*) along the distal and proximal stages (106, 108) and the length of the distal and proximal stages.

Figure 12A:
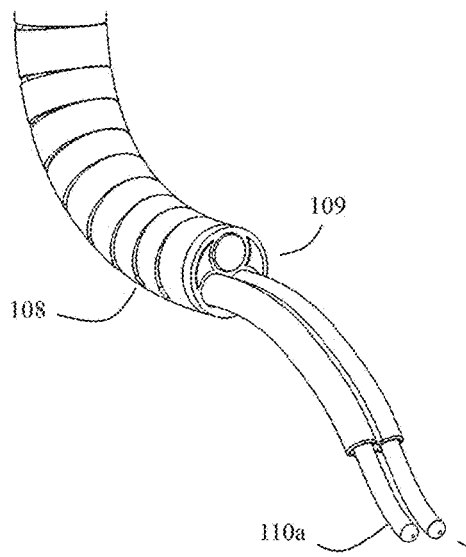
FIG. 12A and FIG. 12B show the use of optional electrodes.
Figure 12B:
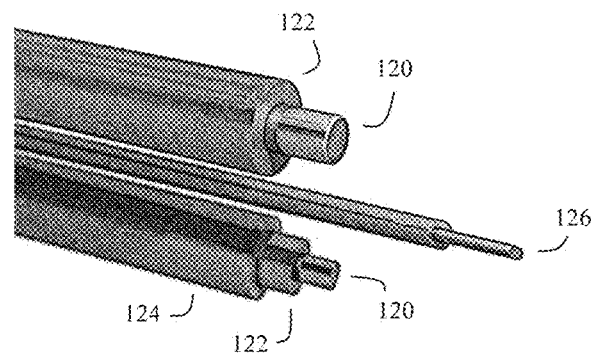

FIG. 12A and FIG. 12 B show the use of optional electrodes, such as (110*a* and 110*b*), here shown extending out of the distal plate (109). In some embodiments, bipolar (e.g., two) electrodes may be used for targeted treatment and can be used to deliver high-frequency electrical energy from a suitable source. These micro-electrodes (110*a*, 110*b*) can be isolated from one another by an insulating lumen. In some embodiments, the electrodes may be made from DFT® wire (Drawn Filled Tubing). Such DFT wire may comprise a gold core electrode (120) surrounded by nitinol (122), and often then an insulator (124). This allows for elasticity and conductivity to be optimized in small diameter wire <1 mm. Conventional wires, such as insulated copper wires, may also be used (126). In some embodiments, these wires will also have radiopacity for viewing the position of electrodes during a real-time C-Arm CT scan or other imaging process.

Thus, although some of the conduits may often comprise conduits that are tension or steering cables such as (220), at least some of the conduits may also comprise electrical conduits (such as 110*a*, 110*b*). These electrical conduits may be used to transmit any electrical power or electrical signals to any of various probes, sensors, or other electrically activated devices disposed on or passing through the distal tool plate (109).

Note further that in many embodiments, at least some of the conduits can comprise optical fibers or hollow tubes (230) configured to convey optical, electromagnetic, or radiofrequency (RF) signals or chemicals to or from devices disposed on the distal tool plate (109) or within and exterior or interior luminal sheath with conduits molded into the sheath as an extrusion.

Figure 13:
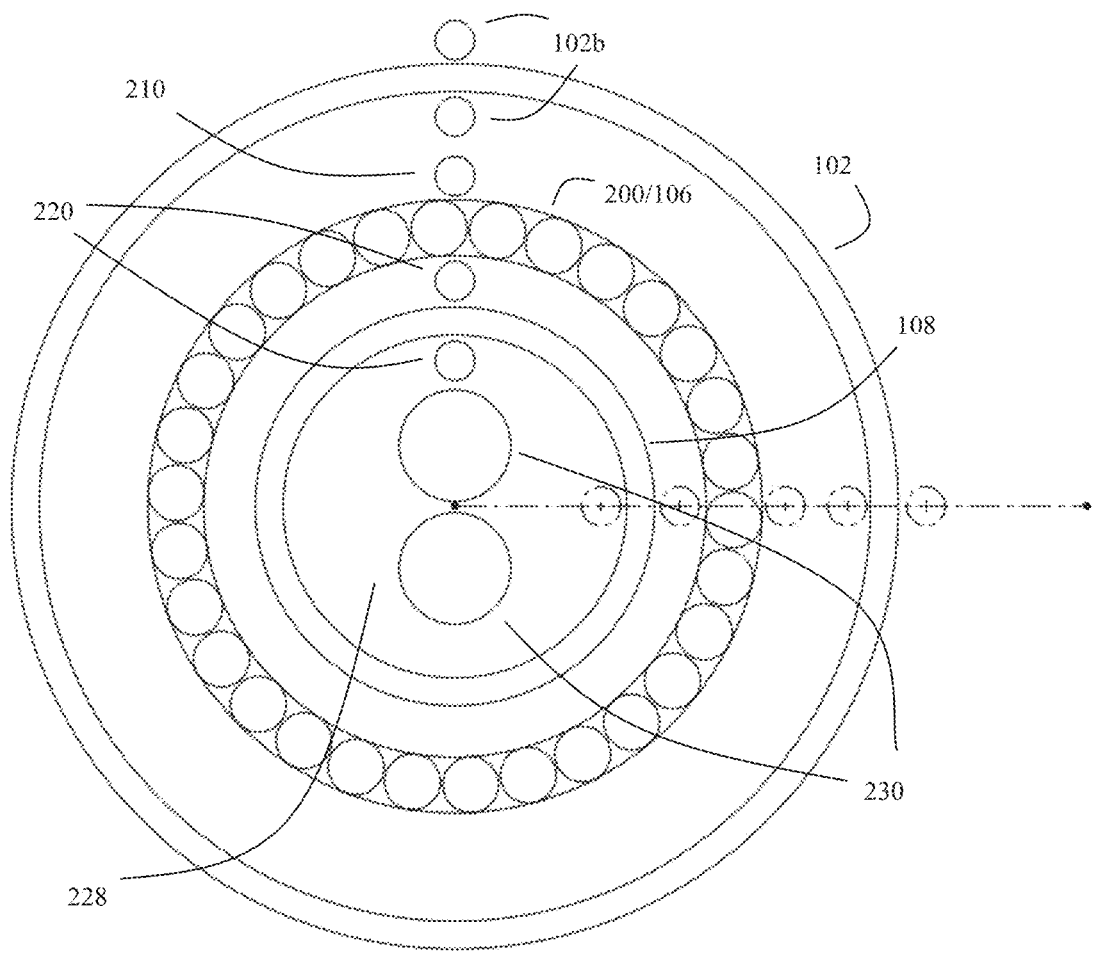
FIG. 13 shows a cross-section of a catheter configured to use a 1-way Steerable Introducer Sheath, 1-way Proximal Stage, and 1-way Distal Stage with Torque Steering.

FIG. 13 shows a cross-section of a different catheter embodiment. This embodiment uses an at least 1-way steerable introducer sheath (102) with its own sheath steering cables (such as 102*b*).

This embodiment also comprises a proximal stage (106) or portion. In some embodiments, this proximal stage may optionally also be steerable (such as at least 1-way steerable) using optional proximal stage steering cables such as 210 or optionally 220 on the inside of 200/106). In some embodiments, as previously discussed, the proximal stage (106) is also a torque shaft (200).

The drawing also shows a distal stage/portion (108) configured to be at least 1-way steerable with its own steering cables (such as 220). The interior of the distal stage (108), and also the interior of the proximal stage (106) as well, comprises a hollow working channel (228) through which various other types of conduits, such as electrical conduits or tubes (230) and/or other items may travel.

Put alternatively, in some embodiments, at least proximal portions of the proximal stage hollow catheter are disposed within at least one hollow sheath (102). This hollow sheath (102) is configured to enable at least portions of the catheter device (e.g., 106/200, 108) to protrude or retreat inside and outside of the at least one hollow sheath (102). The extent of this extension or retraction depends on forces (manual or robotic) applied to this at least one hollow sheath (102) and at least this proximal stage hollow catheter (106). This is shown in more detail in FIG. 15, FIG. 16, and FIG. 17. The hollow sheath is more simply described as a single stage catheter.

Although most examples in this disclosure use only a single steering cable/pull wire, such as (220, here sometimes shown with an exterior coil and configured as a tensioning cable), multiple steering cables may be used in some embodiments.

Figure 14:
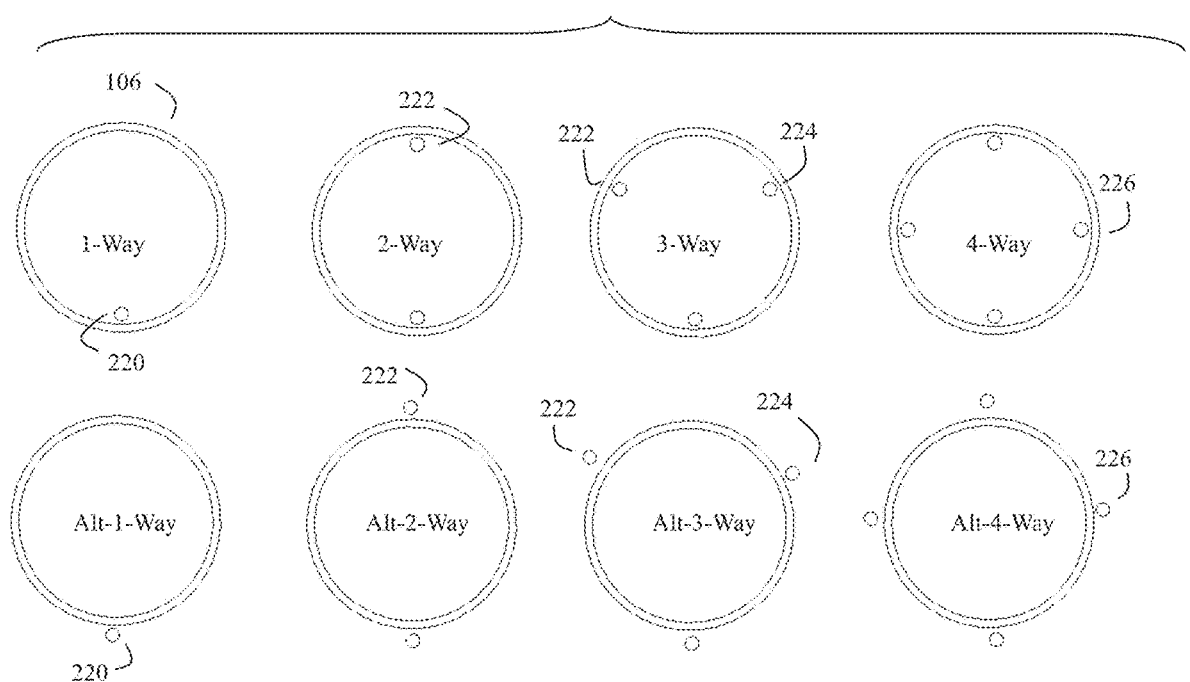
FIG. 14 shows the different pull wire orientations on the inside or outside for each type of flexible catheter: 1 plane/1 direction (1-way), 1 plane/2 direction (2-way), 3 plane 3D (3-way), and 4 plane 3D (4-way). Any combination of inside or outside wire locations is also possible.

FIG. 14 shows the different pull wire or steering cable orientations for the distal stage/portion (108) cables. Various embodiments are possible, including 1 plane/1 direction (1-way), 1 plane/2 direction (2-way), 3 plane 3D (3-way), and 4 plane 3D (4-way).

Although 4-way steering (4 steering cables) provides the highest degree of freedom of motion (without rotation), there are some tradeoffs in terms of higher complexity and greater amount of interior/exterior space that is needed to accommodate larger numbers of steering cables. This leads to a smaller ID/OD ratio. A smaller number of steering cables, such as 1-way steering (one-steering cable) has certain advantages because it reduces the space needed for such cables. This results in a smaller outside diameter, allowing greater access, and also allows for a catheter design with a larger working channel. This, in turn, allows for more conduits for a camera, lighting, sensors, probes, etc. As a result, the ID/OD ratio is larger.

In FIG. 14, the upper row shows an interior steering cable configuration, such as shown in FIG. 10A. By contrast, the lower row (alternate) configuration is for an exterior steering cable configuration, such as shown in FIG. 5A, 5B, and FIG. 7A, 7B.

System Integration Example

As previously discussed, in some embodiments, at least the proximal portions of the proximal stage hollow catheter (106, 200) are disposed within at least one hollow sheath (102). This at least one hollow sheath is configured to enable at least portions of the catheter device to protrude or retreat inside and outside of the sheath (102), depending on forces applied to the sheath and/or the proximal stage hollow catheter (106, 200). The sheath is thus a good way to introduce the catheter into the patient's body.

Figure 15:
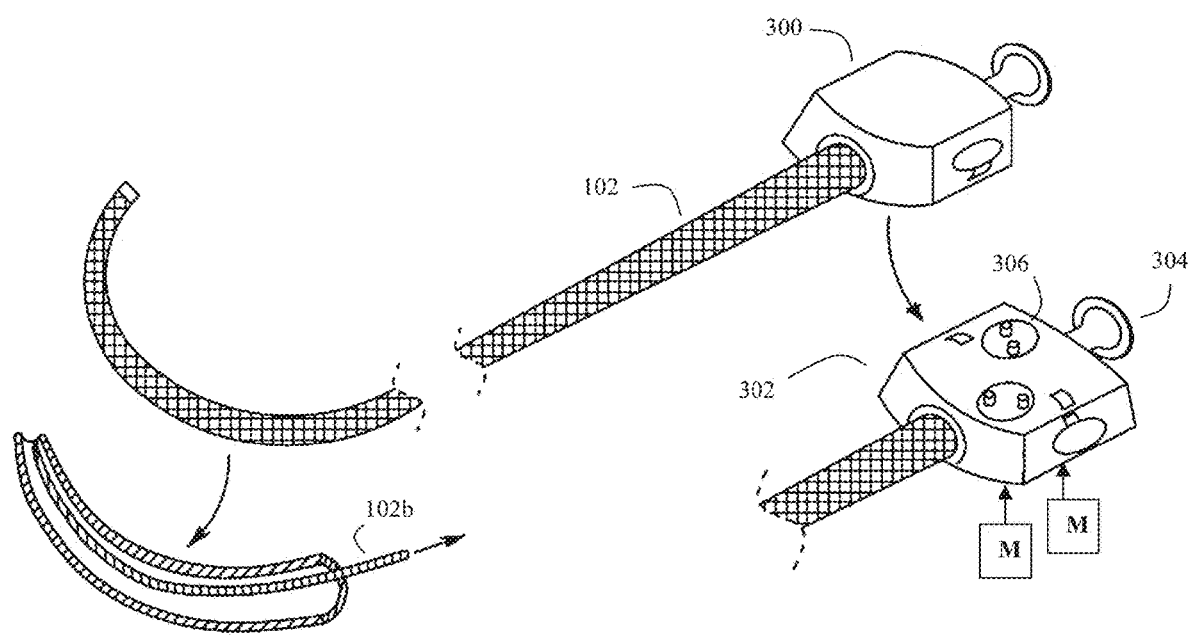
FIG. 15 shows a system example with a steerable introducer sheath (single stage type catheter) control head.

FIG. 15 shows a system example of a steerable introducer sheath (102) attached to drive cartridges for a robotic system. The first cartridge or control head (300) can actuate the introducer sheath (102) to bend/flex or rotate. This hollow sheath can be used for delivering the catheter (device). In a preferred embodiment, this sheath and control head arrangement may have at least one plane of articulation (at least 1-way steering) in at least one direction. In other embodiments, the hollow sheath and control head may have up to full universal articulation (e.g., 4-way steering). In FIG. 15, the top figure shows the outside of the control head/sheath system, while the lower figure shows some of the mechanisms inside the control head/sheath system, such as a sheath articulation cable 102*b* and various drive wheels (306) and motors (M), often referred to as actuators (306) that can be used to manipulate the one or more sheath articulation cables and rotate the sheath via one of the actuators 306.

In other embodiments, the "sheath" can comprise a mechanism that collapses but does not buckle.

FIG. 15 also shows that the articulation introducer sheath (102) can have at least one plane and one direction of articulation (here using sheath articulation cable 102*b*) with an axis of rotation located at the control head housing (300, 302, 306).

Put alternatively, in some embodiments, the multi-stage catheter device can further comprise at least one control head (300). This at least one control head may comprise a hollow introducer sheath (102) and insertion funnel (304), configured to admit at least portions of the multi-stage catheter device (e.g., 106, 107, 108, 109), through the insertion funnel and hollow introducer sheath, and into a body lumen.

Figure 16:
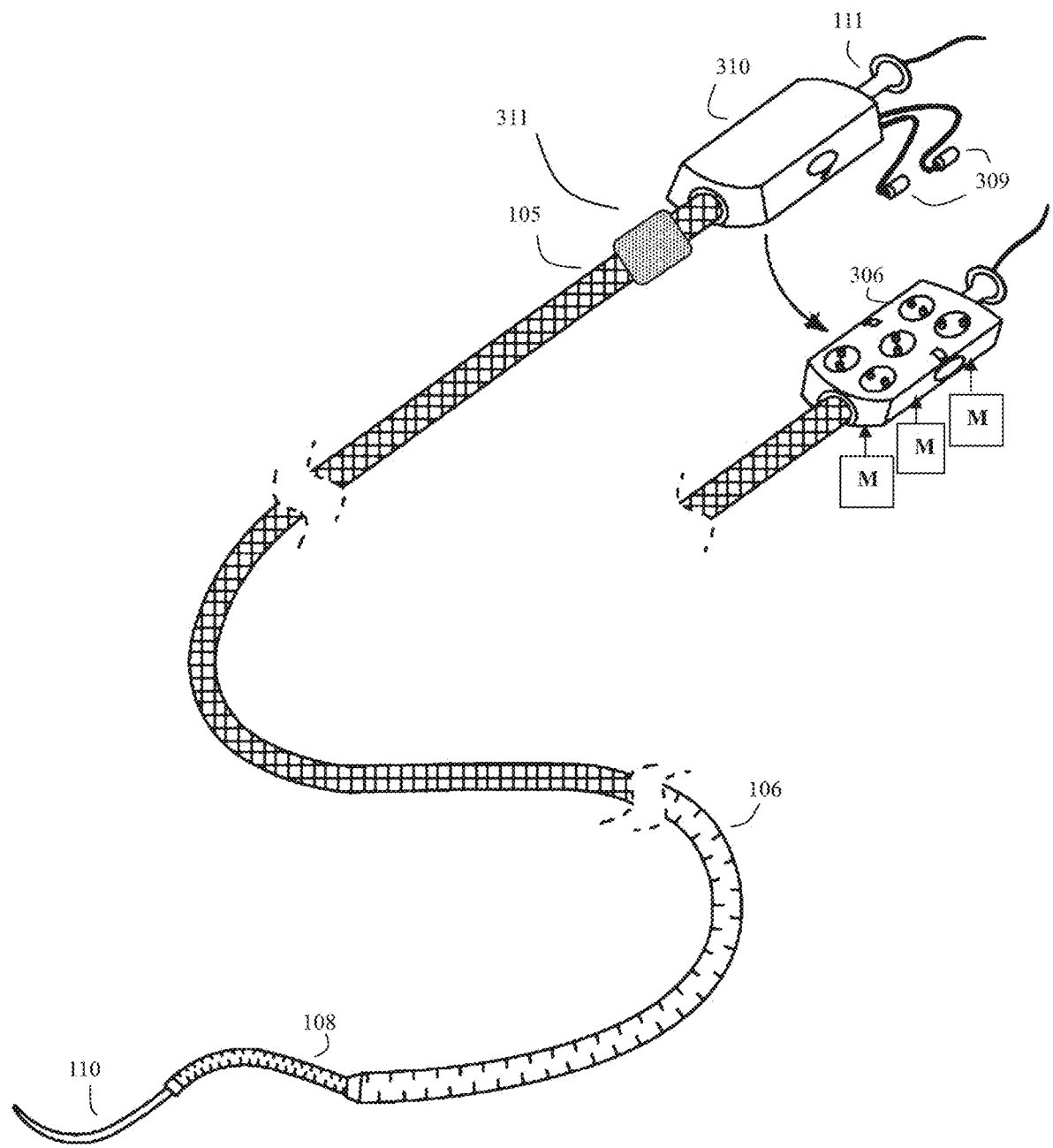
FIG. 16 shows another example of an alternative articulating rotary robotic catheter control head design.

FIG. 16 shows an alternative embodiment of an alternative catheter device control head, here designated as (310), showing other portions of the device, such as an extreme proximal portion (105) that connects to the proximal portion (106), the distal portion (108), and other portions. (Here, (105) can be viewed as an extreme proximal portion of the device that may have different flexibility than the proximal region (106), and although configured to be flexible, need not be necessarily configured to be steerable.) A conduit (111) that connects out to the tool tip after passing (110) through insertion funnel (304) is also shown. This control head may also have additional drive wheels (306) and motors (M), often called actuators, which are often processor-controlled motorized actuators used to control other articulation/steering cables. Other devices shown (309) are connectors and interfaces to operate and control other conduits, such as cameras controlling cameras, lights, sensors, position indicators, electrodes, tool tips, actuators, and the like. Note that for simplicity, the introducer sheath is not shown.

Thus, in some embodiments, the at least one control head (300, 310) may be further configured with at least one computerized drive wheel (306) and motor (M), often called a motor actuator, or sometimes just an actuator. This at least one computerized motor actuator may be configured to perform any of:

Apply variable torque to the hollow torque shaft (200); and/or

Apply variable tension or steering force to any of the at least one proximal stage/portion steering cable (210) and/or at least one distal stage steering cable (220); and/or As per the FIG. 15 introducer sheath discussion, also apply variable tension or steering force to at least one sheath steering cable (102*b*) disposed inside the hollow introducer sheath (102).

As shown in FIG. 15 and FIG. 16, in some embodiments, the device further comprises at least one sheath steering cable (102*b*) connected to a distal end of the sheath. Here, this at least one sheath steering cable is disposed inside the sheath (or on the outside). As previously discussed, this at least one sheath steering cable (102*b*) may be configured to convey sheath off-axis steering force on the distal end of the sheath, causing this distal sheath and the enclosed multi-stage catheter device to move off-axis according to this sheath off-axis steering force.

To manipulate the device, the device may further comprise a sheath off-axis manual force application fixture, and/or a sheath steering cable actuator. These can be configured to further control the sheath off-axis steering force by creating and releasing tension on this at least one sheath steering cable (102*b*).

Figure 17:
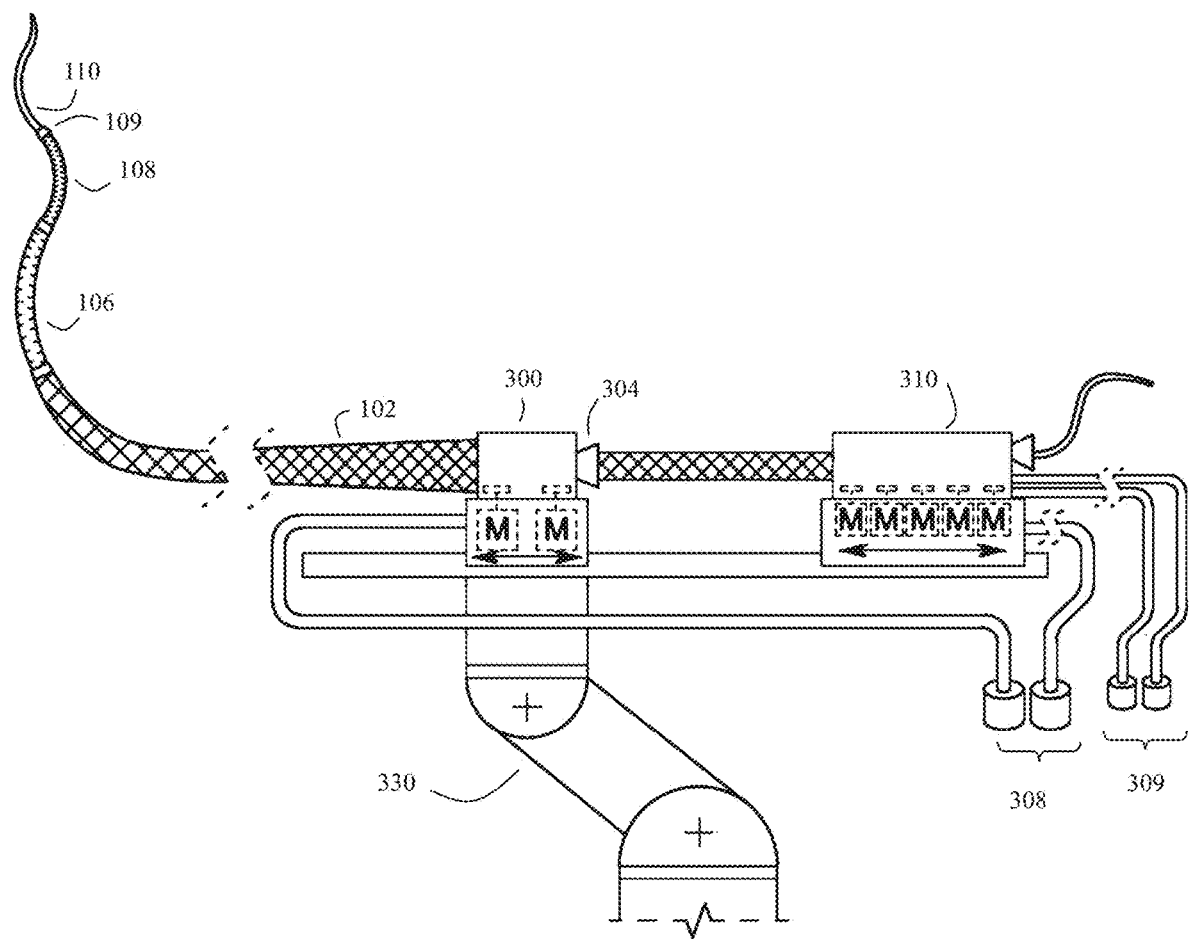
FIG. 17 shows the device implemented on an alternative robotic system where both steerable sheath and steerable bronchoscope control heads are mounted and move independently.

Although the various actuators, such as the previously discussed drive wheel (306) and motor (M) arrangements, may be part of the control head (300 or 310), in some embodiments, the actuator system may have some actuator components, such as the drive wheels (306) mounted on the control heads (300, 310), and have other components, such as the motors (M), mounted on a robotic system, such as a robotic arm. In FIG. 17, the drive assembly for (300 and 310) can traverse linearly along the robotic arm/platform (330) (arrows show direction of travel along one axis).

In some embodiments, the control head (310) or an optional manual grip structure (311) attached to the sheath (102) may be used to apply manual force to the sheath if this is needed.

Note that in some embodiments, the systems shown in FIGS. 15 and 16 may be configured to be either disposable or resposable (able to be recycled a limited number of times) and will often be delivered pre-sterilized and in sterile packaging. The drive wheels (306) can be part of the disposable or resposable system, and the motors (M) that interface with the drive wheels may be configured as part of the durable medical equipment (such as part of a robotic system). After installation, the motor portions (M) may attach and detach from the drive wheels (306).

FIG. 17 shows the device implemented on an alternative robotic system where there are two control heads (300, 310), both are mounted (here on a robotic arm 330), containing blocks of motors "M" that can interface with the drive wheels (306) on the control heads. In this configuration, both control heads are configured to move independently of each other and along the same axis.

In FIG. 17, the alternative computerized motor actuator system comprises two control heads (300, 310). These are mounted on the processor-controlled robotic arm (330). This processor-controlled robotic arm is further configured to move the catheter/bronchoscope device and control a computerized motor actuator system (such as previously discussed drive wheels 306 and motors "M") to guide at least the distal tool plate (109) of the distal end of the distal stage hollow catheter (108) to a target location. Here (308) shows the connectors and/or position encoders to control any of motors "M" and other motors to control the robotic arm's linear stages. As before, (309) shows the connectors and interfaces to operate and control other conduits, such as cameras controlling cameras, lights, sensors, position indicators, electrodes, tool tips, and the like.

Figure 18:
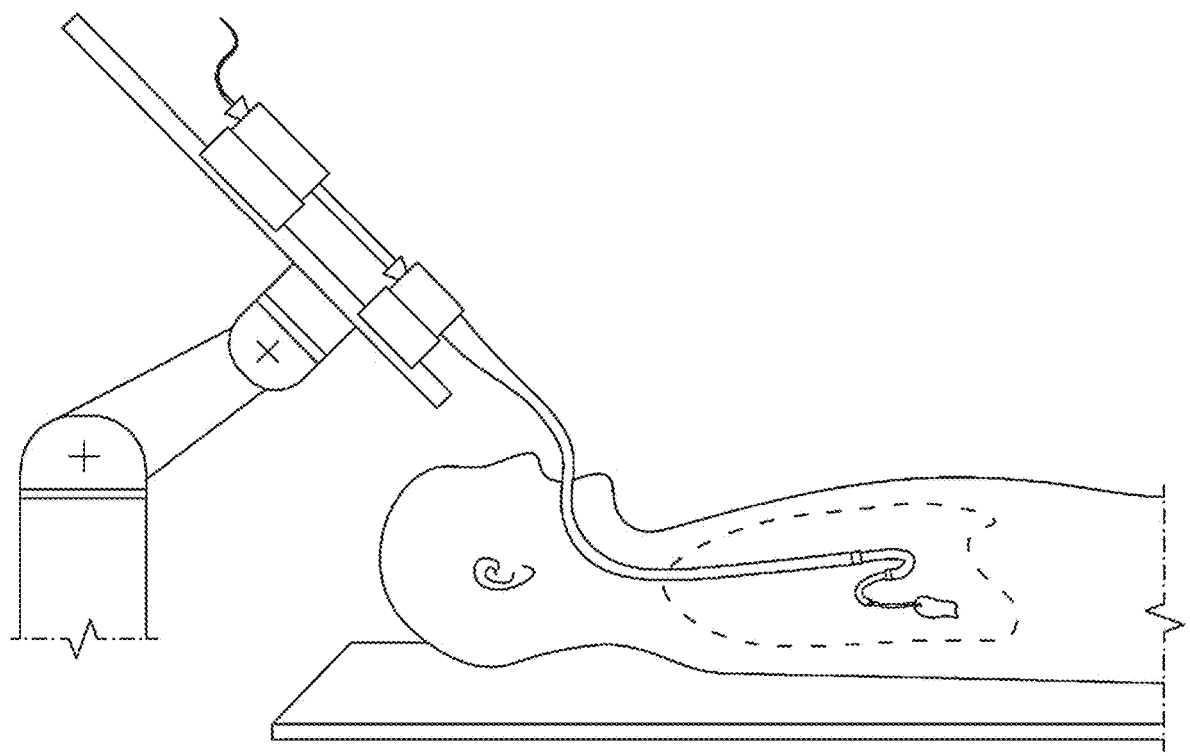
FIG. 18 shows an embodiment where the robotic system applies the catheter to a patient.

FIG. 18 shows an embodiment where the alternative robotic system applies the catheter to a patient.

In some embodiments, at least one control head is mounted on a processor-controlled robotic arm. This processor-controlled robotic arm is configured to move the device and control at least one computerized motor actuator. These are used to guide at least the distal tool plate of the distal end of the distal stage hollow catheter to a target location (inside the patient).

The Optional Distal Tool Head (Distal Plate)

Figure 19:
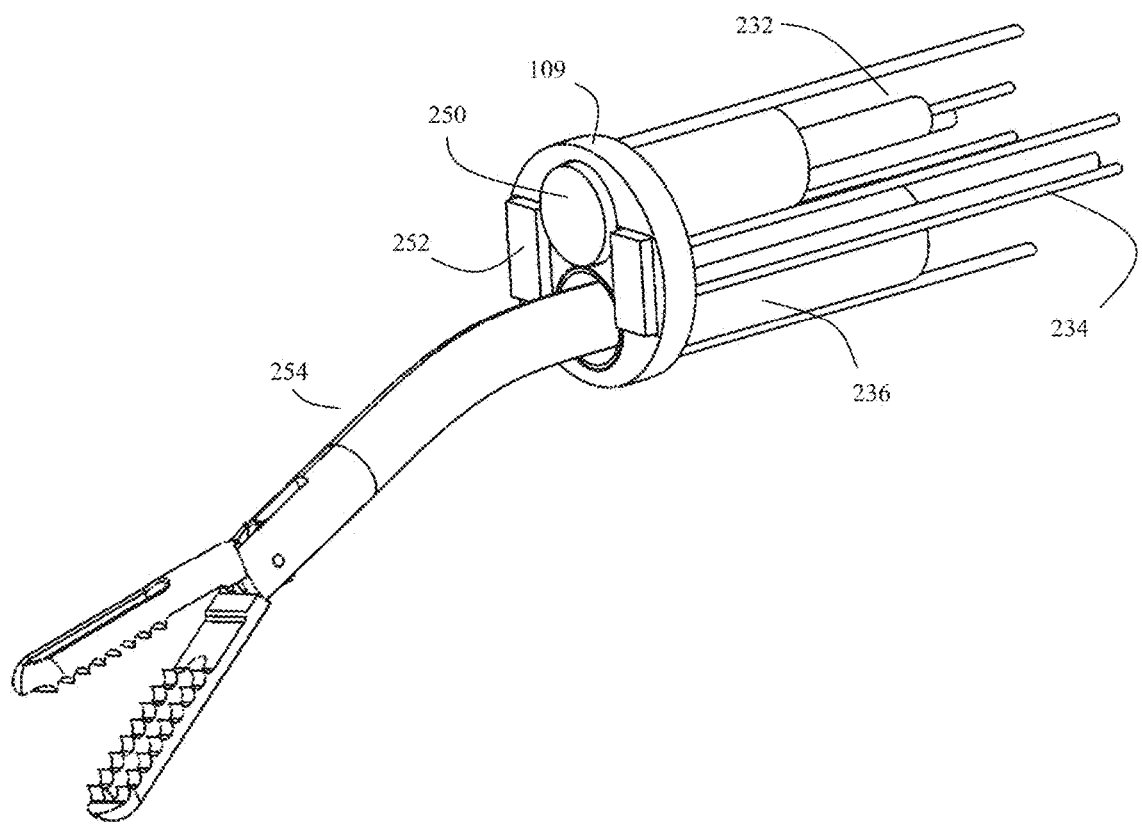
FIG. 19 shows the optional tool head with camera, lighting, and forceps.

FIG. 19 shows an optional distal tool plate (aka tool head 109) with a camera (250), lighting (252) (such as the two LED lights shown), and forceps. Here, the outer wall of the distal portion (108) is not shown (or alternatively, it has been made transparent) so that the various components and conduits (210-240) can be seen.

For example, a camera (250) may be serviced by a first electrical conduit (232), and an LED (252) may be served by a second or third electrical conduit (234). The conduits may also include hollow tubes (236), from which various devices, such as forceps (254), may be routed and controlled.

Although, in FIG. 19, the distal tool plate has an opening that is not as large as the inner diameter of the distal stage hollow catheter, this need not be limiting. In some embodiments, the distal tool plate (109) may be configured with an opening with a distal tool plate opening diameter as large as the inner diameter of the distal stage hollow catheter. In this case, there tool plate is either a ring with softened edges or there is nothing there except for the edge of the tube.

Put alternatively, the distal stage (distal portion 108) often has an optional tool head (109) at its distal end, alternatively called the distal tool plate. Although the examples so far have mostly just shown electrodes (110) as one type of tool, many alternative tools and configurations are also possible. As shown in FIG. 19, this tool head (109) may be alternatively, or additionally, fitted with other devices such as a camera, light source, and a tube or opening for delivering tools, e.g. forceps, brushes, biopsy needles, electrodes, drug delivery needles, and the like.

As previously discussed, although the distal tool plate will usually obscure at least some part of the distal opening of the distal stage hollow catheter (108), alternative embodiments are possible. In some embodiments, the distal tool plate (109) may be configured with a distal tool plate opening diameter that is as large as the inner diameter of the distal stage hollow catheter (108). Note that this large-opening distal tool plate could still be configured to attach to the steering cables (220 . . . 226). See FIG. 9 as an example. Alternatively, the cable can also be attached just proximal of the plate to the inside or outside of 108 by adhering, snap fit, soldering or welding. In this case, depending on this thickness of the catheter wall, a ring or tool plate may not be needed and the edge of the catheter is smoothed and rounded.

In some embodiments, at least some of the conduits may comprise electrical conduits (234) configured to transmit electrical power or electrical signals to probes, sensors, or other electrically activated devices disposed on or passing through the distal tool plate.

Alternatively, or additionally, in some embodiments, at least some of the conduits (234) may comprise optical fibers or hollow tubes configured to convey optical, electromagnetic, or radiofrequency (RF) signals or chemicals to or from devices disposed on the distal tool plate.

Figure 20A:
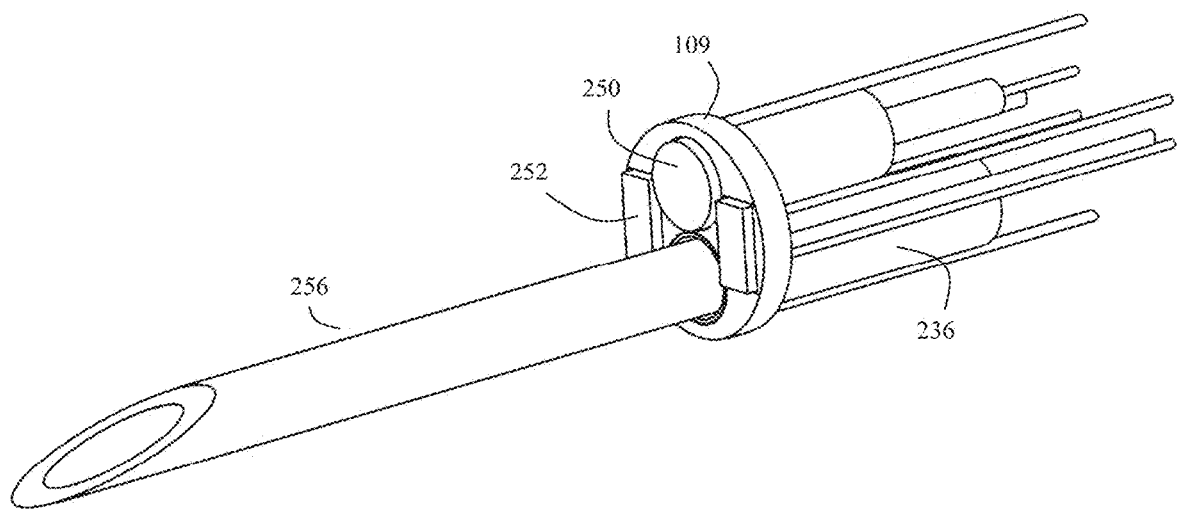
FIG. 20A shows the optional tool head with a biopsy needle.

FIG. 20A shows the optional tool head (109) with a biopsy needle (256).

As shown in FIG. 20A, in some embodiments, at least some of the conduits (such as 236) and the distal tool plate (109) may be configured to obtain tissue biopsies from a target tissue, or to administer therapy to a target tissue.

Figure 20B:
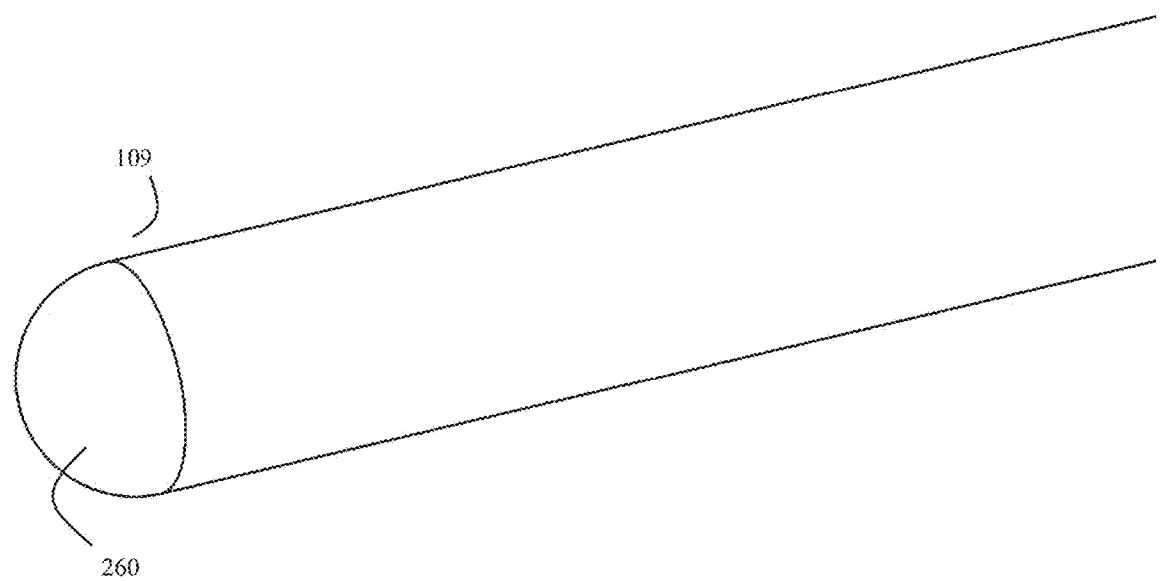
FIG. 20B shows an optional tool head with a closed tip.

FIG. 20B shows an optional tool head with a closed tip (260). Tip can be rounded or pointed and may have more flexibility for use in probing certain anatomies.

Figure 20C:
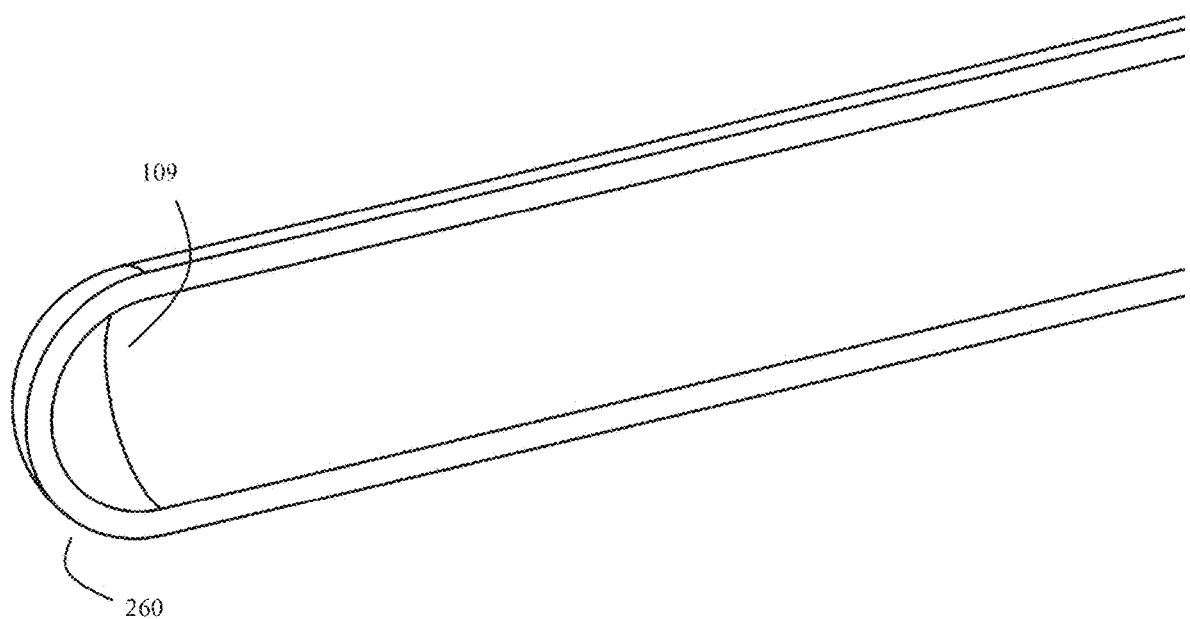
FIG. 20C shows a cross-section of the tool head with a closed tip previously shown in FIG. 20B.

FIG. 20C shows a cross-section of the optional tool head (109) with a closed tip (260) previously shown in FIG. 20B. Various versions of the closed tip are possible, including the round tip (shown), a pointed tip, and a tip with a softened edge. Such tips can be made from conductive or nonconductive materials and used for various purposes, such as electrophysiological monitoring and cardioversion shock therapy. The tip or near the tip in some cases may have very small holes for delivering fluid such as saline or a drug therapy.

Thus, in some embodiments, the most distal tip of the catheter's distal stage/portion need not be hollow. Indeed, depending on the configuration, up to the entire distal stage/portion may be filled with either the same material as the catheter wall itself or other material as desired.

Figure 21:
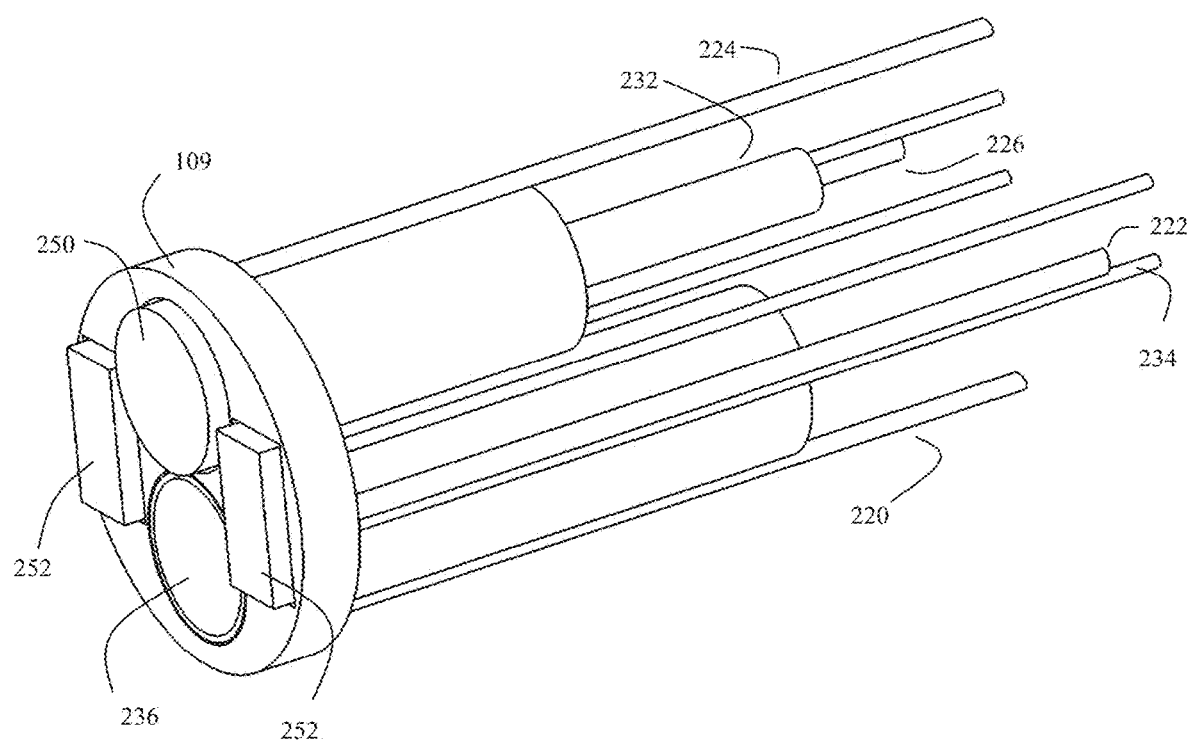
FIG. 21 shows some components that may be integrated into the tool head's optional tool plate.

FIG. 21 shows another view of some of the components and conduits that may be integrated into the tool head's optional tool plate (109). Here, this includes a camera (250), a working channel, which can also be viewed as a hollow tube conduit (236) for delivering tools, and two LED lights (252). Coming off the tool plate (109) are the four previously discussed pull wires, conduits, or cables (220, 222, 224, and 226) for a 4-way distal stage articulation (e.g., X, Y, and Z axis movement, or 3D articulation). The conduit leads (232), (234) for the camera and LEDs are also shown. The camera (250) can be any type of small video camera, including a CMOS, CCD, or fiberscope. The LEDs (252) can be replaced by fiber optics lighting as desired, in which case some of the conduits (such as 234) may be optical fibers.

It will often be useful to use various types of location tracking or imaging devices to determine the location of the device, in particular, the tool plate (109) and/or associated tools while in use. Thus, in some embodiments, any of the distal tool plate (109) or portions of the conduits may comprise any of optical or radiofrequency detectors (coils) or emitters or radio-opaque materials configured to enable a location of the distal tool plate or portions of the conduits to be determined.

As previously discussed, often the optical detector (250) may be a video camera, and the emitter (such as 252) may be configured to emit light for this video camera.

Additional Distal Plate Discussion:

As previously discussed, the optional distal plate, also called the distal tool plate (109), is an optional catheter structural component, often disk-shaped, that may be positioned on the distal end of the distal segment or portion (108). The distal tool plate holds various conduits that send electrical or chemical signals to and from the distal end of the device and the operator or computer at the proximal end of the device. The distal tool plate can also provide access for tools to reach the area of treatment.

As previously discussed, FIG. 21 shows an embodiment of the tool plate (109) that locates and mounts a video camera (250), two LEDs to provide light (252), and a hollow tube conduit (236) that can be used as a tool port.

Alternate embodiments of the tool plate (109) may have two hollow tube conduits (236) providing two tool ports, a camera (250), and two LEDs (252).

In some embodiments, the tool plate (109) may have a tool port (238) providing another type of conduit that can provide a guide feature to introduce bipolar electrodes (such as (110*a* and 110*b*), or other tools, plus a camera (250) and LEDs (252).

Methods of Biopsy, and Delivering Therapy at the Tool Head

In some embodiments, a needle may be used to retrieve a biopsy from a lesion location using the catheter device.

In some embodiments, the system may be used for monopolar therapy methods (here defined as providing therapy using only one probe), such as using the device to inject a drug into a cancerous tumor. Alternatively, other monopolar therapy methods may be used, such as by treating a cancerous tumor with radiofrequency (RF) mono-polar energy from a single electrode to either treat the tumor directly or activate a drug that, in turn, attacks the tumor.

Alternatively, the bi-polar therapy method, here defined as providing therapy using two probes) may be used. Here a drug can be injected into a cancerous tumor using a first probe or needle. There is a return needle that is also injected into the tumor, which may either be used to deliver a second drug, more of the first drug, or return excess drug from the tumor.

As another example of a bi-polar therapy method, a cancerous tumor can be treated with RF (radiofrequency) energy between two electrodes to either treat the tumor directly or activate a drug to, in turn, attack the tumor. Alternatively, bipolar RF energy may be used to treat a tumor by activating a payload comprising a therapeutic. In this case, two (or more) electrode needles are spread out into the tumor.

Yet another example, a tumor can be injected with a single needle, and this same needle can act as a first electrode to deliver RF energy. Here, the head plate (109) or the body of the catheter (108) can act as a second electrode. Thus, with this arrangement, an electrode can be exposed at the front of the catheter, and bi-polar RF energy can return through the body of the catheter.

Drive Methods, Crawling

Figure 22A:
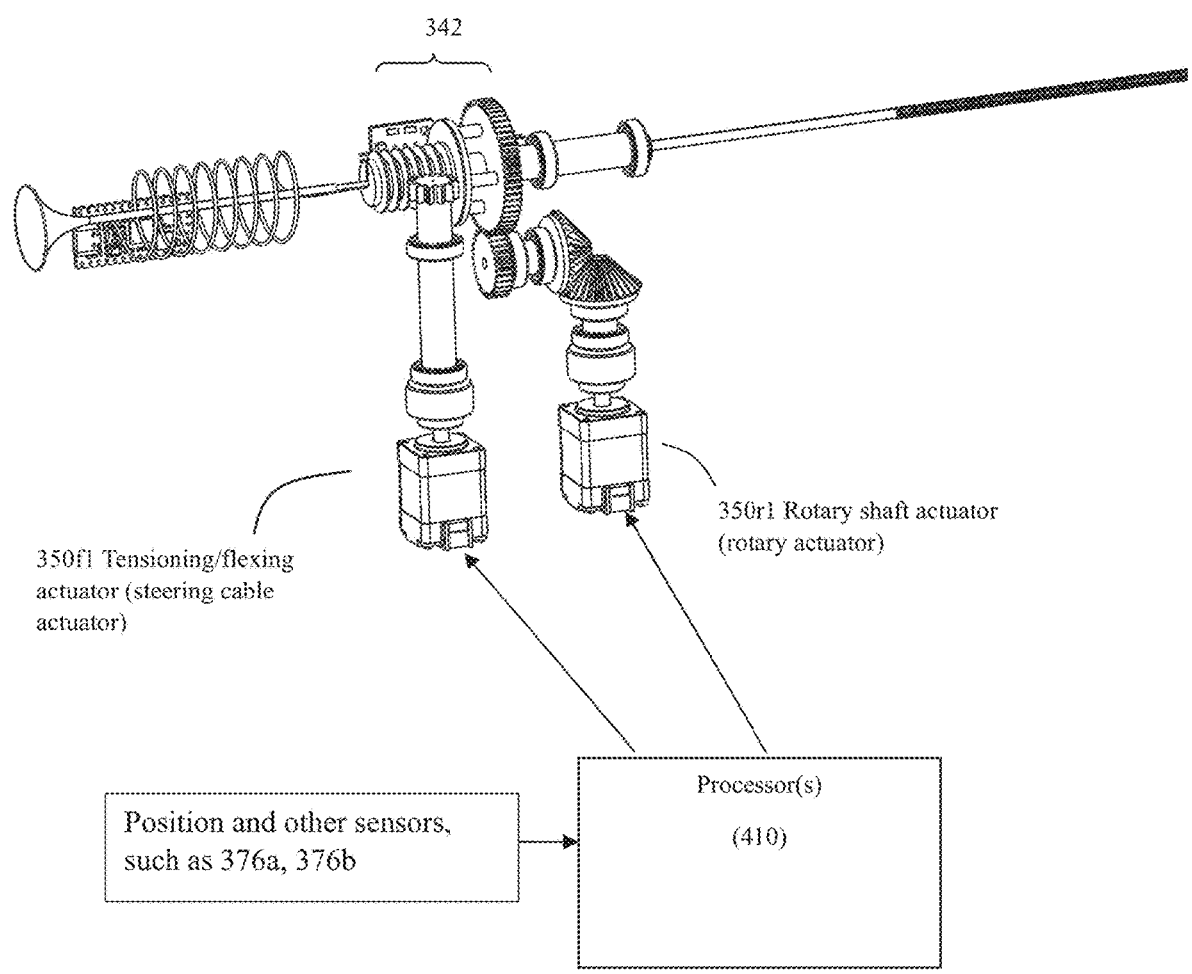
FIG. 22A shows how the catheter steering device can be driven, showing the rotary shaft actuator, the steering cable actuator, and an optional control processor.
Figure 22B:
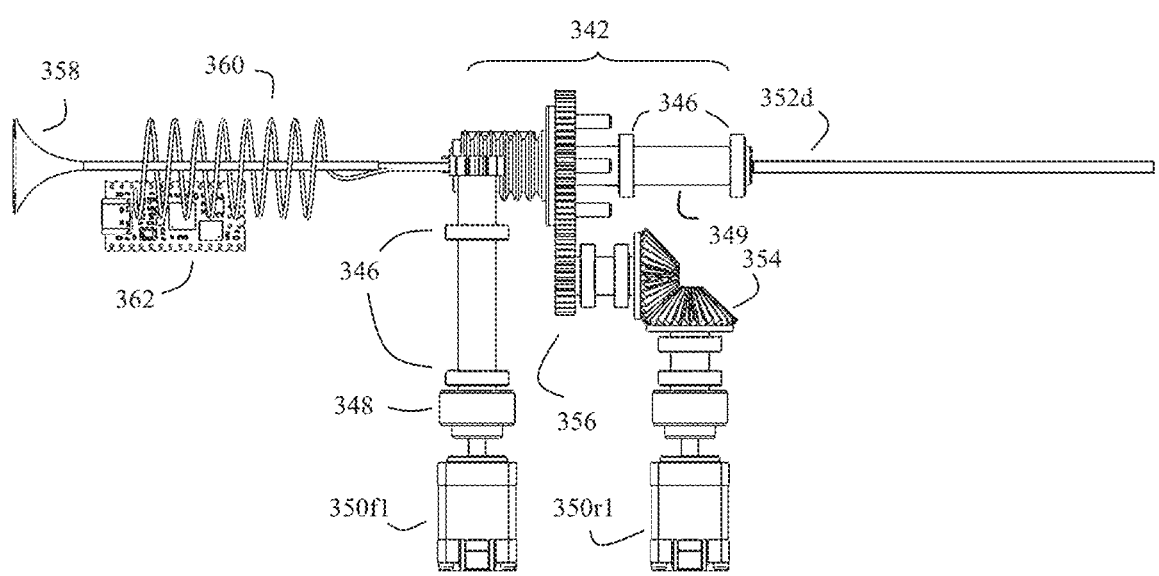
FIG. 22B shows further details on how the FIG. 22A robotic drive system can operate, focusing on how the system can rotate and steer a one-stage catheter.
Figure 22C:
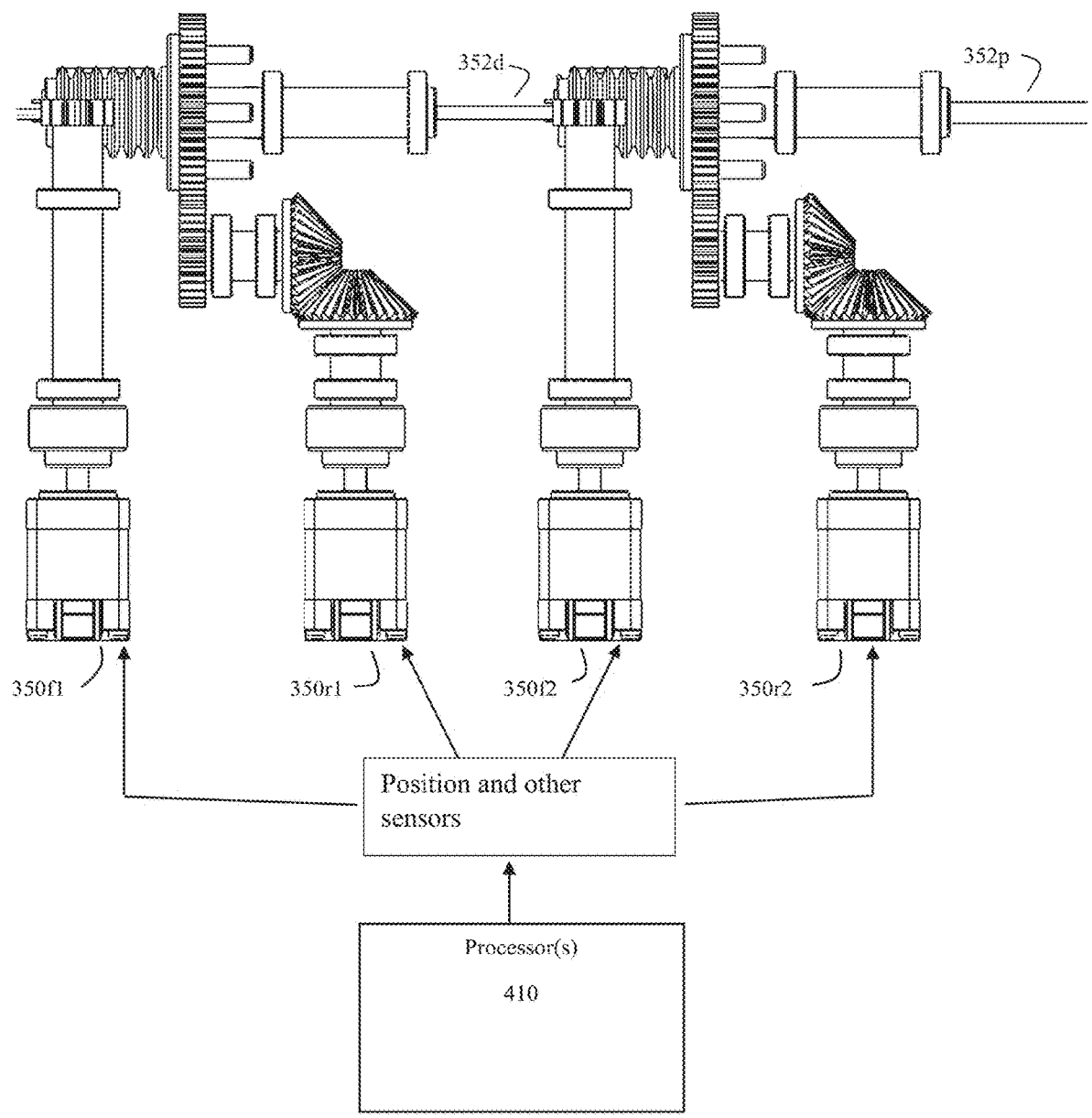
FIG. 22C shows more details of how the mechanical drive system can operate to independently rotate and steer two sections of a dual-stage catheter device.
Figure 22D:
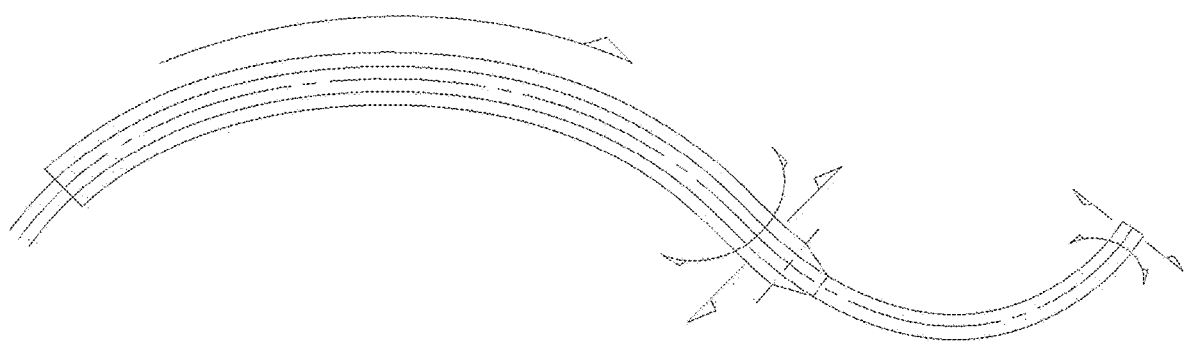
FIG. 22D shows a mode of operation where the system processor can direct the mechanical drive system and a dual-stage catheter to implement a "swimming" motion by means of twisting, spiraling, or a wave motion through rotating or flexing and serpentine.

Referring to FIG. 22D, in some embodiments, the invention's catheter steering device can be configured to enable the catheter to crawl through tissue with an undulating wave which can be set up between the distal (108) and proximal (106) stages with a transition housing and a rotary coupler. This motion, along with the rotation of the distal stage (induced by hollow torque shaft 200), can produce a crawling or serpentine-like movement. With the spinning distal stage and optionally the proximal stage, while also flexing both stages, the stages can drive further into a body lumen (such as a vessel or bronchi) towards the desired target through a swimming or rotating and serpentine type of motion while "threading" through a vessel for between organs in, for example, the abdominal cavity.

In some embodiments, the device motion may be controlled by one or more processors (410), which drive the actuators/motors (often in a control head) to create a type of wave motion between the distal (108) and proximal stages (106).

Further Discussion

Any of the following instruments may pass through the device to a distal end effector at the device's distal end: cameras and lighting; needle biopsy devices; brush biopsy devices; forceps biopsy devices; debrider biopsy devices; RF coagulation/cutting devices (monopolar, bipolar); probes; sealing devices; and the like. Similarly, the joints and devices described herein may be used or adapted for use in any suitable medical or surgical procedure, including but not limited to: debrider tumor resection, shears tumor resection, delivery of biologics and medications, neural tumor resection, polyp resection or biopsy, breast biopsy, lung biopsy, minimal portal access heart bypass, endoscopic submucosal dissection, transurethral procedures (TURP, bladder tumors) prostatectomy, hysterectomy, stem cell delivery, delivery of arthroscopic tools, knees and hips, and trans nasal procedures (frontal sinus tissue removal, functional endoscopic sinus surgery, etc.). These are only examples, however, and any other end effectors and procedures may be used in various alternative embodiments.

Further discussion of various systems and methods for driving the catheter

As will be discussed, in a preferred embodiment, the invention may be a device, system, or method of actuator-assisted or robotically driving a catheter device for traversing internal body passages. As previously discussed, this catheter device will typically have at least one stage, and may, for example, comprise a distal-stage hollow catheter (108) and a different proximal-stage hollow catheter (106).

In this configuration, one end of the distal stage hollow catheter may be affixed to the end of the different proximal stage hollow catheter by an optional isolation transition coupler (107a, 107a1, 107a2 or junction (107j).

This optional isolation transition coupler, if present, is typically configured to traverse an internal body passage. It typically comprises a transition housing (107a) that may optionally include at least one distal coil stop (107b) for an optional isolation coil. This coupler may be configured to enable one end of the distal stage hollow catheter to attach to the end of the different proximal stage hollow catheter.

The catheter device will further comprise a hollow torque shaft (200), which in some embodiments forms the proximal stage/portion hollow catheter (106). The hollow torque shaft may be attached to the optional isolation transition coupler (107a) or junction (107j). This hollow torque shaft is configured to convey torque to the coupler or junction, and the distal stage/portion hollow catheter (108).

In some embodiments, the catheter device may further comprise at least one distal stage/portion steering cable (220). This cable is connected by and through the optional isolation transition coupler (107a). This at least one distal stage steering cable can be disposed either inside or outside the proximal stage hollow catheter (106) or hollow torque shaft (200). At least one distal stage steering cable (220) is configured to convey the distal stage steering force to the tool plate (109) or far distal end of catheter, causing the tool plate or distal end and the distal stage hollow catheter (108) to move (e.g., flex) according to the distal stage steering force.

The hollow torque shaft (200), distal stage/portion hollow catheter (108), and optional isolation transition coupler (107a) typically further comprise a working channel (See FIG. 13, 228) configured to convey a plurality of conduits through the proximal stage hollow catheter and the distal stage hollow catheter to at least a distal tool plate (109) mounted on a distal end of the distal stage hollow catheter (108).

In a preferred embodiment, at least some of the conduits comprise at least one distal stage steering cable (220) that is connected to the distal tool plate (109) on the distal end of the distal stage/portion hollow catheter. This at least one distal stage steering cable (220) is configured to convey distal stage steering force on the distal tool plate (109) or distal end of catheter. This causes the distal tool plate or distal end of catheter and the distal stage catheter to further move (e.g. flex or unflex) according to the distal stage steering force.

In terms of a device, system, or method of driving the above catheter, expressing the invention in methods format, the invention will typically comprise a catheter steering device configured to use actuators to flex and unflex the end of the distal stage/portion hollow catheter, while also rotating at least portions of the catheter. This can be done by using at least one distal stage tensioning actuator (for example, any of 350/1, 350a/1), to create and release tension on at least one of the distal stage steering cables (220) and at least one rotary actuator 350r1 or 350r2. This is typically done while also rotating the at least one distal stage tensioning actuator and the at least one distal stage steering cable via at least one rotary actuator in a 1:1 ratio or synchronously with any rotation of the torque shaft (200) (which attached/adhered to the rotary actuator), which is coupled by the optional isolation transition coupler (107a) or junction (107j), or directly (for a one stage catheter) to the connected distal stage hollow catheter (108) where the steering cable attaches.

Driving Mechanisms:

In some embodiments, the catheter device may further comprise at least one distal stage/portion tensioning actuator (350/1) configured to flex and unflex the end of the distal stage hollow catheter by creating and releasing tension on at least one of the distal stage steering cables (220), A key aspect of this embodiment is that this at least one distal stage/portion tensioning actuator and the least one distal stage steering cable (220) rotated via the at least one rotary actuator in synchrony (such as an approximate 1:1 ratio) with any rotation of the distal stage/portion hollow catheter (108). Since, in a preferred embodiment, the distal stage/portion catheter (108) is rotated by the proximal stage/portion catheter (106) and torque shaft (200), this means that the distal stage steering cable (220) is rotated in an approximate 1:1: ratio with any rotation of the torque shaft (200) by the rotary actuator. Thus, suitable mechanisms should provide this synchronized steering cable actuation (220) and catheter rotation.

FIG. 22A shows an example of how the catheter steering device can synchronously drive the catheter. In this embodiment, the invention's robotic system (catheter steering device) uses both rotary torque mechanisms and linear actuation mechanisms. These two types of mechanisms (342) are coupled together to produce both rotary motion and linear motion such that the steering cable is always moving along with the catheter (and its distal attachment point). In some embodiments, multiple rotary torque mechanisms and linear actuation mechanisms (e.g., multiple iterations of 342) may be ganged together to operate multiple tensioning cables and/or create multiple rotary degrees of freedom simultaneously.

In some embodiments, the catheter steering device may move the optional isolation transition coupler (107*a*) or junction (107*j*) by using a different proximal stage tensioning actuator to create and release tension on at least one of the at least one optional set of proximal stage steering cables (210). Again, this is done while also rotating this optional set of proximal stage steering cables (210) in a 1:1 ratio with any rotation of the proximal stage/portion hollow catheter and the distal stage/portion hollow catheter, often by using another gang of linear actuators and rotary drivers similar to 342.

FIG. 22B shows further details showing how this robotic drive system (342) can operate. Each drive section may further comprise bearings (346), distal and/or proximal drive body shafts (349, 347), optional motor drive couplers (348), and motors/actuators. In some embodiments, these motors/actuators are electromagnetic motors/actuators, often controlled by suitable processors and sensors.

In the single gang option shown, the rotation of the proximal portion of the catheter torque shaft (108/200) can be controlled by a rotary shaft actuator (350*r*1), while the movement of the distal stage steering cable (220) (or tensioning cable) can be controlled by the distal stage flexing actuator (350*f*1). Because, in this embodiment, the distal stage (108) is firmly coupled to the proximal stage/rotary shaft (106/200) by the optional isolation transition coupler (107*a*) or junction (107*j*), rotation of both the distal stage/portion and the proximal stage/portion is controlled by the same rotary shaft actuator (350*r*1).

Thus, the motors/actuators include "tensioning motors/actuators" (350*f*1) and "rotate motors/actuators" (350*r*1). Other components can include torque shafts (200), potentially the outside of the proximal portion of the catheter (106), miter gears (354), and other types of gear or belt drive arrangements (356). Additional components may include an insertion funnel or lure lock device (358), optional electrical wire coils for camera or therapy devices (360), and other electronic components such as sensors and drive circuitry (362).

As will be discussed shortly, the "tensioning motors/actuators" (350*f*1) are generally configured (in some embodiments with suitable gear or belt drive assemblies) to "flex" or "bend" or "steer" at least the distal stage/portion of the catheter, usually by controlling tension on a suitable steering cable such as (220). By contrast, the "rotate motors/actuators (350*r*1) are generally configured (in some embodiments with suitable gear or belt drive assemblies) to rotate that particular steering cable, usually in conjunction with other rotations of the catheter device (e.g., torque shaft rotations 200), to prevent the various cables from tangling with each other as portions of the catheter device rotate (as required to traverse various body passages).

Definition: Those mechanisms convert the force between various processor-controlled electromagnetic actuators into a desired mechanical movement are generally defined as "contacting mechanisms." Here, a "gear or belt drive assembly" can be a specific type of contacting mechanism, but other contacting mechanisms that don't use gears or belt drive may also be used. The contact mechanisms can be of two types off-axis or inline with the Axis of Rotation defined at the motor drive axis where the mechanical drive system rotates at least one or more catheter stages.

In some embodiments, the invention may also comprise using at least one distal stage tensioning actuator (350*f*1) and at least one contacting mechanism. These actuators often comprise at least one processor-controlled (410) electromagnetic actuator. To assist in precise movement, often at least a motion or position sensor (e.g., 376*a*, 376*b*) I could not find (412) may be analyzed by this least one processor during this process to control one or more actuators. In some embodiments, the actuator(s) may have built-in motion or position-sensing ability, in which case the sensor(s) may further comprise such built-in sensors.

As shown in more detail in FIGS. 22A and 22B, the Axis of Rotation (352*d*) for all catheter stages is defined at the motor drive axis where the mechanical drive system rotates at least one or more catheter stages.

Put alternatively, in some embodiments, the catheter steering device may comprise at least one distal stage tensioning actuator. This distal stage tensioning actuator may comprise at least one contacting mechanism (such as a gear or belt drive assembly), at least one electromagnetic actuator (350*f*1, 350*f*2), and at least one processor-(410) configured to control at least one electromagnetic actuator. Additionally, in a preferred embodiment, the catheter steering device comprises at least one motion or position sensor such as (376*a*, 376*b*). Here, the at least one processor (410) is further configured to use input from the at least one motion or position sensor to control this at least one electromagnetic actuator.

In some embodiments, as previously discussed, the at least one contacting mechanism comprises at least one gear or belt drive assembly (e.g., any of 354, 364, 366, 368, 370, 375, as shown in FIG. 22B). Further, at least portions of this gear or belt drive assembly may be configured in a disposable or resposable cartridge that can be reversibly coupled and decoupled from the at least one electromagnetic actuator such as 350*f*1, 350*f*2.

Figure 31A:
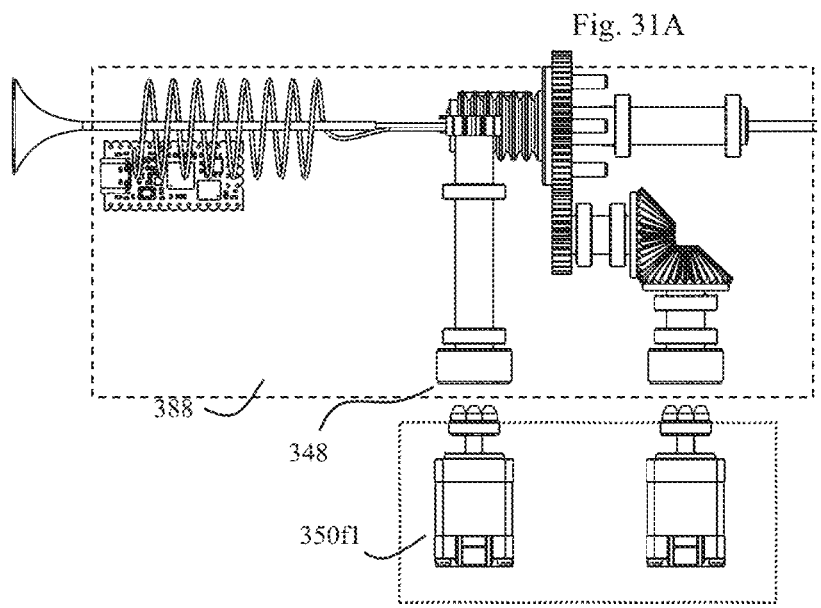
FIG. 31A shows how a disposable housing or cartridge may contain the proximal drive side (or gear train) of the multi-stage catheter driving assembly.

The disposable and resposable aspects are discussed in more detail in FIG. 31A.

FIG. 22B shows more details of how a mechanical drive system version of the invention's catheter steering device can operate to rotate various sections of the catheter device.

As previously discussed, in a typical embodiment, at least some, and often all, of the various actuators (such as 350*f*1, 350*r*1) may be electromechanical actuators. These will typically be driven under processor control by one or more processors (usually one or more microprocessors (410). The microprocessors, in turn, will usually receive input from one or more sensors ( ) such as the various sensors (376*a*, 376*b*), which will be discussed shortly.

Although electromagnetic actuators are often given as a specific example, other actuators, such as electro-active nitinol and polymers, air-driven actuators (pneumatic actuators), or fluid drive actuators, may be used.

As shown in more detail in FIG. 22C, the Axis of Rotation (352*d*, 352*p*) for all catheter stages is defined at the motor drive axis where the mechanical drive system supports and rotates at least one or more catheter stages.

FIG. 22C shows more details of how the mechanical drive system can operate to rotate various sections of a multi-stage catheter device, such as a dual (two-stage) catheter device (using a transition housing and rotary coupler between catheter stages).

As previously discussed, in a typical embodiment, at least some, and often all, of the various actuators (such as 350*f*1, 350*r*1, 350*f*2, 350*r*2) will be electromechanical actuators. These will typically be driven under processor control by one or more processors (usually one or more microprocessors (410). The microprocessors, in turn, will usually receive input from one or more sensors ( ) such as the various sensors (376*a*, 376*b*), which will be discussed shortly.

Although electromagnetic actuators are often given as a specific example, other types of actuators, such as electro-active nitinol and polymers, magnetic actuators, air-driven actuators (pneumatic actuators), or fluid drive actuators (hydraulic actuators), are not disclaimed.

FIG. 22D shows a mode of operation where the system processor can direct the invention's catheter steering device and a dual-stage catheter to implement a "swimming" type motion.

In this example, the processor (410) uses a robotic drive algorithm to drive the various actuators (e.g., 350*f*1, 350*r*1, 350*f*2, 350*r*2) to create a wave between the catheter's distal and proximal stages. Both the proximal and distal stages are rotating/threading at the same rate, or a different rate or with only the distal stage rotating. The net effect is to create a "swimming" motion that can help propel the catheter forward. Both the proximal and distal catheters can flex and rotate in a coordinated motion such that a spiraling effect can help to "motor" and steer the catheter. The distal section can, for example, rotate and flex at a faster rate than the proximal section and vice versa. This movement, especially at the distal section, could help with dissecting the tissue planes while the motion at the proximal section would help in breaking friction/stiction and providing forward momentum for the distal section. Because there are challenges to pushing a thin catheter between organs outside of the natural pathways, having the ability to spiral, flex and push a catheter in a controlled fashion would enable the catheter to pull itself distally or "swim" while being pushed proximally. This is a distally active catheter and over long distance not prone to the failures of traditional catheters where the outcome is like pushing a "floppy noodle" with no ability to precisely reach the target. This type of motion for a dual-stage catheter could be used to move between organs in the abdominal cavity. An application would be passing through the abdominal laparoscopically with an ultra-thin micro-invasive multi/dual-stage catheter with at least one transition housing and a rotary coupler. This application could be for applying a distal anchor to dock the catheter to a tumor on the pancreas for biopsy and further delivering therapy.

Thus, in some embodiments, the catheter steering device's at least one rotary actuator comprises a proximal stage rotary actuator (such as FIG. 22C-350*r*2) and a distal stage rotary actuator (such as FIG. 22C-350*r*1). Further, the device's at least one steering cable can comprise at least one proximal stage steering cable (210) and at least one distal stage steering cable (220). Additionally, the device's at least one steering cable actuator can comprise at least one proximal stage steering cable actuator (such as FIG. 22C-350*f*1) and at least one distal stage steering cable actuator (such as FIG. 22C-350*f*2).

Here, as previously discussed in FIG. 22D, the at least one proximal stage rotary actuator, at least one distal stage rotary actuator, at least one proximal stage steering cable actuator, and at least one distal stage steering cable actuator are configured to be controlled by a processor (410) configured to manipulate these actuators to operate in a processor coordinated mode to propel the catheter with any of twisting, spiraling, or wave motion.

Figure 23:
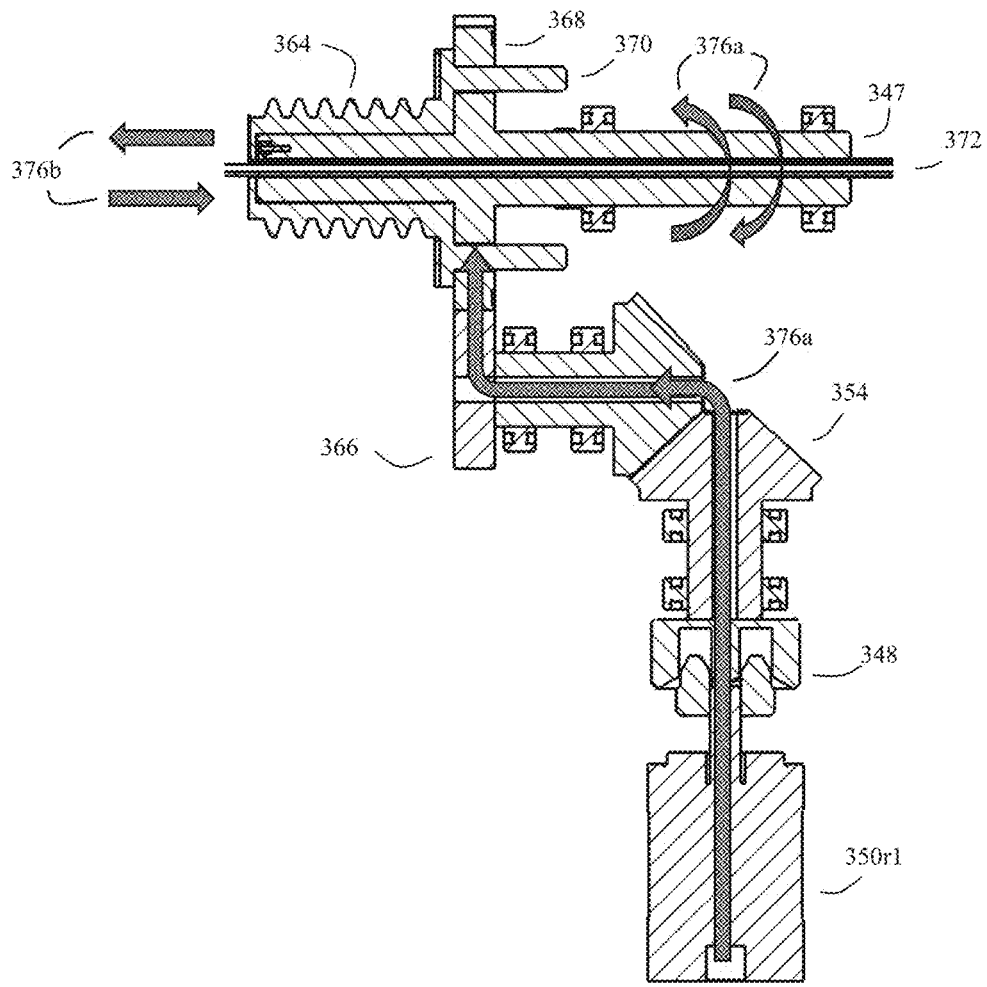
FIG. 23 shows a cross-section of a catheter steering and rotating device previously shown in FIGS. 22A and 22B.
Figure 24:
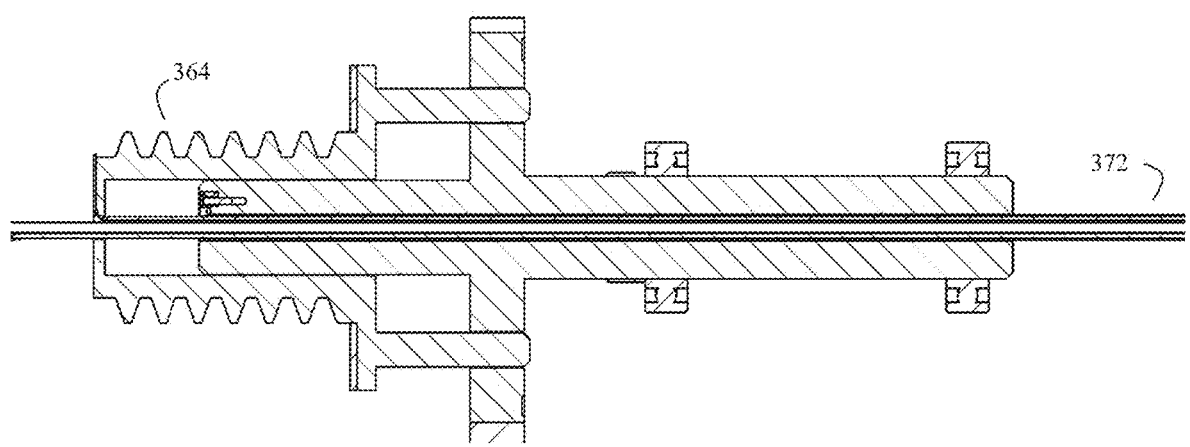
FIG. 24 shows a close-up cross-section of the drive rack, transfer gear, rotary drive gear and sliding drive pins portions of the device previously shown in FIGS. 22A, 22B, and 23.

FIG. 23 and FIG. 24 show how the Distal Linear Circular Gear Rack (364) slides along the Drive Body Shaft. These figures also show how the Distal Circular Gear Rack is driven by the Rotary Drive Gear, which is solidly connected to the Drive Body Shaft, which in turn is adhered to the Proximal Torque Shaft of the catheters. In this embodiment, the Linear Circular Gear Rack slides along the Drive Body Shaft, while it is coupled to drive pins sliding through the Rotary Drive Gear. This coupling keeps the steering cable (220) from becoming twisted while being actuated by the Linear Circular Gear Rack while rotating 1:1 with the Drive Body Shaft (e.g. torque shaft 200). There are many other ways to slidably mate the Linear Circular Gear Rack to the Drive Body Shaft for transferring torque. These include as keyway devices, flats (single, double . . . hex, etc.), pins, splines, or other mechanisms. The slidable mate (e.g., pins 370 or another mechanism) allows transverse movement along the rotating member or axis of rotation while constraining movement radially from the rotating member or axis of rotation.

FIG. 23 shows a cross-section of the device previously shown in FIG. 22A and FIG. 22B. This shows a linear, circular drive rack (364), transfer gear (366), rotary drive gear (368), optional sliding drive pins (370) and a suitable steering cable (372), such as the distal stage steering cable (220) previously discussed. Note that, in some embodiments, there may be a plurality of versions of this device, one (342) configured to operate the distal portion of the catheter, and others configured to operate additional steering cables or sheaths.

The large arrows show the power flow and the various directions of motion of the respective components during operation. As can be seen, the device both rotates (376*a*) about its axis (along 372), and also can be commanded to have an axial in and out motion as well (376*b*). The power transmission path from the actuator (350*r*1), through various optional intermediary gears such as (354) and (366), to the rotary drive gear (368) is shown as (376*a*).

Again, the "in and out" motion (376*b*) is used to apply or release tension to a given steering cable (such as 220) that is used to flex or unflex or "steer" at least the distal portion of the catheter. The tensioning of the steering cable during rotary motion should be controlled by maintaining a synchronous rotational match between the steering element and the rotation of the catheter to prevent the steering cables from getting tangled while, for example, various portions of the catheter are rotated to traverse various body lumens, such as by using the previously discussed hollow torque shaft (200).

Put alternatively, in some embodiments, the rotary drive gear (368) rotates the drive body shaft (347), which is connected to the outer proximal tube body and torque shaft (e.g. 347 to 106/200).

In some embodiments, the distal linear, circular gear racks (364) (distal 342) rotate while also coupling their rotation to the sliding drive pins (370). These gear racks are driven to rotate 1:1 by their respective rotary drive gears (368). While any given linear circular gear rack (364) (distal 342) is rotating, it can be actuated for "in and out motion" or "tensioning motion" (376*b*) along the axial direction (372) by a linear circular pinion gear, (see FIG. 25, 374), which is allowed to slide in the grooves cut in (364) while (364) is rotating and be driving by sliding drive pins (370) on the appropriate drive body shaft.

In this embodiment, rotary motion is directed from the motor/actuator (350*r*1) through a contacting mechanism comprising a motor coupler (348) to miter gears (354), then to the transfer gear (366), and finally to the rotary drive gear (368). In some embodiments, one or more contacting gears such as these may also be termed a "gear assembly."

Note that in some embodiments, the proximal outer tube body (106) may be glued, mounted, or otherwise adhered to its respective drive body shaft (347). In this embodiment, the proximal drive body shaft (347) may be used to directly turn the proximal outer tube body (106) and torque shaft (200). This controls the rotation of the isolation translation coupler (107*a*) and is conducted directly to the distal catheter portion (108).

Steering cables (220) can cause the distal portion of the catheter (108) to flex or curve in any rotational position.

Note that for such gear driven embodiments, although straight cut gears are shown, other gearing arrangements, such as worm gears, may also be used. Moreover, note that in FIG. 23, although bevel gears (such as 376*a*, 354) can be used to orient the motors, other coupling arrangements may also be used.

FIG. 24 shows a close-up cross-section of the drive rack (364), transfer gear (366), rotary drive gear (368), and sliding drive pins (370) portions of the device previously shown in FIGS. 22A and 22B. This shows more details of how this device accomplishes both rotation and in-and-out steering cable sliding motion. Here the linear circular gear rack (or drive rack) (364) is shown fully extended. The drive rack (364) has pulled the steering cable (220, 210) to a fully flexed state in this configuration.

Figure 25:
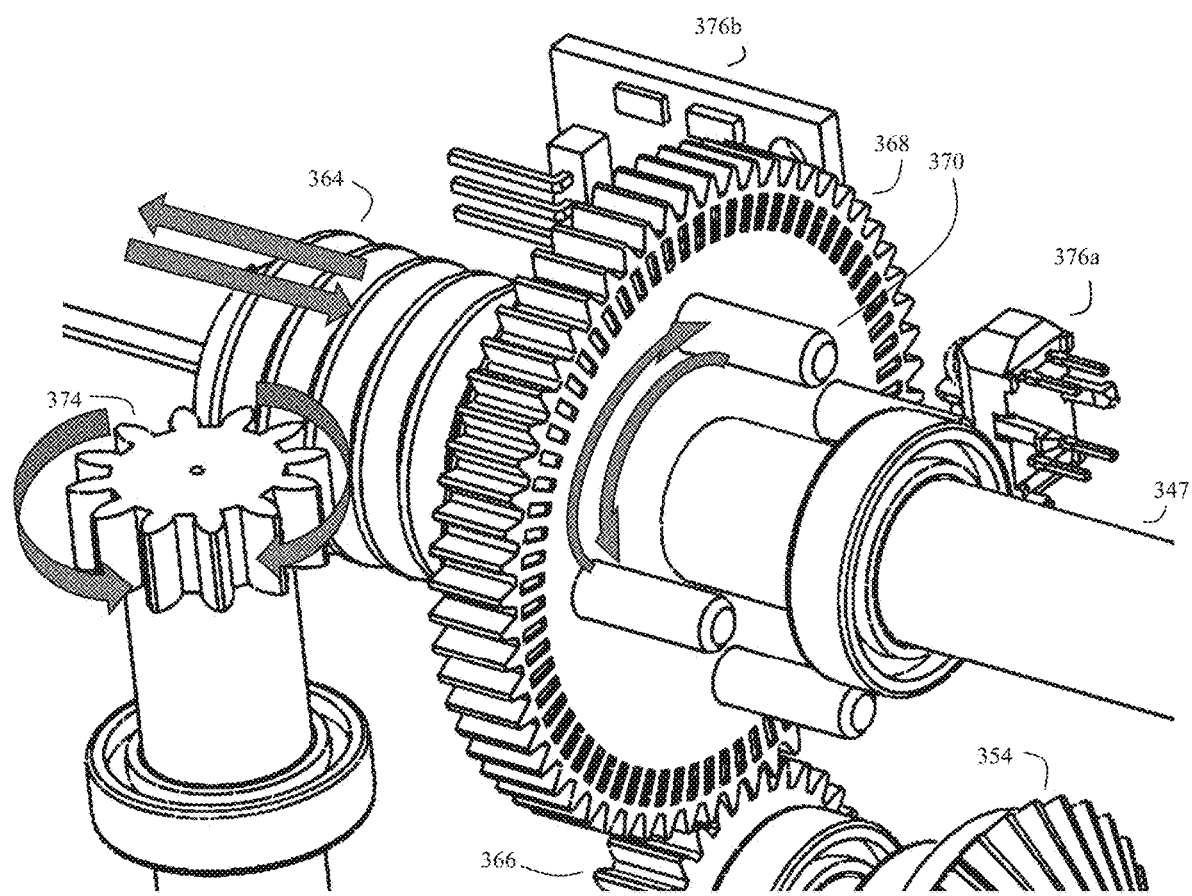
FIG. 25 shows a close-up view of the drive rack, transfer gear, and rotary gear system, as well as an example of how various sensors may be used to control and monitor the position of the drive.

FIG. 25 shows an alternative view showing a non-cross-sectional view of this portion of the system. Optional sensors (376*a*) and sensor electronics (376*b*) are also shown.

FIG. 25 shows a close-up view of the drive rack, transfer gear, and rotary gear system, as well as an example of how various sensors (376*a*, 376*b*) may be used to control and monitor the position of the drive.

FIG. 26 and FIG. 27 show how the rotary position for the Rotary Drive Gear may be tracked with sensors such as optical emitter/detector pairs and edge markings on the face of the gear. The closed loop linear position of the Linear Circular Gear Rack may be sensed by hall-effect sensors or other optical emitter/detector pairs in conjunction with a magnetic or reflective surface. Different types of sensors may also be used.

FIG. 26 and FIG. 27 show the extreme positions of the Linear Circular Gear Rack (364) for a single stage (e.g. 342). It is important to understand this rotary-linear drive in a simplified one-stage/one-catheter situation where the linear actuation rotates directly or approximately 1:1 with the rotary stage. This rotation can go beyond 360 degrees in either direction without limitation and without the linear actuation mechanism causing the pull cables to become twisted, which would even for small amounts would produce unwanted flexing of the distal portion of the catheter. This is an important point because a key objective of the invention is to prevent cable twisting, which can interfere with the function of the catheter device.

FIG. 26 shows the relaxed position where there is no cable tension. FIG. 27 shows the full flexed state where the cable is fully tensioned by the Linear Pinion Gear (374) engaging and driving the Linear Circular Gear Rack (364) with the output flexing the catheter. This can then return to the relaxed state shown in FIG. 26.

FIG. 26 shows one extreme position of the device's linear, circular gear rack (364) (for a single stage such as any of 342). Here, the linear, circular pinion gear (374) has rotated clockwise and, by engaging with a ridge or ridges formed in the drive rack (364), has pushed the drive rack (364) and pins 370 to one furthest extent up against the rotary drive gear (368), thus releasing tension on one of the distal or proximal stage steering cables. Alternatively, the linear circular gear rack (364) could also be used to push a wire or tube to apply a compression force to the steerable catheter section.

FIG. 27 shows a different extreme position of the device's linear, circular gear rack (for the same stage as above). Here the linear, circular pinion gear (374) has rotated counter-clockwise and, again by engaging with a ridge or ridges formed in the drive rack (364), has pulled the drive rack (364) and pins 370 to the other furthest extent thus creating tension on one of the distal or proximal stage steering cables. Here, the system's one or more sensors (376*a*, 376*b*) and processors (410) can again be used to adjust this tension to a desired extent. Alternatively, the linear circular gear rack (364) could also release the push on a wire or tube to lessen compression force at the steerable catheter section.

Figure 28A:
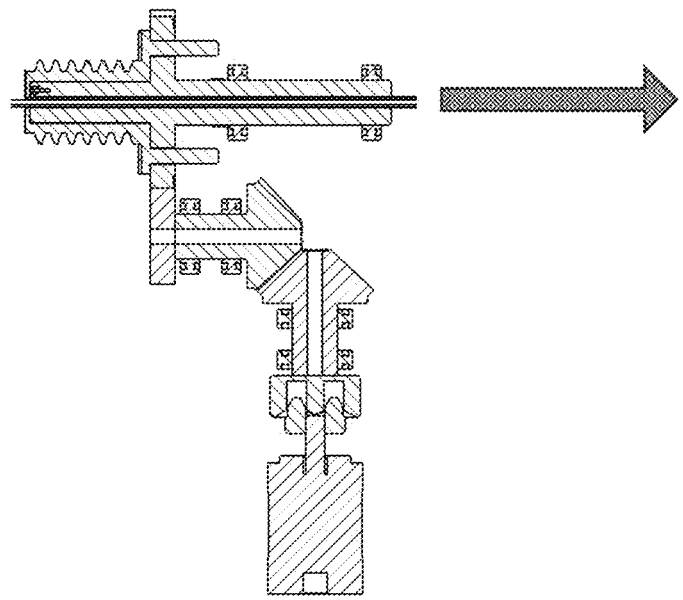
FIG. 28A shows a cross-sectional view of the rotary and linear drive system the steering cable relaxed by steering element contracted.
Figure 28B:
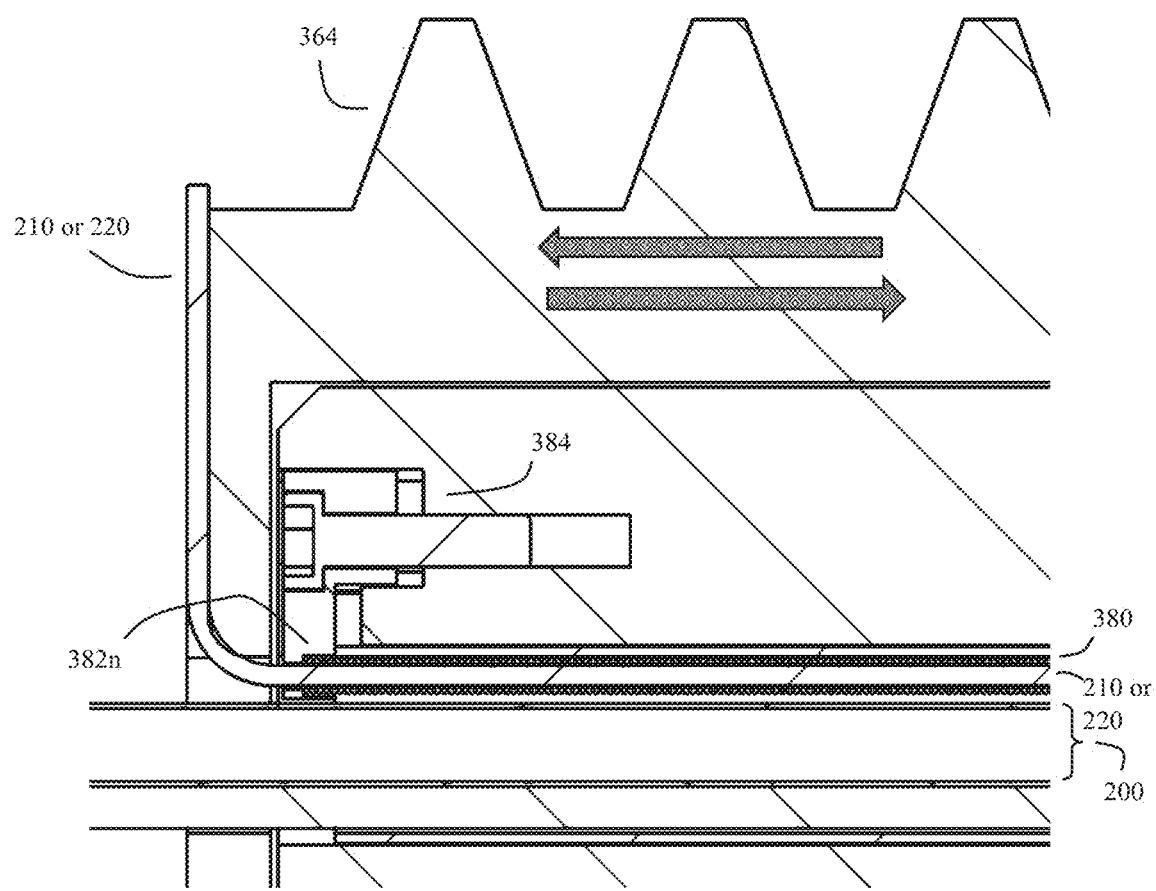
FIG. 28B shows further details of the drive rack previously shown in FIG. 29A.

FIG. 28A shows a cross-section of the rotary and linear drive system. FIG. 28B expands on a portion of FIG. 28A, and shows the position of the drive rack (364) and how the steering cable (220) is positioned as a result of movement of the linear circular pinion gear (374). This figure also shows an optional tightly wound isolation coil (380) that in some embodiments may surround (and shields) a significant portion of its respective steering cable (such as 220). This optional isolation coil (380) is often configured so that it has some extra length between the two optional isolation coil stops, such as (382*n*) and (386*d*). This means that the isolation coil has an uncompressed length that is a bit greater than the neutral axis of the catheter that it resides inside of. This optional isolation coil helps isolate the steering cable (220) tension such that the steering cable (cable under tension) does not create tension force along the entire length of the catheter. Instead, due to the shielding or force-isolation property of the isolation coil (380), the tension force in the steering cable (220) is directed to only the flexible distal section of the catheter that this steering cable is designed to flex or curve.

Note that if no isolation coil is used, the isolation coil stops may also be omitted.

The underlying idea of the optional isolation coil is similar to the principle used on cable-operated hand brakes on bicycles and motorcycles. Mechanically, each isolation coil works by applying an equal but opposite force to its internal steering cable (220). As a result, until the steering cable force reaches its destination at the far distal end isolation stop (386d) where the steering cable (220) then protrudes beyond the isolation stop, the cable force is isolated. The steering cable force ends up being directed on the section catheter after the isolation coil ends (after 386d). This causes the catheter to flex from the point of where the cable is attached (e.g., tooling plate 220t, transition housing, or near far distal edge of catheter tubing) to the isolation coil end (386d).

Note that in FIG. 28A and FIG. 28B, the Linear Circular Gear Rack is not actuated, and the end of the catheter system controlled by that particular steering cable is in a relaxed state (large gray arrow straight).

FIG. 28A shows a cross-sectional view of the rotary and linear drive system. Here the drive system is in a first, "relaxed" state, similar to that shown in FIG. 26. In this configuration, there is lower tension on the distal (or proximal) steering cable, such as (220), and as a result, the relevant distal (108) portion of the catheter tends to be straight (not flexed).

Put alternatively, in some embodiments, each optional isolation coil (380) has an isolation coil compression. At least the near-isolation-coil end (382n) of the isolation coil is attached proximate to its respective flexing actuator in a manner that further enables this isolation coil compression to be adjusted. The device is further configured to adjust this isolation coil compression by a manual isolation coil compression adjuster and/or a compression actuator.

FIG. 28B shows further details of the drive rack (364), previously shown in FIG. 28A. Note that depending on which drive section (distal 342) is involved, then often the proximal portion of the distal steering cable (220) is affixed to the end of the dive rack. As previously discussed, to help prevent mechanical crosstalk between the steering cables and other parts of the apparatus, some or all steering cables (such as 220) may optionally pass through or traverse their own isolation coil (380). This isolation coil is hollow, and the interior of the coil has sufficient diameter so that the steering cable (220) can pass through this hollow interior freely. At the same time, the isolation coil helps to shield or "isolate" the movement of the steering cable (220) from the rest of the catheter device, at least while the steering cable (220) is inside the isolation coil.

As previously shown, this isolation coil, if present, generally runs the entire length of the catheter up the distal coil stop (107b). This distal coil stop (107b) is usually positioned at the isolation transition coupler (107a). From that point, the steering cable (220) then runs the usually shorter distance up the distal catheter portion (108) to its destination (usually at or near the distal tool plate 109, such as 220t, depending on the type of steering cable).

The optional isolation coil has a near end (382n) and a far end (see FIG. 5A, 7A, 10A, far end 386d). The near (e.g., proximal) portion of the steering cable is attached (for example, clamped) to the flexing actuator (here the end of 364). The near end of the isolation cable (382n) is also attached in a manner that allows the steering cable to movably protrude past the near isolation coil end (382n), while blocking the axial movement of the isolation coil at this end. This isolation coil attachment can be done by various methods, such as by an adjustable isolation coil stop screw (384) which can also be used for setting the isolation coil compression. This compression setting can be a very fine adjustment for an isolation coil (or woven sheath, tube, etc.) which is generally tightly wound.

Put alternatively, in some embodiments, at least one distal stage steering cable (220) may be further disposed inside an isolation coil (380) comprising a far-isolation-coil-end (386d) and a near-isolation-coil-end (382n). Here, the far-isolation-coil-end is attached proximate to a distal terminus of its corresponding steering cable in a manner (such as distal coil stop 107b) that allows its corresponding steering cable (220) to movably protrude past the far-isolation-coil-end (386d) while blocking axial movement of the far-isolation-coil-end.

Further, each near-isolation-coil-end (382n) may be attached proximate to its respective flexing actuator in a manner that allows its corresponding steering cable (220) to movably protrude past the near-isolation coil end while blocking the axial movement of the near-isolation-coil-end. In a preferred embodiment, the device is further configured to rotate the at least one isolation coil in a 1:1 ratio with any rotation of its respective steering cable and its respective distal stage. This scheme thus helps or enables the variable tension applied by each respective flexing actuator to be isolated to its respective steering cable while the cable is inside its respective isolation coil.

Note further that, as previously discussed, each isolation coil (380) has an isolation coil compression. Further, the near-isolation-coil end (382n) is attached proximate to its respective flexing actuator in a manner that further enables this isolation coil compression to be adjusted. The device may also be further configured to adjust this isolation coil compression by any of a manual isolation coil compression adjuster and/or a compression actuator.

In FIG. 28B, a detail of the distal drive section (342) is shown, and a portion of the hollow torque shaft (200) is also shown. In some embodiments, according to the invention, at least one torque shaft actuator, such as (350r1) may be used to apply torque to the hollow torque shaft (200).

Figure 29A:
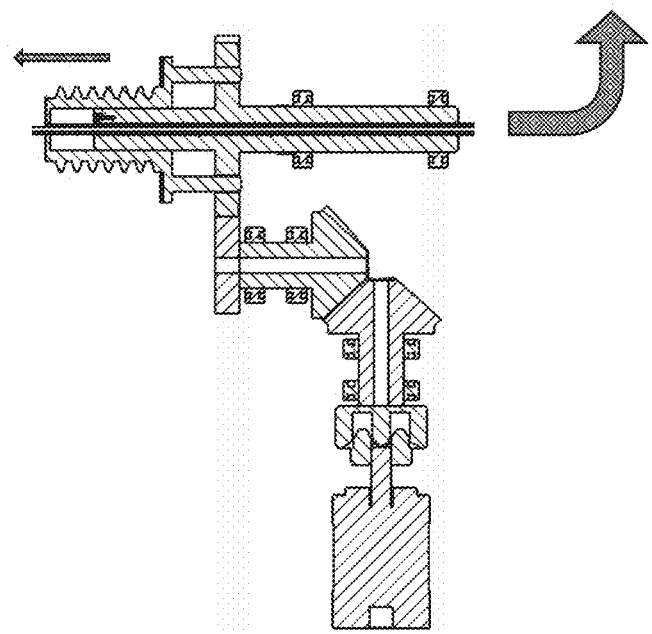
FIG. 29A shows a cross-sectional view of the rotary and linear drive system.
Figure 29B:
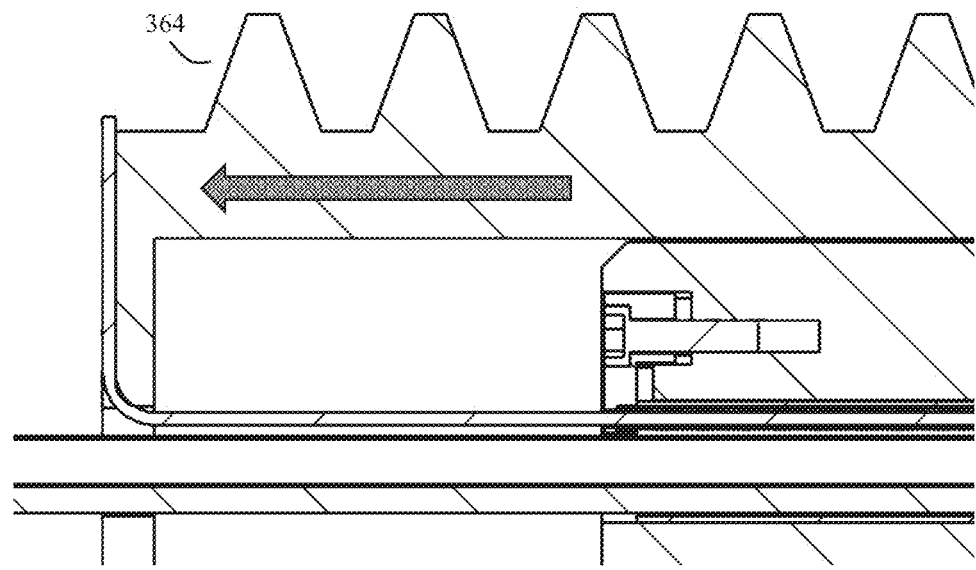
FIG. 29B shows further details of FIG. 30A.

By contrast, in FIG. 29A and FIG. 29B, the Linear Circular Gear Rack is actuated, and the catheter system is in the flexed state (large gray arrow turned up)

FIG. 29A shows a cross-sectional view of the rotary and linear drive system. Here the drive is in a second "actuated or flexed" state. Here the relative motion of the flexing actuator (364) has moved the distal or proximal steering cable (220) towards full tension. As a result, this steering cable tugs on its respective other end of the catheter, causing either the outer distal (108) catheter tube to become fully flexed or curved.

FIG. 29B shows further details of FIG. 29A. In the relaxed state shown in FIG. 28A/28B or flexed state shown in FIG. 29A/29B, the distal drive section (342) can be rotating along with the respective distal or proximal catheters at any rotational position.

Figure 29C:
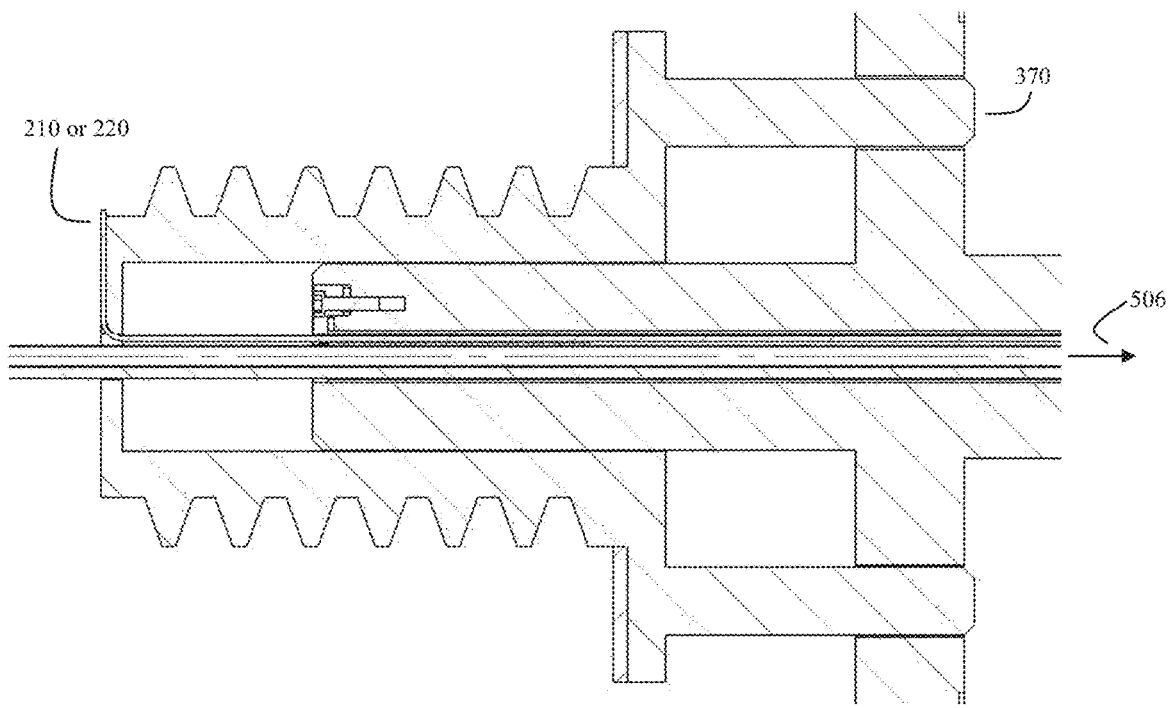
FIG. 29C shows how the steering cable may be located relative to the axis of the catheter (projected from the axis of rotation) the steering cable tension by steering element extended.

FIG. 29C shows how the steering cable (210 or 220) may be located relative to the axis of the catheter (506). In this embodiment, the steering cable and steering element are configured to rotate synchronously with the catheter and/or revolve around the axis of the catheter (506). At the proximal end the axis of the catheter is defined by the Axis of Rotation. This happens when the steering cable is in a relaxed state and when the steering cable is under tension due to an actuation force. Thus, from the far distal attachment to the far proximal attachment of the steering cable to the steering actuator, the location of the cable is designed to maintain a synchronous relationship between the steering actuator and the far distal point of the catheter. This keeps the cable from tangling up (interfering with its steering function) while the rotary actuator rotates the catheter. Note, the location of the steering cable relative to the axis of rotation can vary depending on how the other conduits are arranged. In some instances, the steering cable can run inline with the axis of the catheter. Thus, the steering cable is revolving with the axis of rotation.

Note that in this configuration, for any rotation caused by the rotary actuator, the sliding drive pin (370) and gear arrangement is configured to rotate the steering cable (210 or 220) along with the portion of the catheter that is rotating. The sliding drive pins (370) do this by coupling the actuator with the steering cable actuator, in a slidable manner, using direct mechanical contact.

Figure 29D:
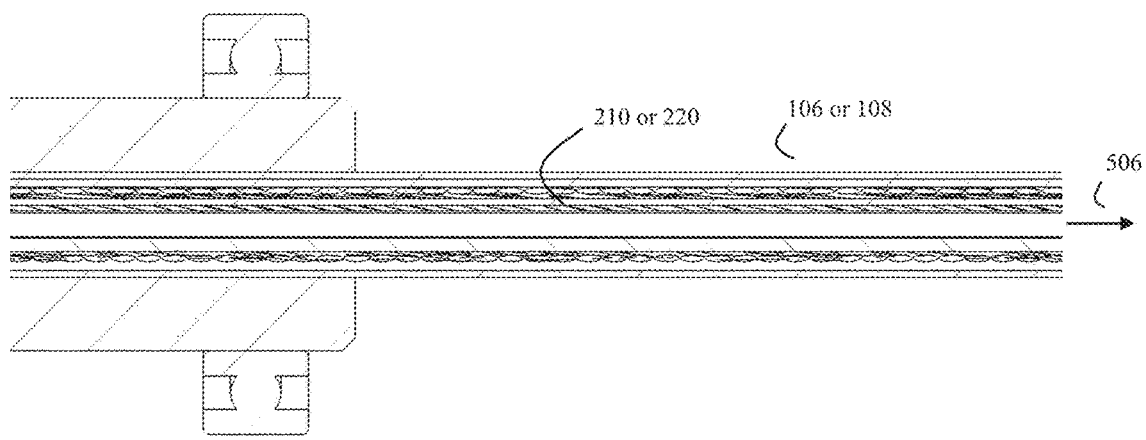
FIG. 29D shows a detail showing how the steering cable rotates with both with the catheter and about the axis of the catheter (projected from the axis of rotation).

FIG. 29D shows a detail showing how the steering cable (210 or 220) rotates with both with the catheter (such as 106 or 108) and about the axis of the catheter (506). Note that the details will vary depending on if the catheter is a single-stage catheter without a driver shaft (200), or if the catheter is a dual-stage catheter that employs a drive shaft (200) to rotate a distal catheter (108).

In the case of a dual-stage catheter, then there may be cables (210) for both the proximal stage (106), as well as cables (220) for the distal stage. Both stages may have their own rotary actuators and steering cable actuators. In this latter case, when the steering cable is a cable such as (220) that is used to steer the distal stage (108), then the arrangement will be configured to 1) rotate the steering cable (220) along with the rotation of the distal stage (108) and 2) rotate any steering cables (210) along with any rotation of the proximal stage (106).

By contrast, if the catheter is a single-stage catheter without a drive shaft (200), then the steering cable may be a cable such as (210). The device will rotate the steering cable (210) along with the rotating single-stage catheter (106). For simplicity, in this single-stage situation, the cable is designated (210), and the single-stage catheter is designated (106).

Figure 30:
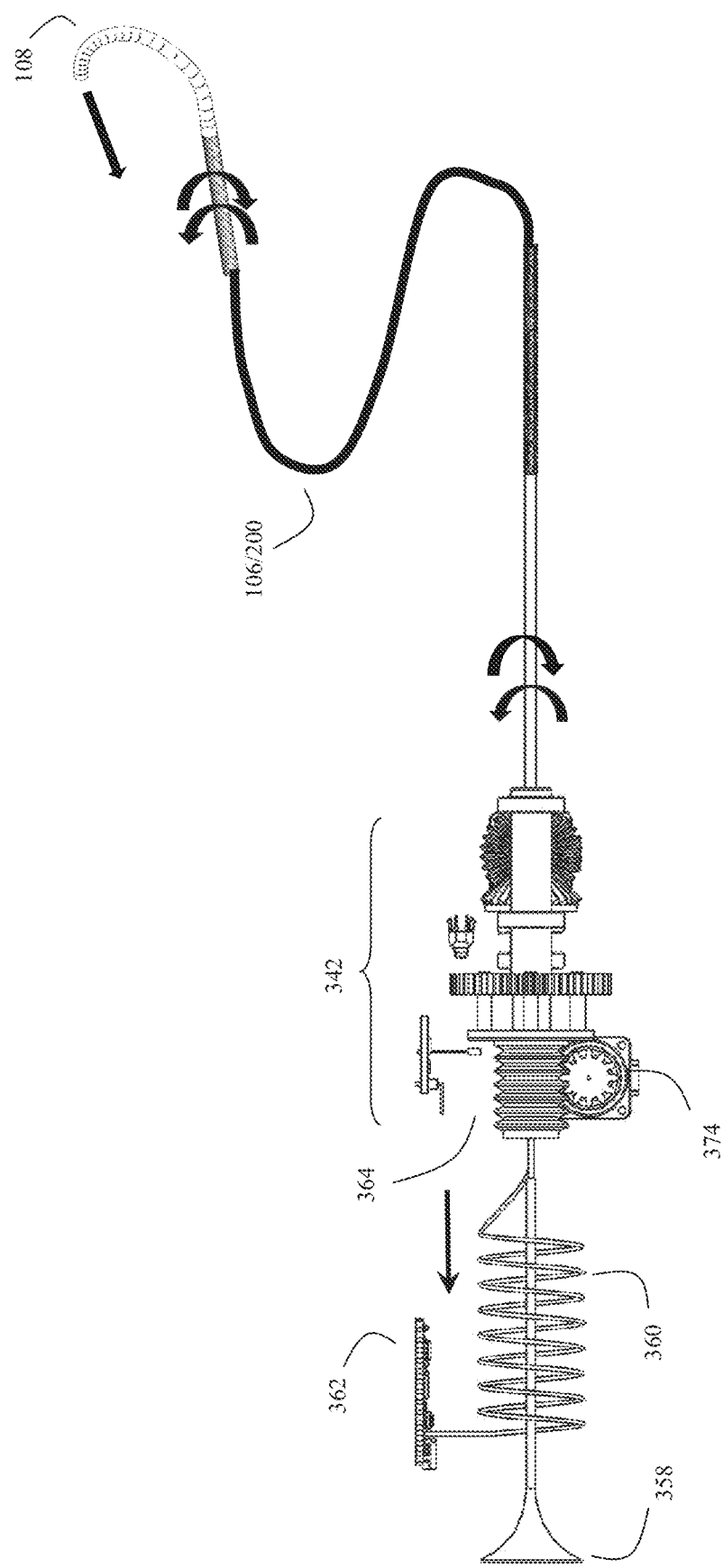
FIG. 30 shows an overview of a catheter steering device and system for a one-stage catheter, including both the drive system and the catheter.

FIG. 30 shows an overview of a catheter steering device and system for a one-stage catheter, including both the drive system and the catheter FIG. 30 (right side) shows an overview of how the rotary and linear drive systems can drive the catheter. As previously discussed, here, the distal stage (108) is flexed and rotating either clockwise or counterclockwise, depending on its actuator. The distal flexion can be by tension transmitted by the distal stage steering cable (220) to the distal tool plate (109). The distal stage rotation can be transmitted by the torque shaft (200). At the same time, the proximal stage (106) is also flexed and rotating either clockwise or counterclockwise as per the distal stage because the two stages are connected by the isolation transition coupler (107a).

FIG. 30 left side shows a close-up of a portion of the rotary and linear drive system (here 342) during the driving process of the multi-stage catheter shown on the right side of FIG. 30.

In this figure, the Linear Circular Gear Rack (drive rack 364) has been extended by the driving force of the Linear Circular Pinion Gear (374). This controls the tension in the distal steering cable (220), causing the outer distal (108) portions of the catheter to bend.

Figure 30A:
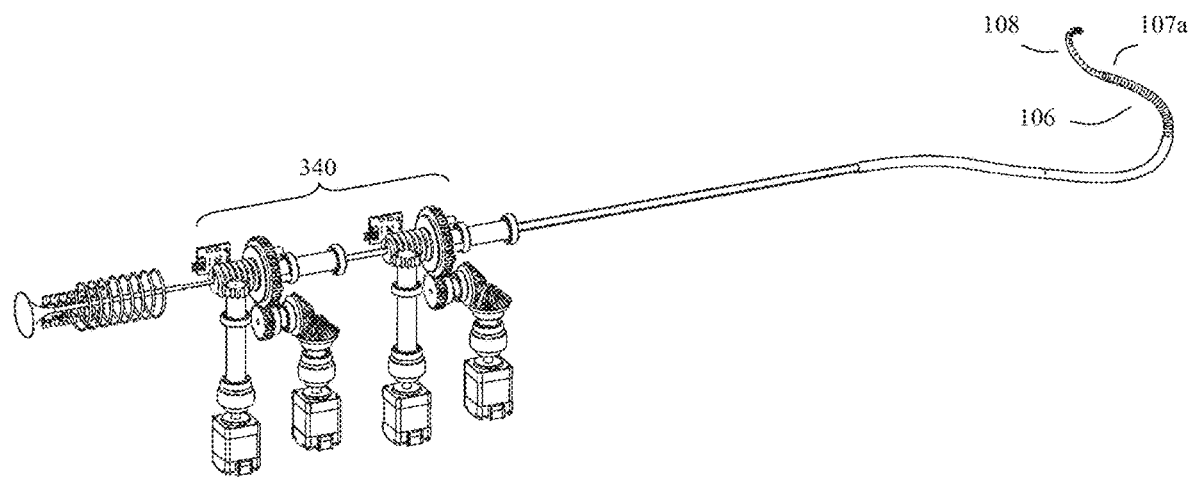
FIG. 30A shows how a multi-stage (dual-stage) catheter device may be robotically driven. This could also represent telescoping catheters; in this case it is two catheters.

FIG. 30A show another example of how the previously described multi-stage (such as a proximal stage 106, transition point coupler (107a), and distal stage 108) catheter device can be driven (again, these can be continuous without a transition point coupler). In this embodiment, the robotic system uses both rotary torque mechanisms and linear actuation mechanisms. These two types of mechanisms (340) are coupled together to produce both rotary motion and linear motion at the same time.

In some embodiments, the invention may further comprise moving (flexing) the transition point coupler (107a, 107b) by using at least one proximal stage tensioning actuator (350r1) to create and release tension on at least one of the various proximal stage steering cables. Again, this is done while also rotating the at least one proximal stage steering cable (210) (often using 350r2) in a 1:1 ratio with any rotation of the proximal stage hollow catheter and the distal stage hollow catheter.

One alternative to the linear circular gear rack and pinion gear arrangement is shown below in FIG. 30B and FIG. 30C. Here a finger (500) attached to a motor actuator (such as 350r1a) pulls the tension mechanism back while running in the groove (352). Other mechanisms that could also pull the tensioning mechanism back while rotating could include a fork pivoting from a fulcrum point with a ring or finger running the groove; and/or an actuator using a cam; and/or pulling a cable or rod for applying force to the tensioning element. In general, any mechanical element that allows rotation of the drive system synchronously with the catheter while providing actuation force to the steering cable may be used. Some of these alternatives will be discussed in more detail shortly.

Figure 30B:
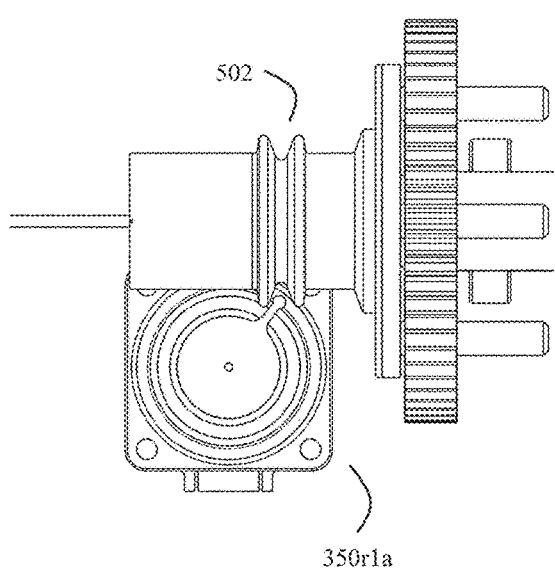
FIG. 30B shows an alternative to the previously discussed circular, linear gear rack and pinion gear mechanism, where a finger attached to a motor actuator pulls a tension mechanism back while running in a groove.
Figure 30C:
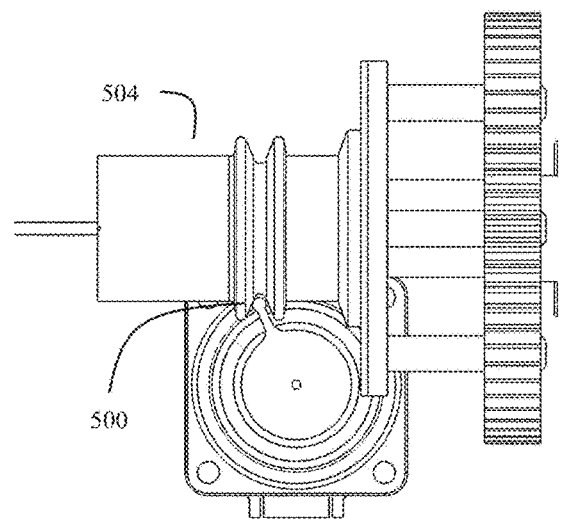
FIG. 30C shows another view of the finger-type mechanism previously shown in FIG. 30B. This time with the steering cable tensioned.

FIG. 30B shows an alternative to the linear circular gear rack and pinion gear where a finger (500) attached to a motor actuator (350r1a) pulls a tension mechanism back while running in a groove (502). FIG. 30C shows another view of the finger-type mechanism previously shown in FIG. 30B. The steering element is shown as (504).

Disposable or Resposable Housing Embodiments

FIGS. 31A, 31B, 31C, and 31D show how the proximal drive side of the catheter can be contained in a disposable or resposable housing. The disposable housing can be coupled to an array of drive motors that are attached to a fixed platform such as the robotic arm shown in FIG. 32. The motors have a drive hub with protruding pins attached to the output shaft. The motor hubs drive pins engage with a coupler that is directly connected to the drive train gears of the cartridge.

FIG. 31A shows how a disposable/resposable housing (388) may contain the drive side (or gear train) of the catheter driving assembly. This in turn may interact with the various actuators (e.g. electric motors) disposed on a robotic arm or other platform.

Figure 31B:
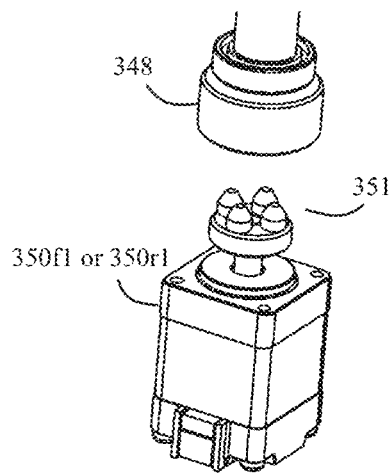
FIG. 31B shows a detail of how a motor coupler from a gear train from the disposable housing/cartridge may interact with the drive pins of an actuator.

FIG. 31B shows a detail of how a motor coupler (348) from a gear train from the disposable housing (388) may interact with the drive pins (351) of an actuator (such as 350f1, or 350r1).

Figure 31C:
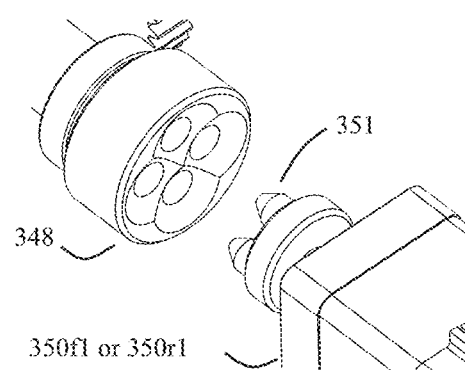
FIG. 31C shows another view of how a coupler from a gear train from the disposable housing/cartridge may interact with the drive pins of an actuator.

FIG. 31C shows another view of how a coupler (348) from a gear train from the disposable housing (388) may interact with the drive pins (351) of an actuator (such as 350f1 or 350r1).

Figure 31D:
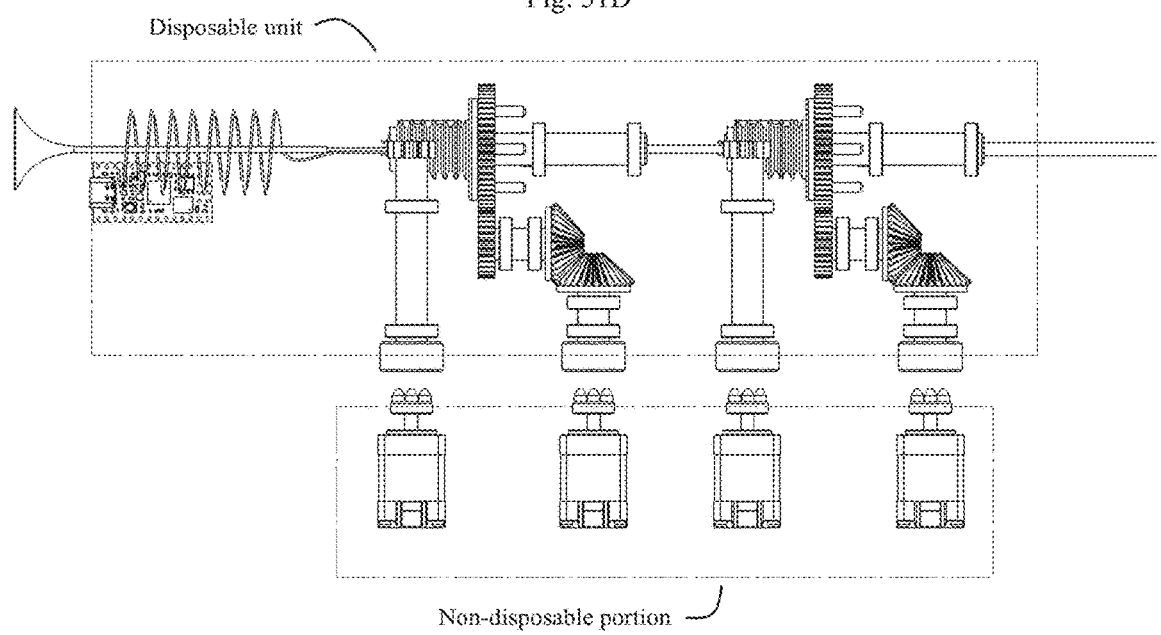
FIG. 31D shows how a disposable housing or cartridge can work with a multiple gang gear train.

FIG. 31D is generally similar to FIG. 31A, but also shows how a disposable housing or cartridge can work with a multiple gang gear train.

In some embodiments, the at least one contacting mechanism may comprise at least one gear assembly (for example, any of 354, 364, 366, 368, 370, 374 or other gears that conduct force from one or more actuators to various parts of the catheter). Here, at least portions of this gear assembly may be configured in a disposable or resposable cartridge (388) that can be reversibly coupled and decoupled from the various one processor-controlled electromagnetic actuators (such as any of 350f1, 350f2, 350r1, 350r2). Thus, the electromagnetic actuators may be more permanently mounted on a robotic arm, while the disposable and preferably sterilized gears in the cartridge (388) can be mounted and either discarded or refurbished for subsequent use.

Figure 31E:
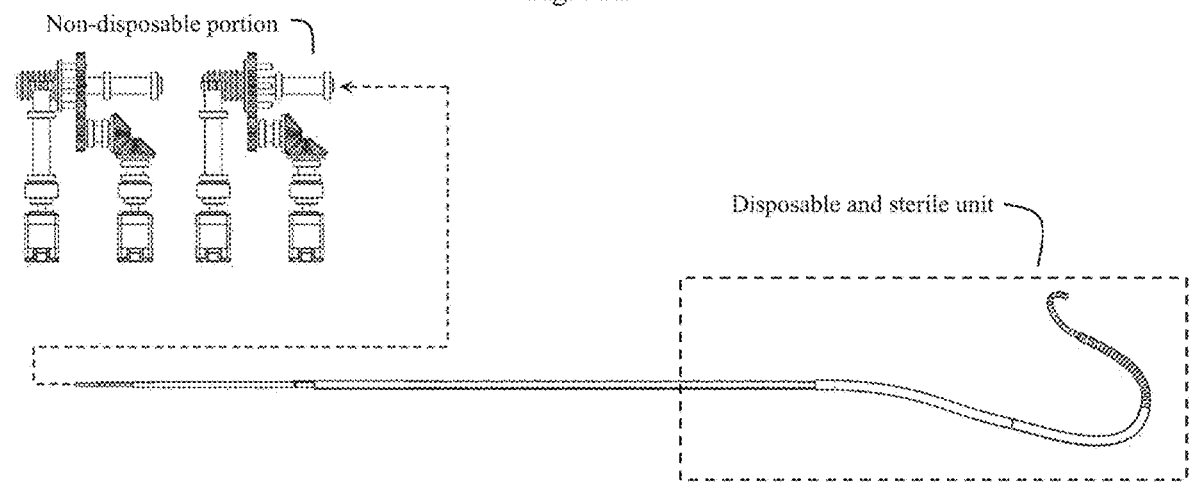
FIG. 31E shows an alternative embodiment where the catheter portion of the system is both disposable and sterile and is configured to be inserted into a reusable gear train or other type of catheter steering/driving mechanism.

FIG. 31E shows an alternative embodiment. Here, the catheter portion of the unit is both disposable and sterile and is configured to be inserted into a reusable gear train or other type of catheter driving mechanism.

Disposable Off-Axis Contact Type Drives

Figure 31F:
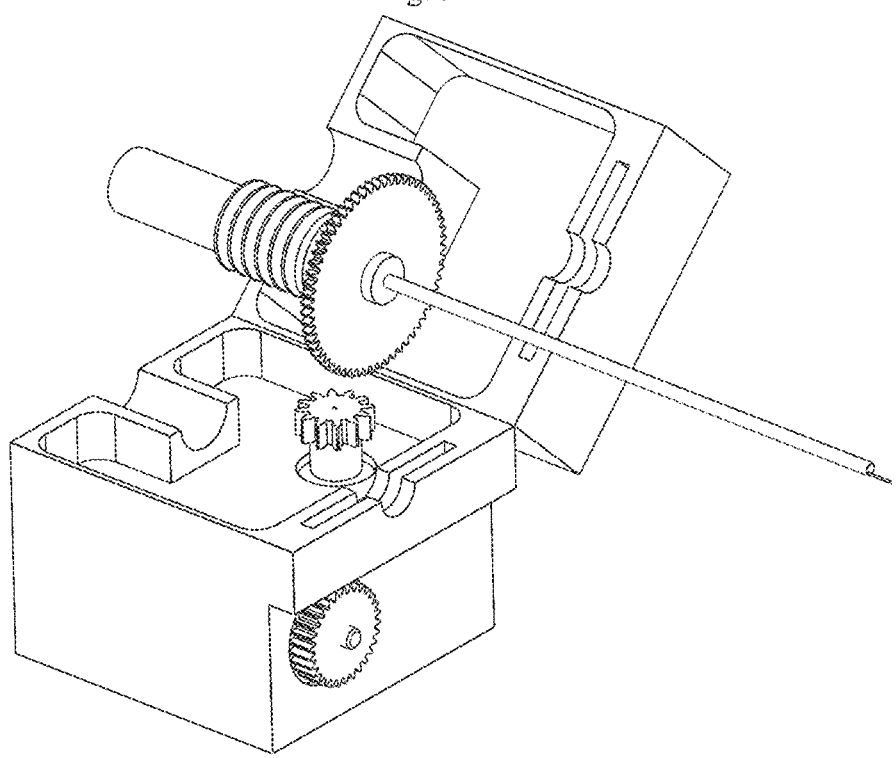
FIG. 31F shows an alternative embodiment where the proximal end of the catheter (which may be disposable and/or sterile) is loaded into a motor drive housing, here shown with a hinged cover.

FIG. 31F shows an alternative embodiment where the proximal end of the catheter (which may be disposable and/or sterile) is loaded into a motor drive housing, here shown with a hinged cover.

Figure 31G:
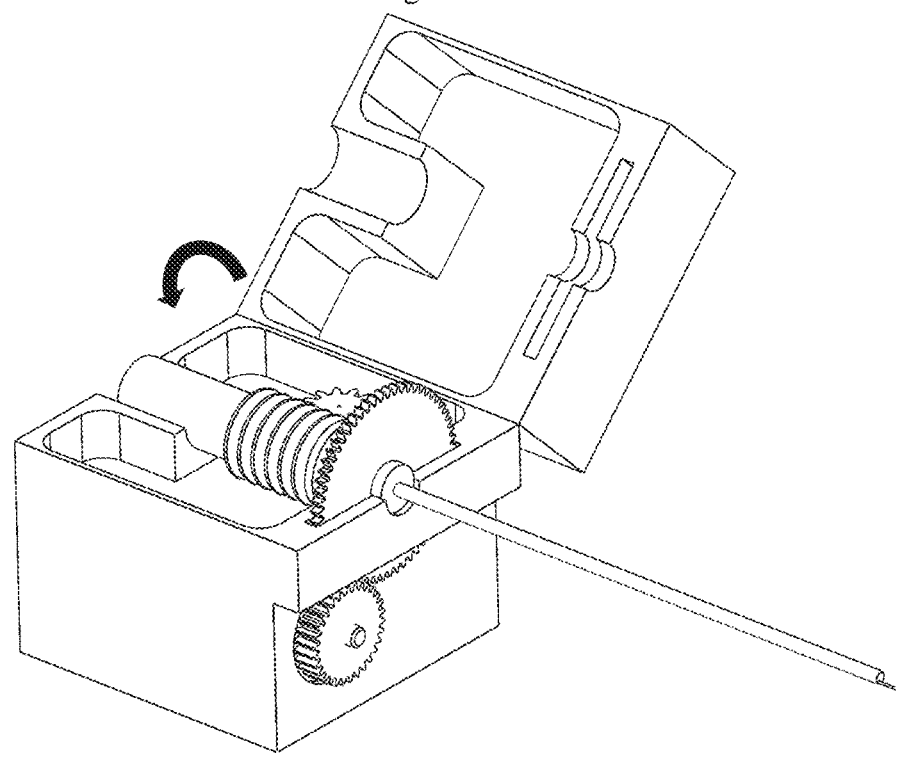
FIG. 31G shows the FIG. 31F embodiment, now with the proximal end inserted into the motor drive housing and the hinged cover closed.

FIG. 31G shows the FIG. 31F embodiment, now with the proximal end inserted into the motor drive housing and the hinged cover closed.

Figure 31H:
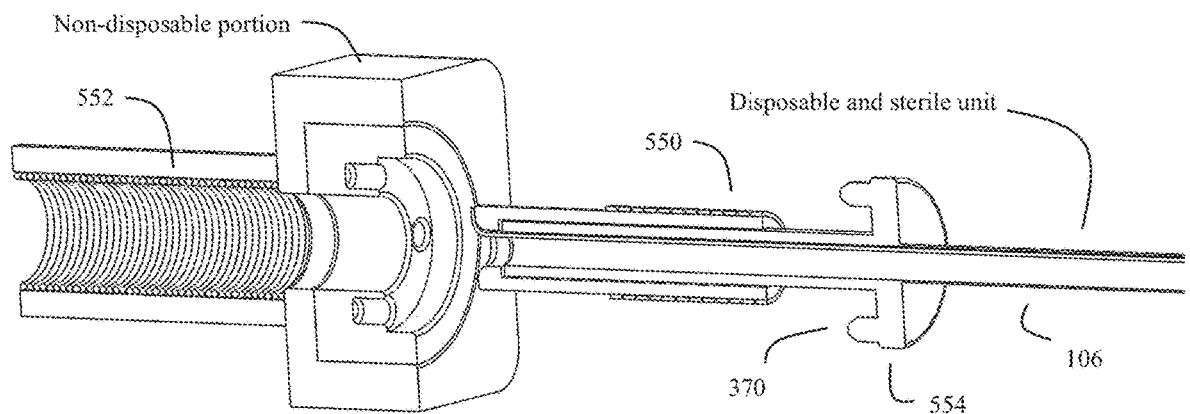
FIG. 31H shows an alternative embodiment of the catheter steering device where the proximal end of a disposable catheter further comprises a steering element with electromagnetic drive rings being inserted into a rotary and linear drive housing for actuation.
Figure 34A:
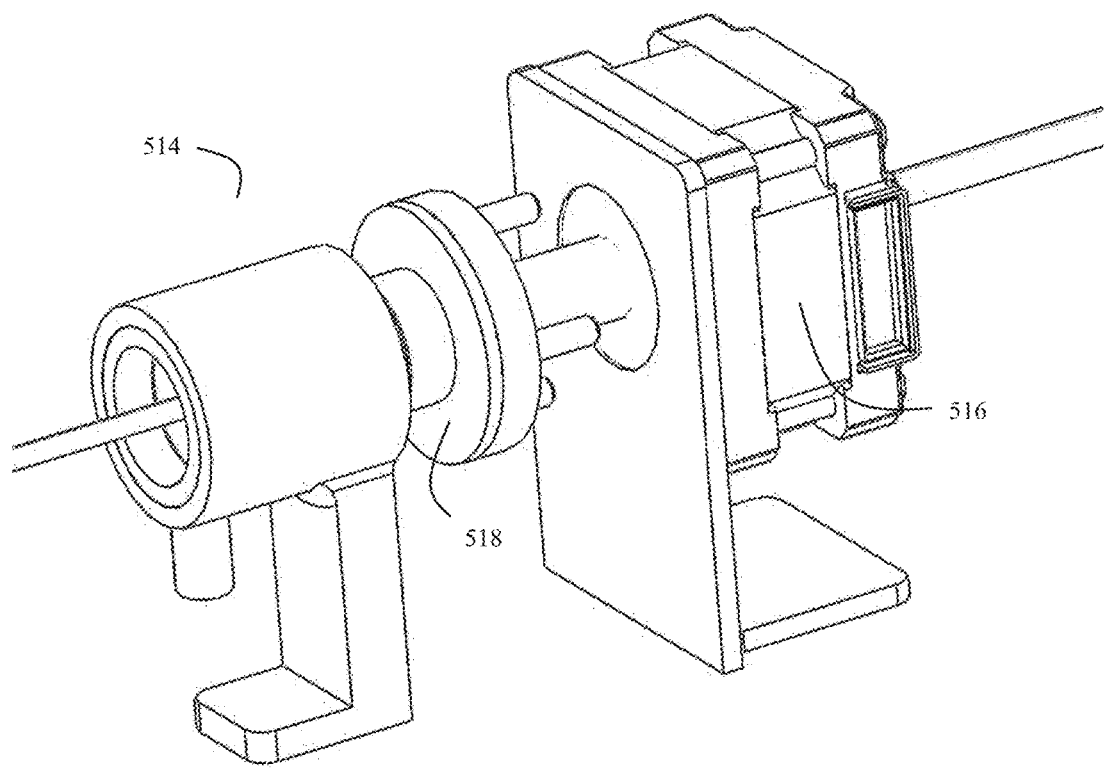
FIG. 34A shows an embodiment of the catheter steering device that uses all electro-magnetic drives for the rotary actuator and steering cable actuator, thus achieving both rotation and linear actuation for a single catheter stage.
Figure 34B:
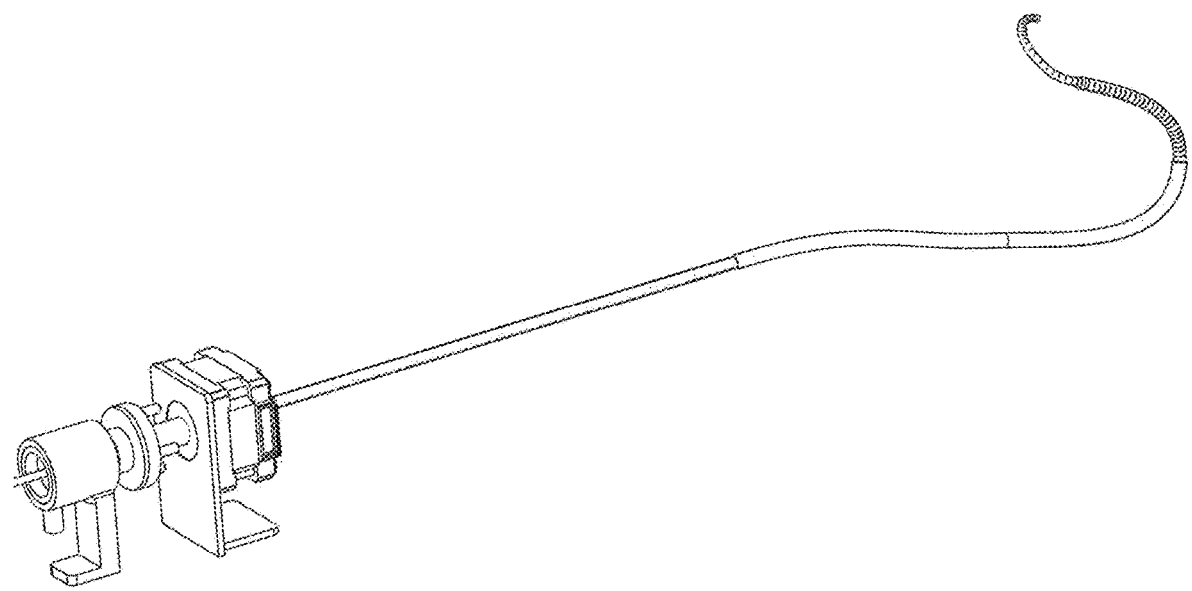
FIG. 34B shows an embodiment where the direct drive system of FIG. 34A is attached to a single-stage catheter.
Figure 34C:
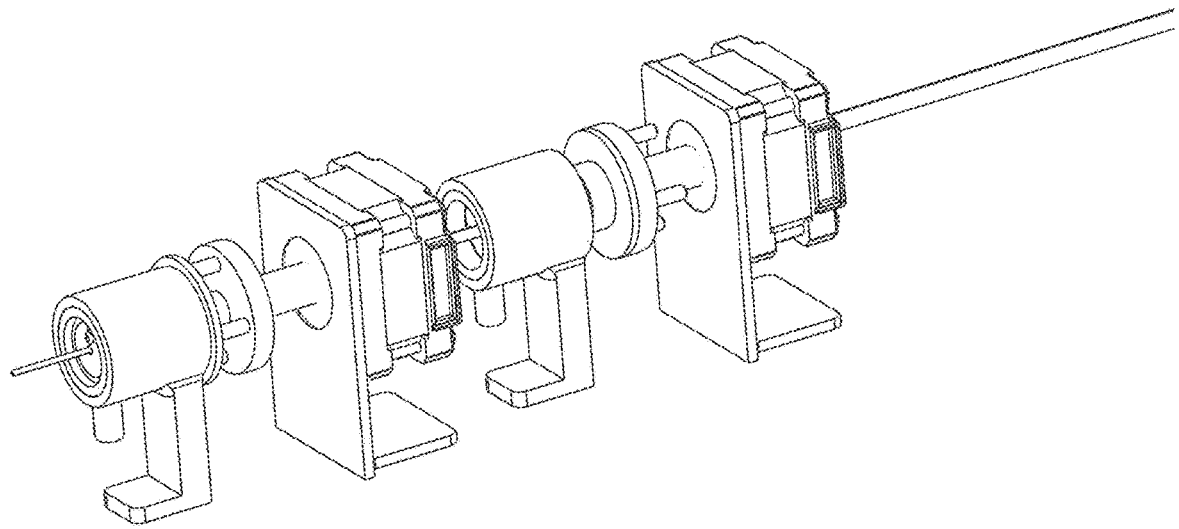
FIG. 34C shows an embodiment that uses all electromagnetic drives to as the rotary actuators and steering cable actuators to actuate both rotation and linear actuation directly for a dual-stage catheter.
Figure 34D:
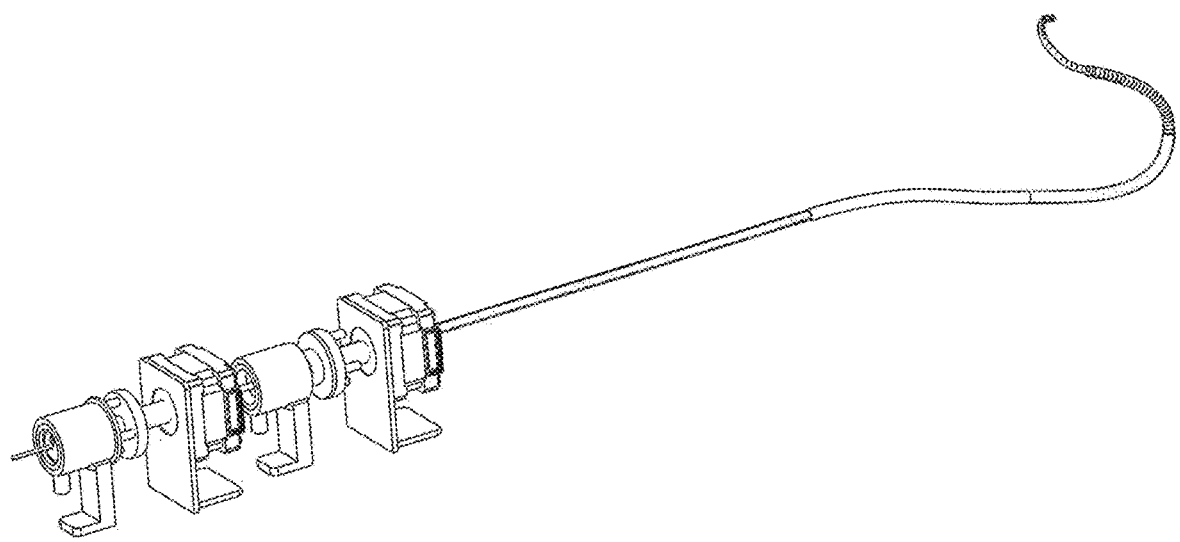
FIG. 34D shows the direct drive system of FIG. 34C attached to a dual-stage catheter where two or more catheters are joined through a transition housing and a rotary coupler (see FIG. 38B for more detail).
Figure 34E:
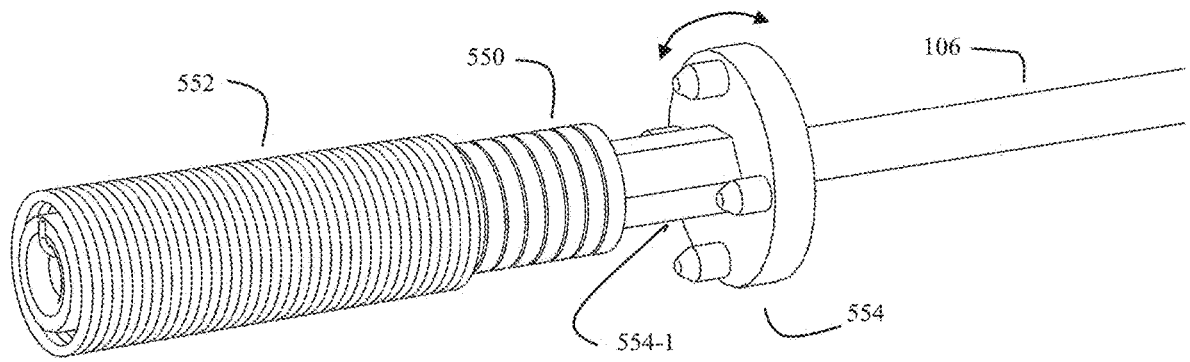
FIG. 34E shows an embodiment where the steering cable actuator portion of the catheter steering device may comprise electro-magnetic drive rings attached to the catheter's steering element at the proximal end slidable on a hexagonal shaft.
Figure 34F:
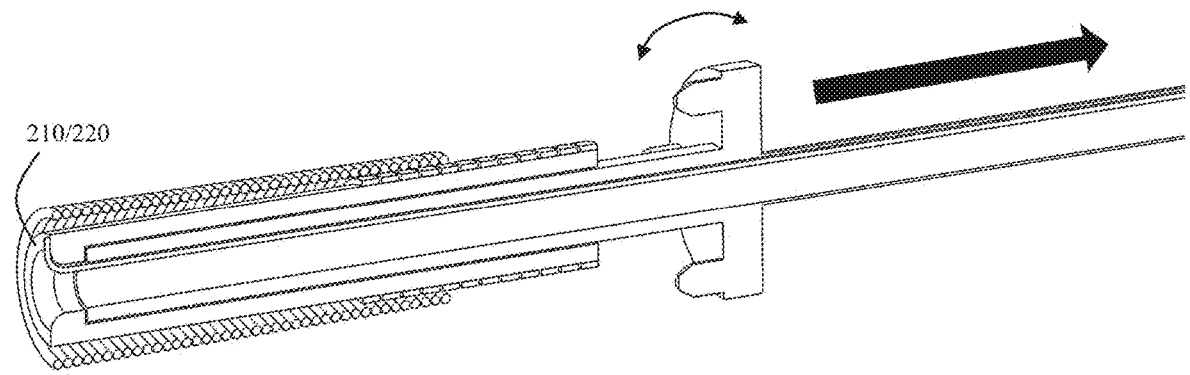
FIG. 34F shows a configuration where the FIG. 34E steering actuator is not applying force to the catheter's steering cable.
Figure 34G:
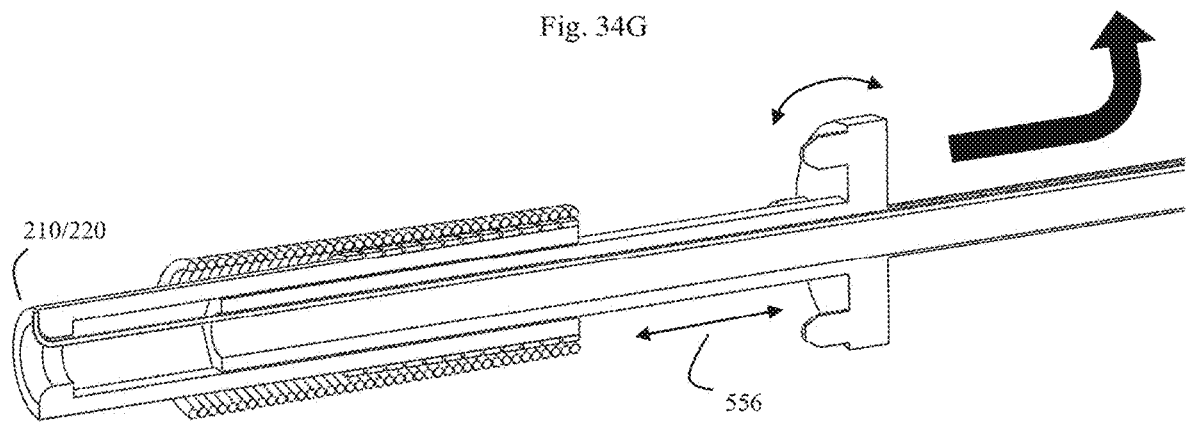
FIG. 34G shows a configuration where the FIG. 34E steering actuator applies force to the catheter's steering cable, causing the catheter to flex.

FIG. 31H shows an alternative embodiment where the proximal end of a disposable or resposable catheter further comprises a steering element with magnetic rings (see FIG. 34E to FIG. 34G). This embodiment is designed to operate with a magnetic rotary actuator and steering cable actuator system, which will be discussed shortly. See FIG. 34E to FIG. 34G for further discussion of this embodiment.

Figure 31I:
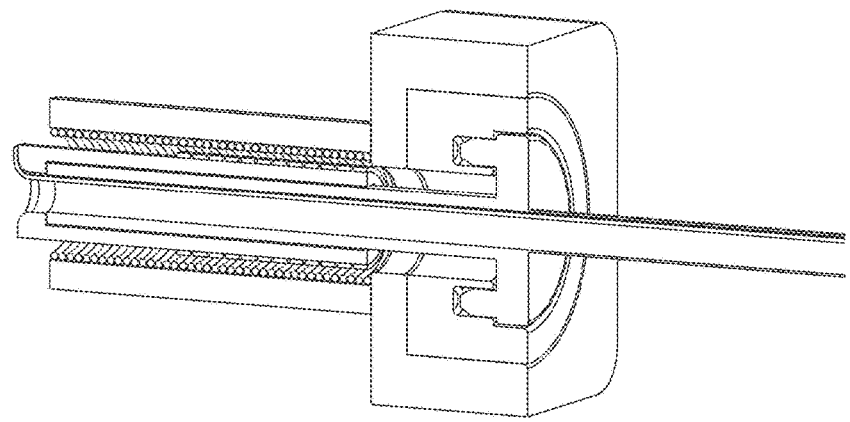
FIG. 31I shows the embodiment of FIG. 31H, now with the proximal end of the catheter fully inserted into the rotary and linear drive housing.

FIG. 31I shows the embodiment of FIG. 31H, now with the proximal end of the catheter fully inserted into the rotary and linear drive housing.

Embodiment showing electronically coupled steering for two rotary stages:

The drive system and disposable catheter section shown in FIG. 31J and FIG. 31K below show an alternative embodiment that uses inline contact rotary drive mechanisms to provide both linear and rotary actuation. In this embodiment, two rotary inline contact-type drive mechanisms are used. The other important feature is the linear tensioning drive mechanism is configured to follow the rotary drive mechanism when rotating the catheter, so the screw drive will not apply unintended steering to the distal steerable portion of the catheter.

Figure 31J:
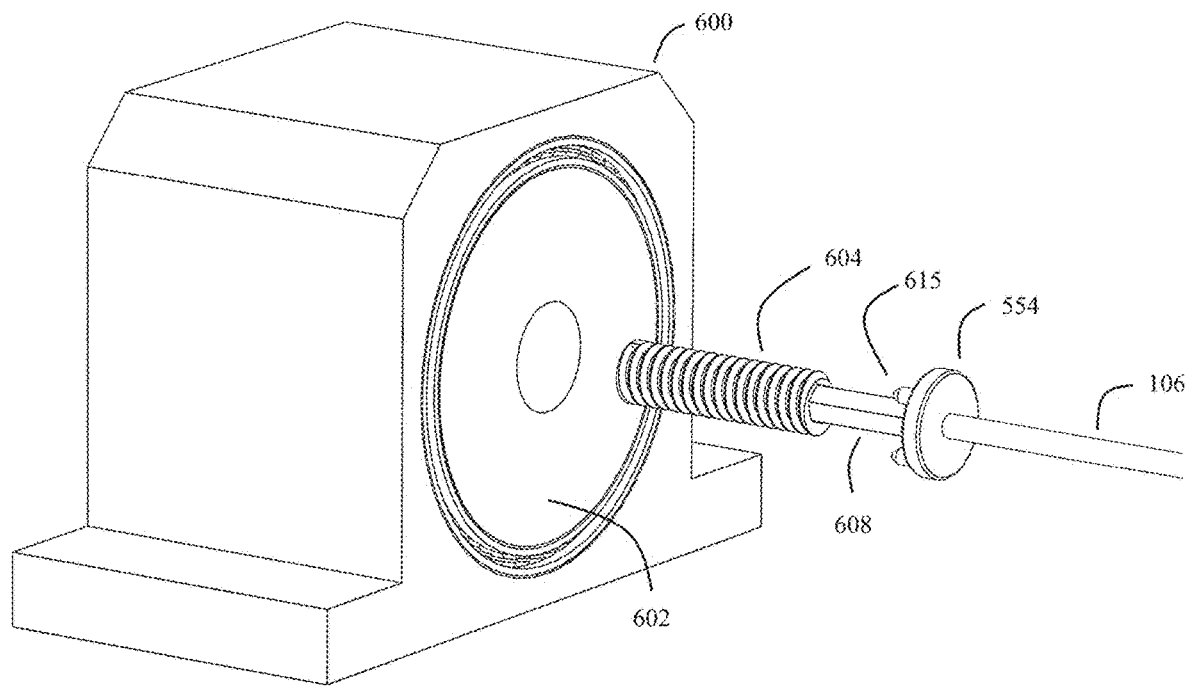
FIG. 31J shows an alternative embodiment. employing a contact inline axis steering actuator.

FIG. 31J shows an alternative embodiment. employing a contact inline axis steering actuator. Here the actuator drive head is shown as (600), the drive portion (first motor) that acts as a rotary actuator to rotate the catheter is shown as (602), a screw thread for the portion of the drive system that acts as a steering cable actuator is shown as (604), and a rotary axis drive disk is shown as (554). Note the presence of pins (615), which act to mechanically cause the catheter rotate, which in turn causes the steering cables to rotate with the catheter through the slidable coupling of the hexagonal shaft (608). Note that in this embodiment, there is a hexagonal shaft (608), which couples synchronously to the steering cable actuator (604), male threads. The steering cable actuator (604) is also slidable along the hexagonal shaft (608). Thus in this respect, the hexagonal shaft (608) replaces and functions in a manner similar to the previously discussed slidable drive pins (370).

Figure 31K:
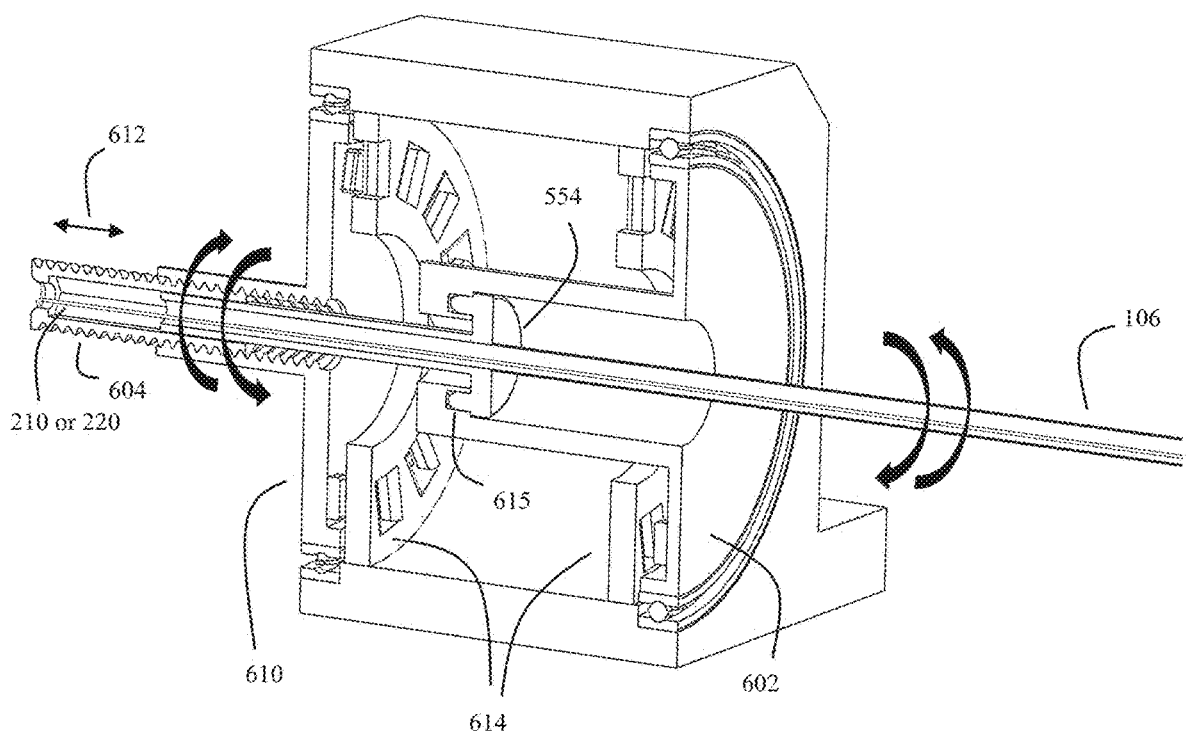
FIG. 31K shows a cross-section of the contact inline axis steering actuator previously shown in FIG. 31J.

FIG. 31K shows a cross-section of the contact inline axis steering actuator previously shown in FIG. 31J.

In FIG. 31K, the screw thread (604) and rotary axis drive disk (554) coupled to the proximal portion of the catheter (106) is shown inserted into the actuator drive head (600). The FIG. 31K cross-section shows that this configuration implements a steering cable actuator for a steering cable (such as 210 or 220) by using the screw thread (604) and a second motor (610). Note that although this second motor (610) itself is configured to rotate, due to the screw thread arrangement (604), the net effect is to create a linear screw that translates the rotation of the second motor (610) into a linear (back and forth 612) steering cable actuator that applies steering force on steering cable (210, 220). Thus, this portion of the arrangement continues to act as a steering cable actuator. By contrast, the first motor (602) is shown directly coupled to the catheter (such as 106) and is applying torque to at least a portion of the catheter such as (106).

Thus, this portion of the arrangement continues to act as a rotary actuator. Stators for the two motors (602, 610) are shown as (614).

In this embodiment, the steering cable actuator is configured to be slaved 1:1 to the rotary axis and to always follow it. In general, the device will always advance or retract the attached steering cable simultaneously with the catheter rotation.

In this drive system, there are two actuators: these are the catheter rotational actuator, which acts as the rotary actuator, and the linear screw steering element actuator, which acts as the steering cable actuator. These two actuators can operate independently of one another. The linear screw steering element actuator can be slaved (e.g., by pins 615 and encoder/motor counts, and under the control of processor 410) to the catheter rotational actuator up until the rotational position is settled; at that point, the flexing or unflexing of the distal portion of the catheter can The catheter rotational actuator (602) and linear screw steering element actuator (604/610) maintain a 1:1 relationship for the cable/catheter through the slidable mechanical coupling with the hexagonal shaft (or any other type as demonstrated). However, the linear screw steering element actuator (610) should be commanded to track the catheter rotational actuator (602). Otherwise, catheter rotation could thread or unthread the screw drive steering element (604) and cause unintended flexing or unflexing of the steering cables (210, 220), in turn cause unintended flexing or unflexing of the distal portion of the catheter.

Figure 31L:
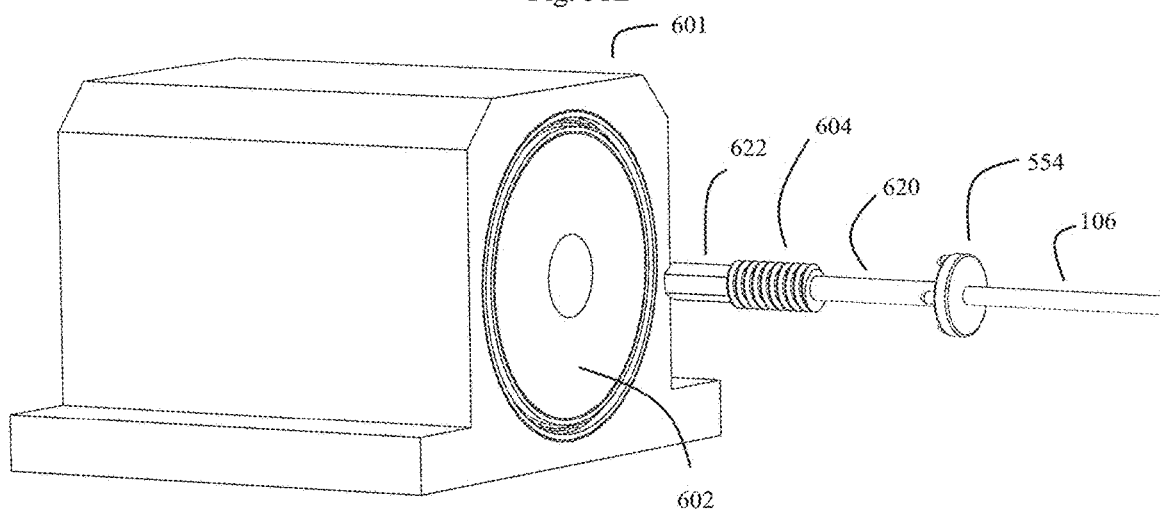
FIG. 31L shows an alternative three-stage embodiment configured to implement electronically coupled steering with real-time lead/lag cable positioning.
Figure 31M:
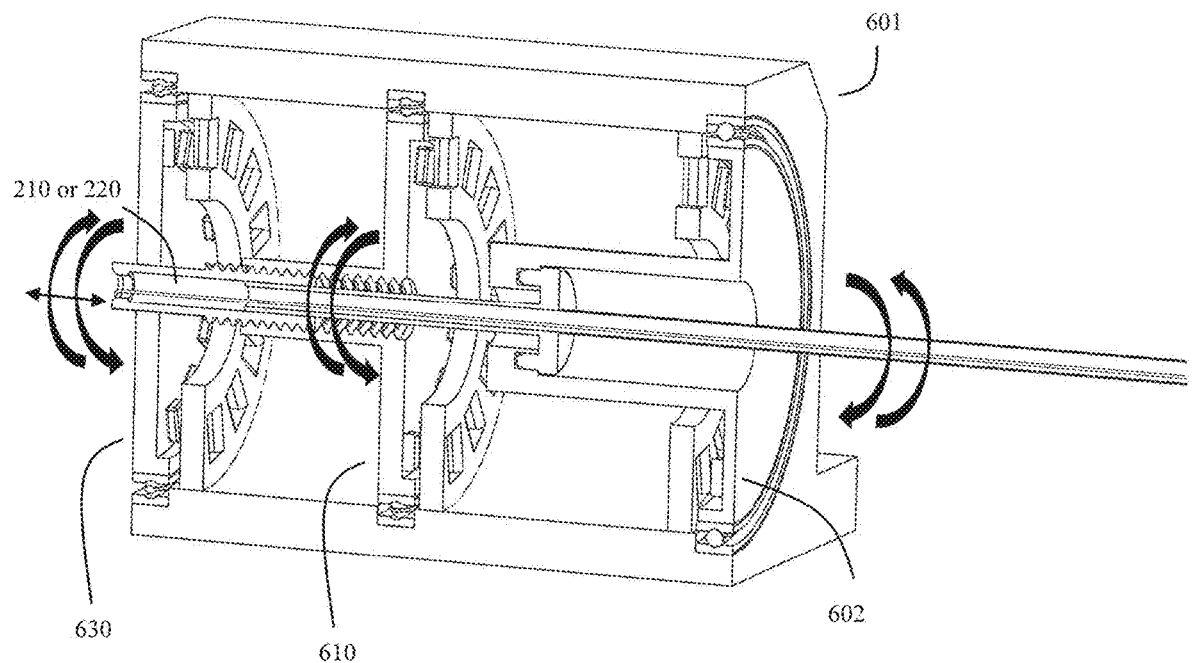
FIG. 31M shows a cross-section of the three-stage embodiment previously shown in FIG. 31L, here with the proximal end of the catheter inserted into the drive.
Figure 31N:
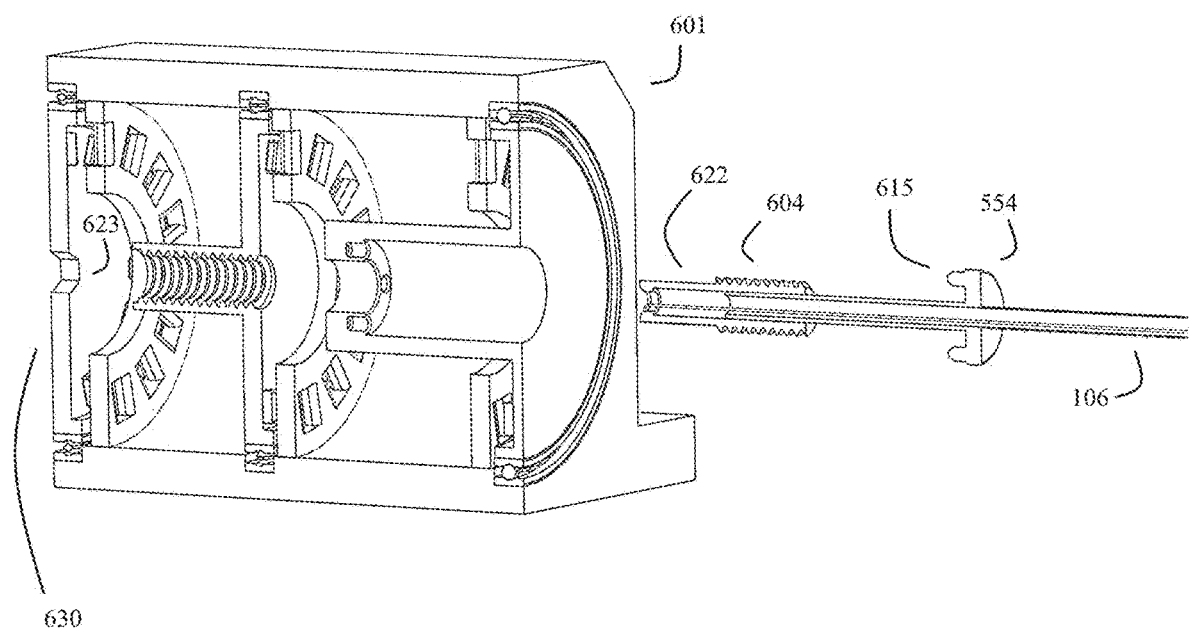
FIG. 31N shows a cross-section of the three-stage embodiment previously shown in FIG. 31L, here showing the proximal end of the catheter detached from the drive.

Three Rotary Stages: Electronically Coupled Steering with Real-Time Lead/Lag Cable Position The drive system and disposable catheter system shown in FIG. 31L to FIG. 31N show a method for using inline contact rotary drive systems for both linear and rotary actuation (e.g., to implement both a rotary actuator and at least one steering cable actuator) along with an additional motor for shifting the angular position of the steering cable at the proximal end. In this embodiment, the hexagonal shaft coupling as used in FIG. 31J and FIG. 31K is replaced by a motor such that the coupling is now totally controlled by a position sensor and control processor (410).

In this embodiment, three rotating inline contact-type actuators are used. An important feature of this embodiment, however, is that it is configured so that the linear tensioning drive (this embodiment's steering cable actuator 610)) should follow the rotary drive (this embodiment's version of the rotary actuator 602) when rotating the catheter. This is done so that the screw drive portion of this embodiments steering cable actuator) will not apply unintended steering to the distal steerable portion of the catheter. This type of system using processor control coupling in place of mechanical coupling (pins, splines, bellows, keys, square, hex, octagonal, etc.). Linear steering cable actuator uses electronic non-contact coupling (no rigid mechanical coupling); it is slidable along the proximal axis of rotation.

In this embodiment, a third actuator/motor (630) is configured to follow the other two motors actuators (602, 610). The function of this third actuator/motor is to advance or delay the angular position of the steering cable (210, 220).

FIG. 31L shows an alternative three-stage embodiment configured to implement electronically coupled steering with real-time lead/lag cable positioning. In this embodiment, the actuator drive head is designated as (601).

As shown in FIG. 31L, the hexagonal coupling shaft (previously shown in FIG. 31J as 608) between the catheter rotary actuator (602) and the rotary axis drive disk (554) has been replaced by a circular non-coupling shaft (620). This circular, non-coupled axial shaft and associated screw thread linear steering element (604) is configured to be slidable along this shaft or axis.

On the far proximal end of the cartridge (connecting to catheter 106 and shaft 620) at the screw thread drive (604) is a hexagonal drive portion (622) that mates with a third "adjustment" motor/actuator (630) for setting/adjusting the angular position of the steering cable (210 or 220) to the catheter's angular position. Note: hexagonal drive portion (622) is slidably coupled to motor/actuator (630)

In this drive system, there are three actuators: the catheter rotational actuator (corresponding to the at least one rotary actuator 602)), the linear screw steering element actuator (corresponding to the at least one steering cable actuator 610), and a new type of actuator, here termed the "cable position actuator" (630). All three actuators can operate independently of one another, again usually under processor control, such as by processor (410).

Often the steering cables (210) and (220) are not positioned at the same angular position for the distal end of the catheter and the proximal end of the steering element, but in reality, the angular positions can be off in practice. Think of the cable position actuator (630) as an actuator that can, for example, cause the proximal end of the steering cable (FIG. 14, 222) to rotate closer to the angular position of the distal steering cable attachment. In this scenario, the two ends of the steering cable are inline with one another for steering cables that are positioned off axis as shown in FIG. 14, (224). Indeed, for a multiple steering cable configuration, this can rotate the proximal angular position of all steering cables, often by a similar amount. This helps the system accommodate twists in the catheter as the catheter operates.

The linear screw steering element actuator (e.g. this version's steering cable actuator 610) can be slaved to the catheter rotational actuator (e.g., this version's rotary actuator 602) by processor control up until the rotational position is settled; at that point, the flexing or unflexing of the distal portion catheter can be accomplished by the linear screw steering element actuator (e.g., this version's steering cable actuator 610).

Here, however, the additional element is that the linear screw steering element actuator (e.g. the steering cable actuator 610) and the new cable position actuator (630) can both be slaved fully or partially to the catheter rotational actuator (e.g., this version's rotary actuator 602).

The Catheter Rotational Actuator and Linear Screw Steering Element Rotary Actuator can be maintained 1:1 for the cable/catheter through processor control (e.g. processor 410). However, the Linear Screw Steering Element Rotary Actuator should track the Catheter Rotational Actuator. Otherwise, catheter rotation could thread or unthread the screw drive steering element and cause unintended flexing or unflexing of the distal catheter. The Cable Position Rotary Actuator should track both the Catheter Rotational Actuator and the Linear Screw Steering Element Rotary Actuator to maintain a lead or lag of the steering cable if needed.

Another way to look at the three rotary motor arrangement is that the Cable Position Rotary Actuator acts as a "smart" coupler or "clutch" between the Catheter Rotational Actuator and Linear Screw Steering Element Rotary Actuator.

FIG. 31M shows a cross-section of the three-stage embodiment previously shown in FIG. 31L, here with the proximal end of the catheter inserted into the drive.

FIG. 31N shows a cross-section of the three-stage embodiment previously shown in FIG. 31L, here showing the proximal end of the catheter detached from the drive. Note that the cable position actuator (630) has a hex-nut adapter (624) to grip on to the hexagonal shaft (622)

For FIGS. 31J, 31K, 31L, 31M and 31N, the proximal portion of the catheter is loaded into the motor housing (600 or 601) through the opening in 602. The actuator (610) auto feeds the catheter at the threaded end (604) first. The motors synchronize with each mating component (604) to (610), (615) to (602) and for the three rotary motor version (622) to (630). There can be additional elements such as optical or magnetic (hall effect) sensing used to determine when the mates for the all the drives have occurred and the sequence of events. Additionally, the locking of the drive disk (554) and drive pins (615) to the (602) can be through processor control using a separate actuator or by manual means.

Figure 32:
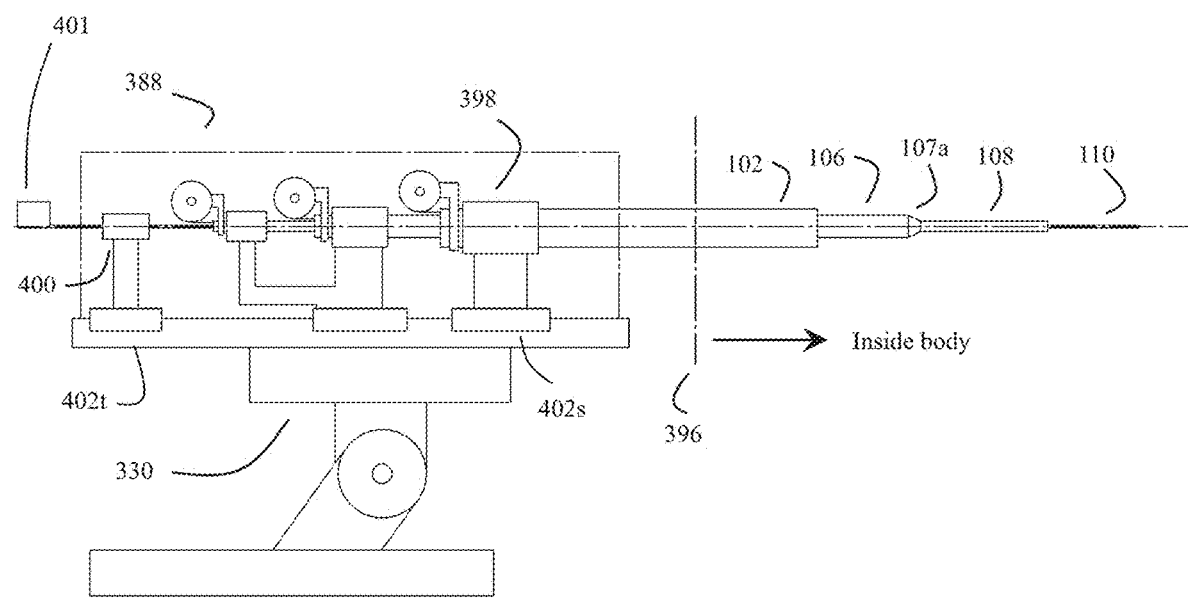
FIG. 32 shows an alternate view of the rotary-linear robotic catheter, which may, in this embodiment, be configured to manage a telescoping catheter arrangement.

Rotary-Linear Robotic Catheter System with Independently Rotatable, Flexing, and Slidable Catheters FIG. 32 shows an alternate view of the rotary-linear robotic catheter steering device/system with independently rotatable, flexing, and slidable catheters. Note that while operating on a patient, often at least the distal portion of the sheath (102), and the remaining distal components (e.g., 106, 107a, 108, 110, etc.) be inserted into the patient (e.g., catheter components to the right of the dividing line 396). By contrast, the various actuators, gears, belt drives, robotic arms, and other portions of the system to the left of diving line 396 will remain outside of the patient. These later systems may be mounted on a robotic arm, such as previously described (330).

Note that in some embodiments, a similar type 1:1 synchronized linear and rotary drive system, and optional sheath steering cable(s) may also be used to control the movement of the sheath (102) while inside the body. This optional sheath system is shown as (398), which is simply a single stage steerable hollow catheter. Additionally, other actuator systems, such as therapy payload conduit dispensing system (400) may also be used. Here, the therapy delivery or producing unit itself is shown as (401).

FIG. 32 also shows that in some embodiments, the device may further comprise at least one payload dispensing actuator (402t) configured to move at least one payload along the working channel by advancing or retracting a payload dispensing conduit along this working channel (228).

FIG. 32 also shows that in some embodiments, at least the proximal portions of the proximal stage hollow catheter (106) may be disposed within at least one hollow sheath (102). This at least one hollow sheath may be configured to enable at least portions of the multi-stage catheter device to (axially) protrude or retreat inside and outside of this at least one hollow sheath, depending on forces applied to the at least one hollow sheath (102) and at least the proximal stage hollow catheter (106). Here, the axial movement of this hollow sheath may be controlled according to a sheath translation stage actuator (402s) and optionally by processor (410) or another controller.

Telescoping Single and Dual Stage Catheters on Motorized Linear Stage (Multiple Actuator System)

Put alternatively, FIG. 32 also shows that in some embodiments, the device may be further configured with at least proximal portions of the proximal stage hollow catheter (106) disposed within at least one hollow sheath (102). Here, the at least one hollow sheath may be configured to enable at least portions of the multi-stage catheter device to protrude or retreat inside and outside the sheath, depending on forces applied to the sheath and/or the proximal stage hollow catheter. Further, the device may be configured with a sheath translation stage actuator (402s) configured to control the sheath's axial movement.

FIG. 32 also shows that any number of stages, both single and dual, can be stacked together and slide along a common linear motorized path. Two or more independent catheters (no transition housing with coupler) can telescope one inside of the other, traversing along a motorized stage, rotating and flexing while moving through a torturous pathway.

Thus, in some embodiment, the catheter steering device may be configured to attach to a catheter where the catheter comprises an outer catheter configured to be hollow from its proximal region to its distal region. This catheter may further comprise a telescoping inner catheter configured to be slidable within the outer catheter from the outer catheter's proximal region to the outer catheter's distal region. Here, the catheter steering device will generally be further configured so that at least some of the inner catheter can protrude thorough the outer catheter's distal region and past an end of the outer catheter's distal region.

Further, in some embodiments, the catheter steering device may be configured to attach to a catheter comprising an outer catheter configured to be hollow from its proximal region to its distal region. Here, this catheter may further comprise a telescoping inner catheter configured to be slidable within the outer catheter from the outer catheter's proximal region to the outer catheter's distal region. Here, the catheter steering device may be further configured so that at least some of the inner catheter can protrude through the outer catheter's distal region and past an end of the outer catheter's distal region. In such an embodiment, the catheter steering device may be also configured to steer the inner catheter by using the device's at least one rotary actuator, at least one steering cable, and the at least one steering cable actuator to traverse various internal body passages.

Further Methods of Actuating a Rotary Robotic Catheter

To generalize the concepts above, other actuation methods that do not use gears are may also be used.

The rotary or linear actuation can be driven by electromagnetic, shape memory alloy actuators, airpower actuators, vacuum actuators, fluid actuators, etc.

In some alternative embodiments, an electromagnetic linear actuator (motor) may be used that rotates about the rotary drive motor axis. This embodiment does not need to use drive pins to keep the linear actuators synchronized with the rotary actuators. Instead, a rigid mount can be used to fix the linear actuator to the rotary actuator. These motors can be open-loop or closed-loop DC or AC-type motors. The electrical wires for the spinning motors are managed by providing extra length such that the motors can rotate beyond 360 degrees in either direction depending on the wire coil loop size.

In another alternative embodiment, the Distal and Proximal stages are coupled stages are driven by alternative electromagnetic actuator systems. Here the rotational actuation is powered by through-shaft motors, and the linear actuation is powered by linear electro-magnetic motors that pull the flex cables. In this embodiment, electrical motor wire management is unnecessary since both the rotary and linear motors can be of a through-hole type design.

Further Drive System Discussion

Other Types of Actuators and Drive Mechanisms:

Another suitable drive method is by using piezo electric motors. For example, walking piezo electric motors exist, such as triangular oriented push pull piezo electric motors, that may be used in the invention. These motors can be configured to drive either linear or rotary motion.

In some embodiments, a ceramic bar or wheel may be used to couple the drive force from the motor to the device being driven. Here, ceramic has certain advantages due to hard, wear-resistant properties, but hard metals and other types of metals may also be used.

Piezo walking motors are exceedingly precise, and allow for nanometer increments of motion, but also provide a speed appropriate for the operating room environment. For example, such motors can produce a maximum speed of about 12 millimeters per second, which is quite adequate. These motors are also somewhat force-limited, typically having a maximum force from a fraction of a pound up to about 100 pounds, but again this is a generally adequate range.

In some embodiments, smaller motors can be combined in parallel to increase the force, and this makes them a good choice for safety of the patient, as the motors can be sized for preventing injury to the patient, and there is no failure mode in which they can exceed the tested and validated design force.

Figure 33:
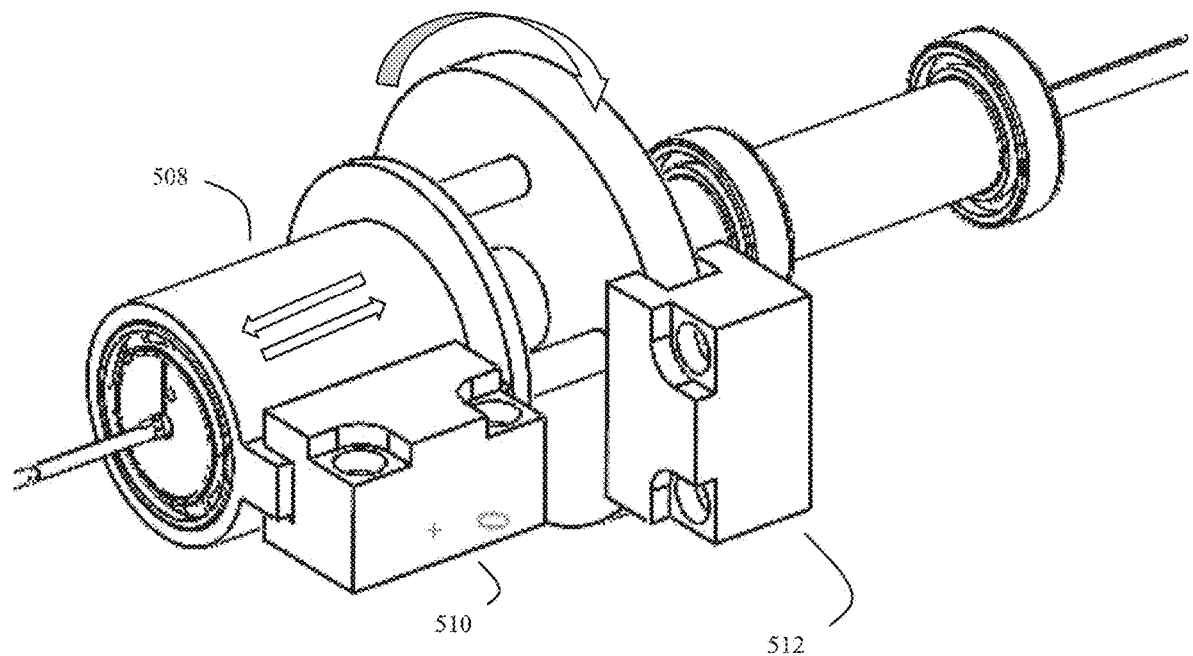
FIG. 33 shows an implementation of the catheter steering device that uses piezo walking motors as the rotary actuator and steering cable actuator to achieve both axial and rotary motion.

FIG. 33 shows an implementation with piezo walking motors for axial and rotary motion. This shows a rotary coupling on a bearing hub (508) that allows the steering element, steering cable, and catheter to rotate using a piezo rotary actuator (rotary piezo walking motor 510). While the catheter and the steering element are rotating, the drive bar (a portion of the steering element) remains engaged with a second piezo steering actuator (axial piezo walking actuator 512). The steering actuator provides force to pull the steering element/drive bar to retract or release cable tension. Other types of piezo motors may also be implemented, such as triangular piezo stacks or piezo resonant motors.

Electro-Magnetic Direct Drive Examples (Non-Contact Drive)

As an alternative to the previously discussed linear circular gear rack and pinion embodiment, in another embodiment, the catheter steering device can be implemented using direct drive motors. In this embodiment, a rotor and stator are used to as a rotary actuator to directly drive the body drive shaft. In this type of rotary actuator, the actuator motor could be a brush type, or brushless type, such as a servo or stepper motor.

In a non-contact embodiment, the steering cable actuator (providing axial motion) can be implemented using other types of actuators, such as a voice coil motor. However, other forms of direct drive motors, such as a synchronous or induction linear motor, could also be used to implement any of a rotary actuator or a steering cable actuator.

Either implementation could be implemented along with a gear driven mechanism for the other axis, or both could be direct drive. Direct drive can offer some distinct advantages in that it is much easier to sense the actuation force due to the lack of gear friction. This force feedback can also be used to help sense interaction with surrounding tissue, helping to steer the device, such as at a body lumen branch or at a sharp corner in a body lumen or between organs or tissue planes.

FIG. 34A shows an embodiment of the catheter steering device that uses all electro-magnetic drives to directly implement rotation (rotary actuator) and linear actuation (steering cable actuator) for a single-stage catheter. Here (514) shows a steering cable (linear) actuator, here implemented by a brushless linear motor or voice coil. (516) shows a rotary actuator, configured as a brushless, brush, or stepper motor. The axially slidable coupling is shown as (518). The general mechanism of operation is otherwise similar to that previously shown in FIG. 22A to FIG. 25.

FIG. 34B shows the direct drive electromagnetic catheter steering device previously shown in FIG. 34A attached to a single-stage catheter. The catheter can be constructed from a simple tube of continuous fabrication or from multiple sections of tubing with specific purposes such as torque and biased flexibility in a preferred direction.

FIG. 34C shows an embodiment that uses all electromagnetic drives to actuate directly both rotation and linear actuation for a dual-stage catheter where two or more catheters are joined through a transition housing and a rotary coupler. This arrangement could also be used to drive two more independent catheters where the smaller diameter (distal) catheter rotates and telescopes through a larger diameter (proximal) catheter configured to rotate and flex directionally under cable force.

FIG. 34D shows the direct drive system of FIG. 34C attached to a dual-stage catheter where two or more catheters are joined through a transition housing and a rotary coupler. This type of arrangement could also be used to drive two more independent (no transition housing and coupler) catheters where the smaller diameter (distal) catheter rotates and telescopes through the larger diameter (proximal catheter). In FIG. 34D, the catheter may have a proximal and distal section joined by a transition housing and a rotary coupler. Alternatively, the two catheters may be independent, with a smaller catheter passing through a larger catheter. In some embodiments, this larger catheter may be a type of steerable sheath. Here the two catheters are telescoping without any type of connection between the two.

Other Magnetic Drive Methods

FIG. 34E to FIG. 34G expand on FIGS. 31H and 31I and show an alternative embodiment of the catheter steering device. Here the catheter's proximal end further comprises, or is configured to attach into, a magnetic steering element (or portion of a magnetic steering cable actuator). As FIG. 34E shows, this may comprise magnetic rings (550) attached (directly or indirectly) to the catheter's proximal end. These magnetic rings are configured to fit into the stator coil (552) of a linear motor, which in turn are attached to at least one steering cable (210, 220). Thus, together, this arrangement creates a different type of steering cable actuator.

FIG. 34E also shows a disk (554), which forms at least part of the system's rotary actuator. This can, in turn, be coupled to a piezo driving mechanism, as per FIG. 33 (512), a magnetic driving mechanism, a mechanical driving mechanism, or another type of rotary actuator. As a result, the rotary actuator applies torque to the catheter, causing at least a portion of the catheter body to rotate.

FIG. 34F shows a configuration where the FIG. 34E steering actuator is not applying force on the steering cable (210/220). As a result, the catheter is in a relaxed (not flexed) configuration, as shown by the large straight arrow.

FIG. 34G shows a configuration where the FIG. 34E steering actuator applies force (556) to the steering cable (210/220). As a result, the catheter is now in a tensioned (flexed) configuration, as shown by the large curved arrow. Not that in FIG. 34E (550) is slidable along a hex shaft (554-1 I added this number) attached to the drive disk (554) which is also attached to the catheter (106).

Pully-Lever and Rotary Actuated Mechanisms:

Another method of actuating the cable steering mechanism (e.g. alternative steering actuator and rotary actuator design) uses a pulley. The pulley could be replaced by lever, pivot and cam instead of direct drive with a motor (motor actuates cam). This is shown in FIG. 35A and FIG. 35B, which show a non-slidable method of actuation.

Figure 35A:
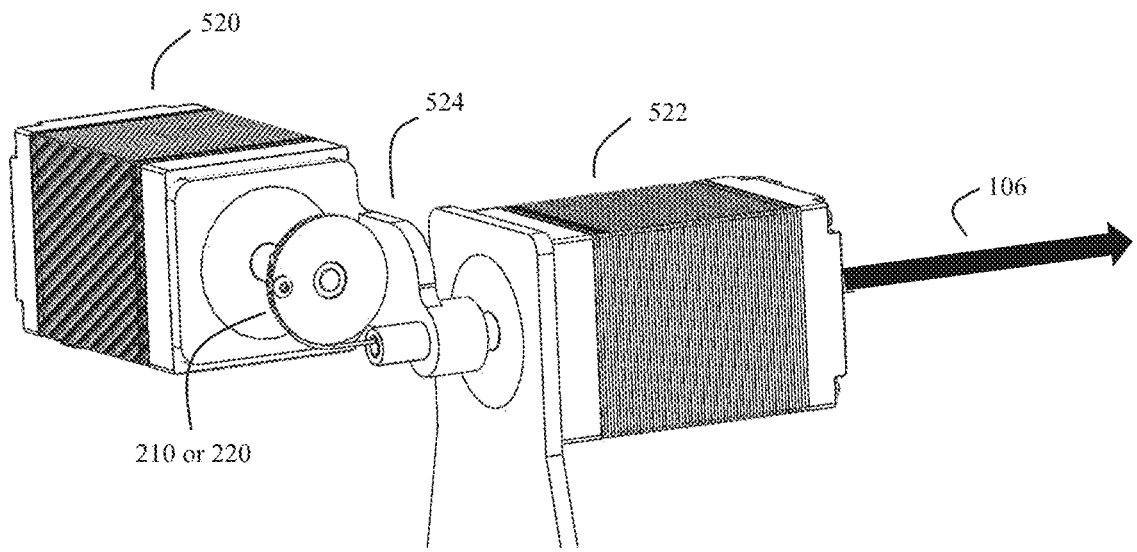
FIG. 35A shows an alternative embodiment using an actuator and pulley (or lever, pivot, cam system) for applying steering force and another actuator for rotation.
Figure 35B:
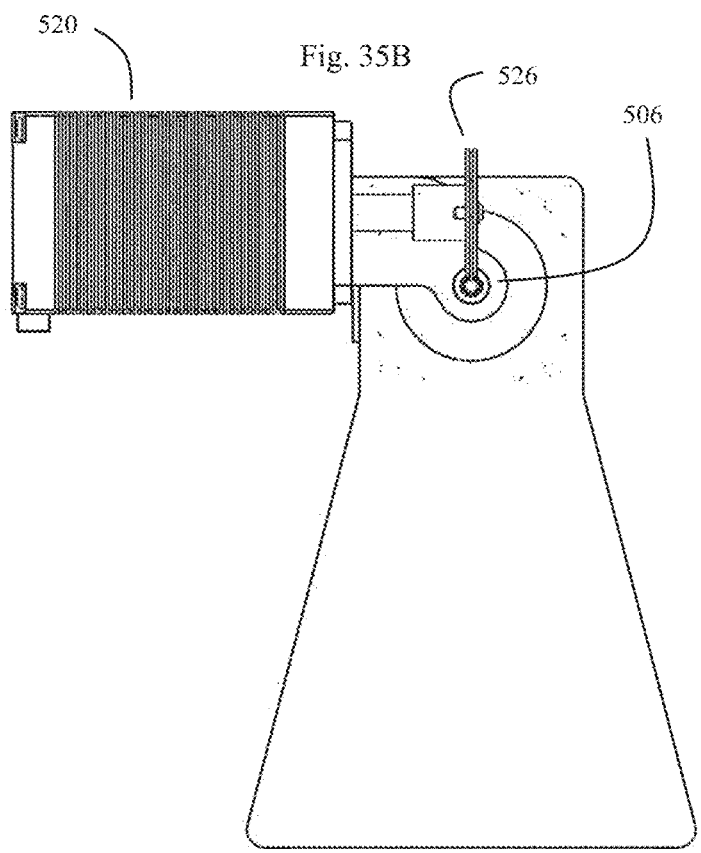
FIG. 35B shows another view of the alternative embodiment shown in FIG. 35A.

FIG. 35A shows an alternative non-sliding embodiment using a lever, pivot, and cam system.

In FIG. 35A, the steering cable (210 or 220) from a catheter (such as 106) is shown wound around a pulley (526) attached to the axis of a motor (520, here configured as steering actuator. Another motor (522 label missing, added) is configured to rotate the catheter (106) and is configured as a rotary actuator through bracket (524)

Here, to keep the steering cable (210) or (220) from tangling as the "rotary actuator" motor (522) rotates catheter (106), "steering actuator" (520) is attached to drive axle of motor (522) using a bracket (524). As a result, bracket (524) rotates the steering actuator (520) in a 1:1 ratio with any catheter (106) rotation caused by rotary actuator motor (522).

FIG. 35B shows another view of the alternative embodiment shown in FIG. 35A. Here the axis or center of catheter (106) can be seen as (506). Note that in some embodiments, the steering cable may be connected to the catheter by a pulley (526).

Multiple such units may be combined (ganged together) to control a dual-stage catheter, as previously discussed.

In some embodiments, instead of the pulley and direct motor drive, a large slidable ring concentric with the axis of rotation could be energized to actuate a lever connected directly to the pulley. In some embodiments, this lever could ride in a groove in the inner diameter of the ring. In some embodiments, one rotary actuator could rotate the catheter and steering cable at different times through switching a solenoid and simple mechanism where the one rotary actuator could have its power flow switched to rotate a pulley or lever. This represents a type of combined-mode actuator that can switch between a first "rotary" mode where it can be used for applying torque to the catheter and a second "steering" mode where it can be used to apply steering force on a steering cable.

Put alternatively, in some embodiments, at least one rotary actuator and at least one steering cable actuator (previously discussed) can represent different modes of operation of a combined-mode actuator.

Thus, to summarize, depending on the embodiment, the catheter steering device may comprise various types of actuators, including at least one rotary actuator comprising any of a contact/off-axis rotary actuator, a direct inline rotary actuator, a direct non-contact inline rotary actuator, a pully/lever rotary actuator, or a combination rotary actuator. Further the catheter steering device may comprise at least one steering cable actuator comprising any of a contact/off-axis steering cable actuator, a direct inline steering cable actuator, a direct non-contact inline steering cable actuator, a pully/lever steering cable actuator, or a combination steering cable actuator.

Coupling Types

In this disclosure, "coupling" generally refers to the systems and methods used to couple the steering cable actuator motion (essentially linear) to the rotary motion caused by the rotary actuator.

As previously discussed, various coupling methods are possible. These include the previously discussed direct mechanical contact (such as by using sliding pins) previously discussed. Other methods include electromagnetic coupling methods and flexible couplings, such as flexible polymeric couplings.

As previously discussed, direct mechanical contact methods can include the mechanical geared methods previously taught in FIG. 22A to FIG. 31C. These also include the piezoelectric methods taught in FIG. 33, and the electromagnetic direct drive methods previously taught in FIG. 34A to 3$D, and the pully or connector methods taught in FIG. 35A to FIG. 35B.

Figure 36A:
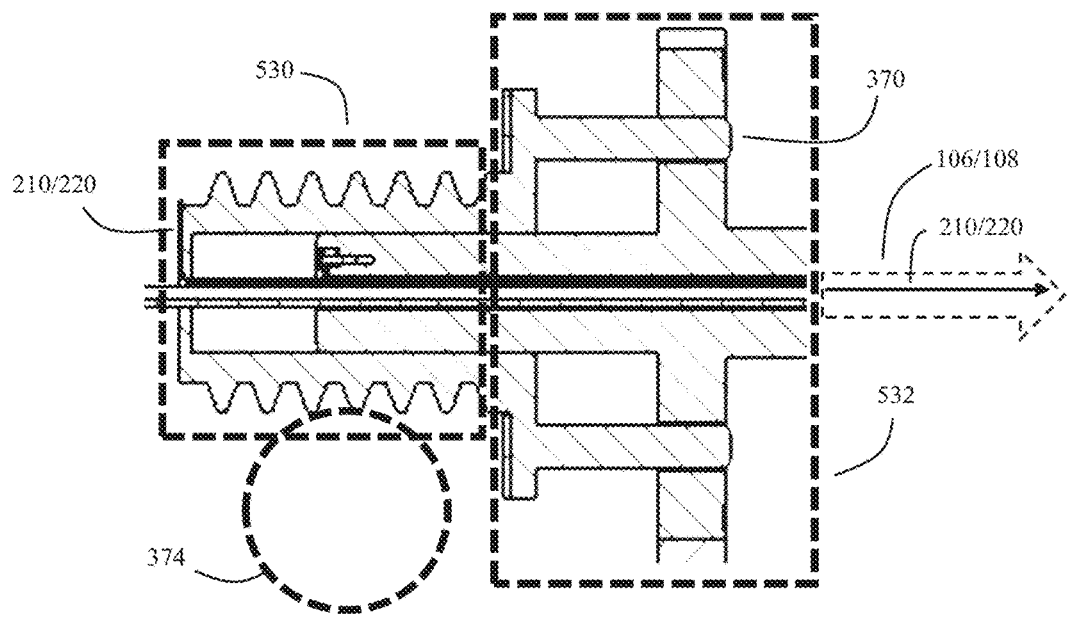
FIG. 36A shows certain aspects of the previously discussed mechanical geared coupling mechanism.
Figure 36B:
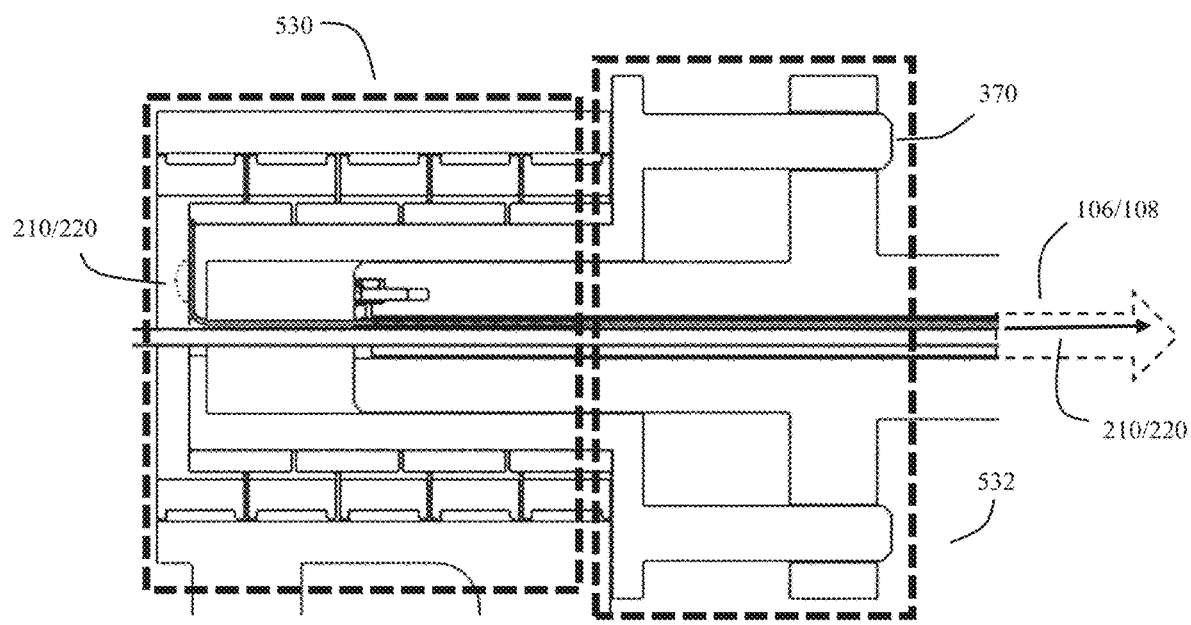
FIG. 36B shows certain aspects of the previously discussed electromagnetic coupling concepts.

FIG. 36A and FIG. 36B reiterate some of the previously discussed coupling concepts in more detail, and also serve to illustrate some general coupling concepts in more detail. FIG. 36A shows certain aspects of the mechanical geared coupling mechanism previously discussed, in FIG. 23 to FIG. 29; while FIG. 36B shows certain aspects of the electromagnetic coupling concepts previously discussed in FIG. 34A to FIG. 34D.

In both FIG. 36A and FIG. 36B show a left box (530) and a right box (532), both in dashed lines. The left box shows the linear steering element/mechanism (530) (also alternatively called the steering cable actuator) and how it can use various slide control mechanisms, such as the sliding drive pins (370), and other mechanisms such as splines, bellows, keys, hexagonal, octagonal shaft, etc., to allow the steering cable actuator to slide back and forth while coupled to the rotary drive portion (532) (also alternatively called the rotary actuator). In other words, in both FIG. 36A and FIG. 36B, the distance between the linear steering element/mechanism (530) and the rotary element mechanism (532) can increase and decrease to control the steering cables (210/220). At the same time, the rotary element mechanism (530) rotates at least a portion of the catheter (106/108).

This arrangement puts steering force on at least one catheter steering cable (such as 210, 220), while at the same time allowing the catheter steering cable to rotate along with any catheter rotation caused by the rotary actuator/rotary drive portion.

Note, for both FIG. 36A and FIG. 36B, the rotary drive portion (532) has the catheter tube (such as 106/108) locked into it by any number of methods. It should be noted that the various types of actuators can also be used together in the same system, such as both mechanical actuation and direct electro-magnetic actuation. Other mixed techniques, such as mechanical actuation with non-direct electro-magnetic actuation, pneumatic actuation, or fluid actuation systems and methods may also be used. Here, however, regardless of the actuation method, according to the invention, the rotary portion (532) and the linear portions (530) are configured so that the linear portion to rotate essentially synchronously with the rotary portion. Thus, the cable (210/210) and catheter (106/108), can rotate approximately 1:1 or directly with the catheter or about the axis of the catheter.

Note that here, 1:1 or "synchronously" should be interpreted, and is here defined, as being "substantially" 1:1 or "substantially" synchronously. As for any catheter system, there can be some long windup in the catheter. Thus, this synchronous coupling (cable clocked position proximally to distally anchored position) is in actuality "substantially synchronously" because it can be slightly off in angular alignment from designed position as the torque transmits from proximal to distal through frictional losses, as well as from the reaction force applied to the catheter by the interaction with tissue in the body. The intent is that the system is designed to rotate a predictable and known amount as indicated by the feedback sensors or known conditions (pre-op CT mapping), and the distal end of the catheter rotates a similar amount. When reaching very distant targets, and ideally targeting early growth (small) sites through torturous pathways, external feedback through imaging targeting will become more critical to accurately reaching those sites. Those skilled in the art will understand that this 1:1 or synchronous motion is not perfectly exact but will understand that the drive system is designed to attempt to deliver this 1:1 or synchronous motion to within a few percent tolerance (i.e., usually +/−5% or less), the proximal portion of the catheter near the drive system, and this tolerance may increase towards the distal portion of the catheter due to the above interactions. These aspects will be discussed in greater detail shortly.

Put alternatively; the various system elements are engineered/designed to rotate "substantially" 1:1, and thus, the system minimizes "wind-up". The wind-up is controlled through elements designed to handle torque and be flexible simultaneously. The length of the catheter and the amount of friction/stiction it encounters inside the body will determine the amount of windup. The longer and skinnier the catheter, the lower torsional stiffness it will have resulting in increased wind up. Similarly, when navigating more turns and complex motions with multi-stage catheters, the higher the friction/stiction will become, and the more critical it will be to have corrective methods to ensure accuracy in targeting the intended site. Making catheters more lubricious with coatings and designing the catheters for torque, wind up can be nearly negligible. Plus, due to the ability use the motor drive to apply torque, the drive algorithms can set up certain motions that help to ease the passage of the catheter and break through areas of stiction.

In some embodiments, the drive system could use coupling with direct 1:1 drive or additional elements such as gears or clutches for either under-driving or over-driving to compensate for the wind-up. Additionally, internal or external machine vision or other types of sensors can assist with the guiding, making up for some inaccuracies in angular positioning such as wind up, so the coupling need not be precisely at 1:1 but will generally be 1:1 within reasonable tolerance limits as understood by a skilled worker in the field.

Thus, in this disclosure, the term 1:1 is somewhat approximate within reasonable tolerance limits. In some embodiments, if a closer tolerance is desired, the drive system may be designed to actively or passively allow the cable to lead or lag the wind up from the catheter's proximal region to its distal region. For example, in some embodiments, the rotary drive mechanism may employ passive methods for slidable drive pins (370) that ride in slotted holes instead of round (intentional clearance), thus allowing the linear tension mechanism to lag the rotary drive within a controlled tolerance limit. In other embodiments, active methods are employed where the cables angular position at the proximal end is controlled and rotated by an additional rotary actuator independent of the catheter's rotary actuator. (new example with 3 rotary actuators added)

The extent of this tolerance limit could be determined empirically for certain lengths or types of catheters. Alternatively, the tolerance limit could be controlled through, for example, a clutch or an additional rotary drive design to actively compensate catheter-to-steering-cable windup (new example with 3 rotary actuators added). In other embodiments, the proximal cable position relative to the distal position may be configured lag or lead at the proximal end to compensate for any issue with windup.

Figure 37A:
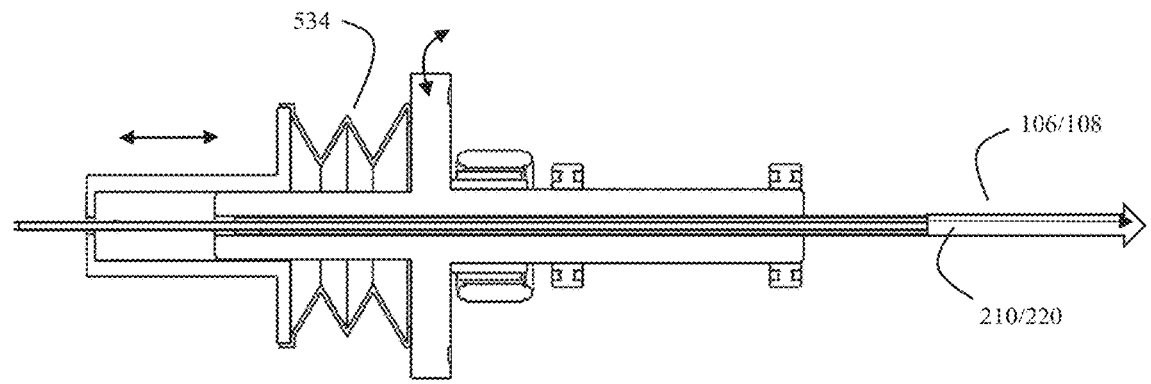
FIG. 37A shows that a flexible bellows arrangement can be used as an alternative to the previously discussed slidable drive pins.

FIG. 37A shows that a flexible bellows arrangement (534) can be used as an alternative to the previously discussed slidable drive pins (370). The bellows (534) can compress or extend, thus applying steering force to the steering cable (210/220). This device can also be used to tension the cable using pneumatic pressure or vacuum as an alternative to a gear motor, or to provide an assist force in addition to a gear drive mechanism or direct drive voice coil motor.

Many other types of flexible couplings also can be adopted such as flexure designs or using circumferential bellows convolutions.

Figure 37B:
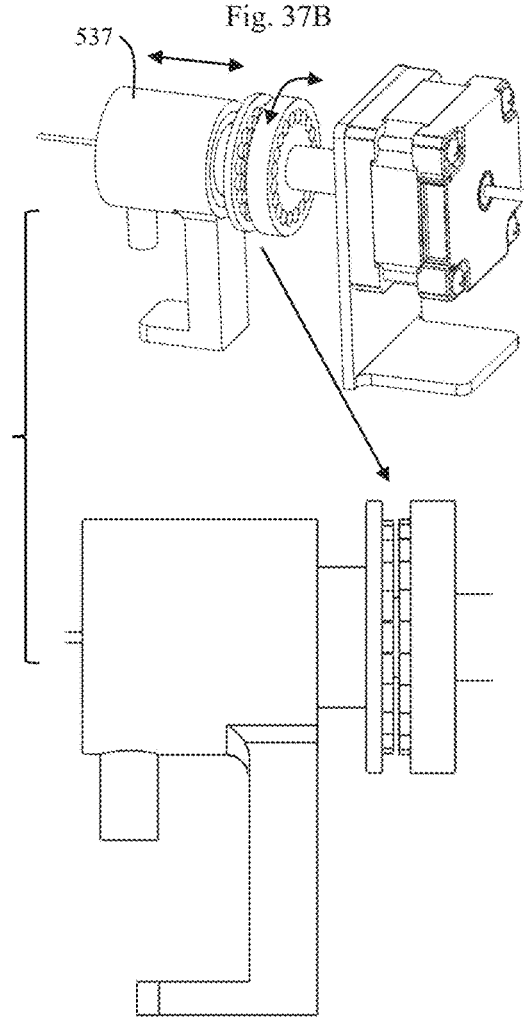
FIG. 37B shows a magnetic coupling arrangement, here configured for contactless coupling between the rotary actuator and the steering cable actuator in the forward state (no tension or pushing).
Figure 37C:
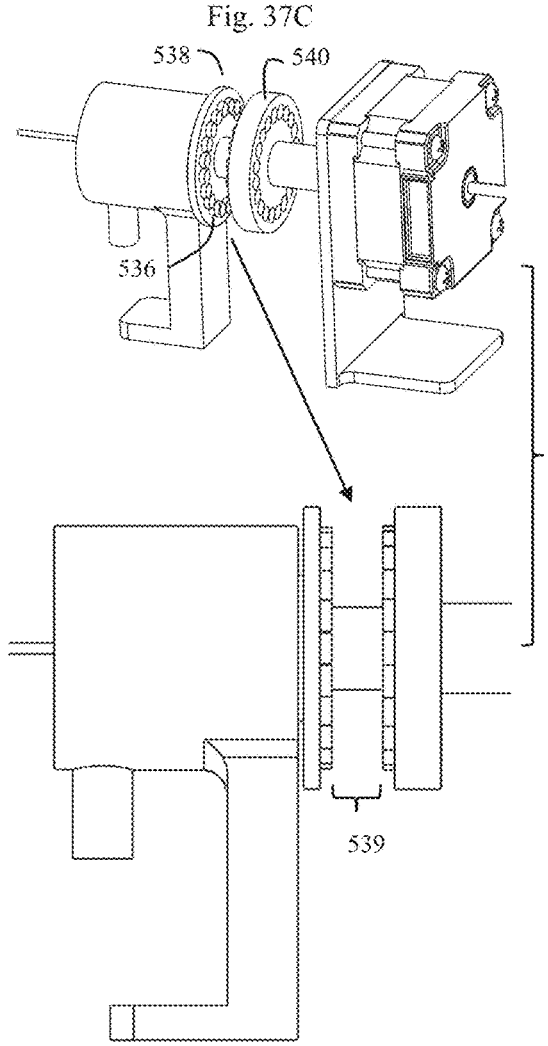
FIG. 37C shows a magnetic coupling arrangement, here configured for contactless coupling between the rotary actuator and the steering cable actuator in the rearward state (applying tension or not pushing).

In another embodiment, the steering cable actuator (linear drive) can be coupled to the rotary actuator (rotary drive) to a varying degree, ranging from a looser "rotating along" type coupling to a more stringent "synchronously" or "1:1" coupling" using a magnetic coupler, as shown in FIG. 37B and FIG. 37C. Thus in FIG. 37B, there is no gap between the two disks (tight coupling). By contrast, in FIG. 37C, there is an air gap (539) between the two disks (representing loose coupling or even no coupling).

This embodiment essentially creates a magnetic "clutch" arrangement. This uses an array of magnets (536) on a linear actuator (537) mounted on a disk (538). The magnets have poles opposite to the poles of another array of magnets mounted on a disk (540) rotated by a rotary actuator. In a preferred embodiment, at least some of the magnets are electromagnets under the control of a processor such as (410) so that the amount of coupling between the linear actuator and the rotary actuator can be varied under processor control.

Thus, the magnetic field strength can be varied (by the processor or by operator communication to the processor) if more strength is needed to keep the drive discs synchronously coupled. Conversely, the field strength can be lessened to allow leading or lagging to take place in order to compensate for windup over the length of the catheter. Rotational position feedback can also be provided by various types of sensors, including monitoring the proximal rotational position relative to the distal location via distal position with RF-coils, platinum fiducials tracked by a C-arm, distal camera position at the tip of the device, or a sensor tracking torque load proximally located inline with the catheter.

There is also the ability to "motor" the two coupler discs with an active control where electro-motive force drives one of the discs at a rate faster or slower than the other coupler disc using a motor coil switching arrangement similar to a stepper motor. Thus, the system can be configured to actively clutch/slip or advance the discs and monitor and adjust this process according to sensor feedback or operator commands.

Thus, under some processor-directed settings, the coupling can be "loose", allowing for greater slippage between the steering cable actuator and the rotary actuators, while under other processor-directed settings, the coupling can be "tight," allowing for an exact synchronous or 1:1 coupling. Again, put alternatively, when the coupling is loose, the rotary actuator is configured to rotate the at least one steering cable and the at least one steering cable actuator "along" with the region of the catheter being rotated by the rotary actuator. When the coupling is "strong" or "tight" the rotary actuator is configured to rotate the at least one steering cable and the at least one steering cable actuator synchronously with the region of the cable being rotated by the rotary actuator.

In some alternative embodiments, some or all of the magnets may be permanent magnets, and additional actuators (not shown) may be used to engage or disengage the clutch arrangement.

Thus, in some embodiments, the term "along," "synchronous," or "1:1" coupling may mean the rotary actuator and steering actuator should act to rotate at least one steering cable and its associated steering cable actuator to maintain angular alignment of the steering cable from the distal to proximal end.

The distal and proximal angular alignment of steering cables attachment points are synchronous or 1:1 with each other by design and in practice as the catheter and steering cables rotate along with the steering element. For certain catheters based on length and diameter, wind up of the catheter is negligible, e.g. the catheter is short and has a large diameter and uses materials in its design for transmitting torque. For an ultra-thin, long, and highly flexible catheter, some compensation for windup might be necessary. Angular position difference can be tracked and compensated for between proximal steering cable location and the distal tip steering cable position if needed due to catheter type and procedure. ***Broad tolerance described>>> If proximal catheter rotary position is way off from distal rotary position by substantially more than say 90 degrees or if we are ready to settle into a final position/location substantially less off by a few degrees to 90 degrees), we can break friction/stiction by any number of means:
  1. Oscillate the rotary stage that rotates the catheter.
  2. Flex and unflex steering cable(s) either in proximal or distal regions.
  3. Do 1& 2 simultaneously.
  4. For a Dual stage catheter, create a moving waveform throughout the catheter's length along with 1 and 2 if needed.
  5. Lead or lag (twist) can be built into the proximal drive relative to the mounting of the proximal catheter shaft into the drive and the fixed location of the steering cable at the far distal location relative to the catheter's proximal angular position.
  6. We can skew angular position of the proximal cable attachment points to either lead or lag by design by passive means (clutch), by active mechanical, and/or by electro-mechanical methods.

In some embodiments (using active electro-mechanical methods) with a separate rotary actuator, we can rotate the proximal steering cable attachment point to align (directly with lead or lag) with the distal steering cable attachment knowing where both are relative to each using proximal position encoder along with RF coils, ultrasound, MRI, CT imaging of palladium fiducials, or using a separate slidable tube fixed at the proximal end with optical encoder monitoring out at the distal tip. The proximal angular position of the steering cable attachment could be adjusted independently or dependently of the steering element actuator and the actuator for rotating the catheter. In another embodiment, from data and experience, known amounts of windup can be compensated for knowing the procedure and tortuous path. This could be determined empirically in design software or with physical models.

In those embodiments that use isolation coils to isolate steering cables, these methods can significantly reduce unintended distal steering due to catheter windup. Therefore, the systems and methods taught herein can also be helpful in guiding catheter design and catheter steering options.

Most generally, "along" will denote sufficient precision so that the twisting of the steering cables relative to the catheter's distal angular position will not significantly degrade the ability of the catheter steering cable to steer the catheter during the contemplated operation or medical procedure. "synchronous" and "1:1" also have this overall goal as well, but the overall system may use more refined methods from catheter design to control methods in order to achieve a certain degree of precision as defined by the procedure.

Thus, in general, the catheter steering device may be configured so that for any rotation caused by the rotary actuator, the rotary actuator is configured to rotate at least one steering cable and its associated steering cable actuator "along" with at least one region (e.g. the rotated catheter region) of the catheter by coupling (using any of direct mechanical contact, magnetic or electro-magnetic coupling), the device's rotary actuator with the device's steering cable actuator in either a slidable or non-slidable manner.

More specifically, the catheter steering device may be configured so that for any rotation of a catheter region caused by the device's rotary actuator, the device's rotary actuator may be configured to rotate at least one steering cable and its associated steering cable actuator synchronously with at least one rotating catheter region.

Catheter Types

As further discussed below, in some embodiments, the catheter steering device may attach to a single-stage catheter.

Single-Stage Catheter Applications:

In some embodiments, FIG. 22B (342) can be viewed as showing a drive gear mechanism for steering and rotating a single-stage catheter. In this embodiment, (352d) is either a single-stage catheter itself or connects directly to a single-stage catheter.

This catheter can be constructed from either a simple tube of continuous fabrication or from multiple sections of tubing with specific purposes, such as torque and biased flexibility in a preferred direction or axial location along the catheter. What makes this a "single-stage" catheter is that even if it comprises multiple sections joined together, the sections all rotate as a unit in response to torque imposed by the rotary shaft actuator (350r1).

Multiple-Stage Catheter Applications, Such as Dual-Stage Catheters:

As further discussed below, in some embodiments, the catheter steering device may be configured to attach to a dual-stage catheter comprising a proximal first stage connected to a distal second stage. Here, either the proximal first stage or the distal second stage can comprise at least one steering cable, and often both stages may comprise steering cables.

In this embodiment, the catheter steering device's at least one rotary actuator can comprise any of a proximal first stage rotary actuator and/or a distal second stage rotary actuator. Further, the catheter steering device's at least one steering cable actuator can comprise any of a proximal first stage steering cable actuator and/or a distal second stage steering cable actuator. In this configuration, the connection between the proximal first stage and the distal second stage will usually be either a transition housing or a rotary coupler.

In some embodiments, FIG. 22C can be viewed as showing the gear drive mechanism for steering and rotating a dual-stage catheter.

As previously discussed, FIG. 30A shows the gear drive mechanism attached to a dual-stage catheter where two or more catheters are joined through a transition housing and a rotary coupler. In the dual-stage catheter, there is a proximal and distal catheter. Both catheters can rotate and flex independently of one another. The distal stage traverses along a path at the same rate or approximate rate as the proximal stage of the catheter due to the transition housing joining them together through a coupler.

There could also be two or more independent (no transition housing and coupler) catheters where the smaller diameter catheter rotates and telescopes through the larger diameter/proximal catheter. Note that although in FIG. 30A, the mechanism drives concentrically (i.e., as circles or rings arranged around a common center), this does not need to be limiting. In other embodiments, the drive mechanism does not necessarily need to be guided or actuated concentrically.

FIG. 38A shows some of the basic types of catheters in cross-section that may be used with the invention's catheter steering device. These range from simple single-stage type to two/dual-stage type catheters. All of these have at least one steering or tensioning cable attached at the far distal end, on the inside or outside of the tube.

The simplest version is a Single Stage Simple Tube (Single Stage Catheter) where it is made from a continuous extrusion of simple polymer tubing. There can be braiding or not in the simple version. This could also be a continuous laser cut section of flexure joints made from stainless steel, nitinol, or titanium or any combination of sections and materials.

The Single Stage Dual Component Without Intermediary is a flexible torque section attached to a directional highly flexible section. This type of catheter could be made from two or more different sections, but what is important is the sections are uniquely engineered for torque and directional flexibility at the distal section. Further proximal the catheter can be made of multiple sections.

The Single Stage Dual Component with Intermediary has a highly flexible section attached to an intermediary section which is then attached to a section engineered for torque. Further proximal the catheter can be made of multiple sections. Note: the proximal section of any single stage catheter can also be highly flexible and have a steering cable plus a steering element to steer/flex it separately from distal section.

The Two Stage with Rotary Coupler (Dual Stage Catheter) has at least two steerable sections that are coupled together by a rotary coupler and a transition housing. The rotary couple (107bb) maintains the approximate fixed position of the distal stage relative to proximal stage axially (there can be some controlled axial movement of the distal to proximal for clearance or for other axial movement applied to a procedure where needed). There is a torque shaft for rotating the distal section. The proximal outer section can also be rotated by applying torque and flexed with a steering cable under tension. This is shown in more detail in FIG. 38B.

In some embodiments, the catheter steering device may be configured to interact with a catheter where the catheter's proximal first stage (106) is hollow, and wherein this proximal first stage further comprises a torque shaft (200) configured to pass through the proximal first stage from a proximal end of the proximal first stage to the end of the proximal first stage and to at least a proximal end of a second distal stage (108). Here, the catheter steering device's at least one rotary actuator can be configured to convey torque to the torque shaft (200), so that torque from this least one rotary actuator is conveyed to the distal second stage (108).

FIG. 38B shows additional details of the two stages in cross-section with rotary coupler embodiment and is generally as previously discussed in FIG. 4A to FIG. 14.

In each of these, depending on the construction, a polymer jacket can be used to cover the overlapping section or abrupt intersection to create a smooth transition. Other types of catheters may also be used. Note that depending on the configuration, the portion of the catheter used for rotation may receive both torque and steering force(s).

Cable/Wire Locations for Single Stage Catheters

Steering Cable/Wire Location: The steering cable or wire can be in the interior of the catheter, either concentrically or eccentrically to axis of the catheter/rotation or can be captured on the exterior of the catheter body (also eccentric to axis of catheter/rotation) using a cable/wire channel (sheath or isolation coil) underneath a jacket that covers the entire catheter body. The cable or wire attachment for example can be welded, brazed, glued, staked, looped, or hooked, etc. to the distal location of the catheter.

FIG. 39 shows some of the various ways in cross-section that the tensioning/steering cable/wire can be attached to at the far distal location of the catheter. Here, a single stage catheter can be considered to be a distal portion of a catheter (108), and to have a distal stage steering cable (220), but the optional tool plate (109) has been given the same nomenclature (109) as the earlier distal tool plate.

Cable/Wire Locations for Dual Stage Catheters

FIG. 40 shows some of the various ways in cross-section that the proximal stage steering wire/cable (210) can be attached to a dual-stage catheter. These ways include at the interior of the transition housing, the interior at the tube, the exterior housing, and the exterior tube. The cable or wire attachment (542) for example can be welded, brazed, glued, staked, looped, or hooked, etc. to the distal location near or on the transition housing.

In some embodiments, the steering cable (or steering wires) can be used in either tension or compression mode. For example, in some embodiments, one cable may be used for tension, along with a different wire to push (apply compression). In the wire location examples shown in FIG. 40, only one steering cable (or wire) is shown, but this is not intended to be limiting.

In some embodiments, there may be one active cable or wire for steering or flexing the catheter and a different "inactive" or "elastic/return" element that causes the catheter to return to a straight, semi-straight or pre-curved relaxed state in the absence of active cable force. This "elastic/return" element could be an elastomer, nitinol wire, a pre-stressed pattern in a laser cut section, or a thicker section of a jacket that covers the catheter where often the thicker section may be located opposite to (e.g., 180 degrees) from the active steering cable or wire.

Single Stage Catheters with and without Isolation Coils

Figure 41A:
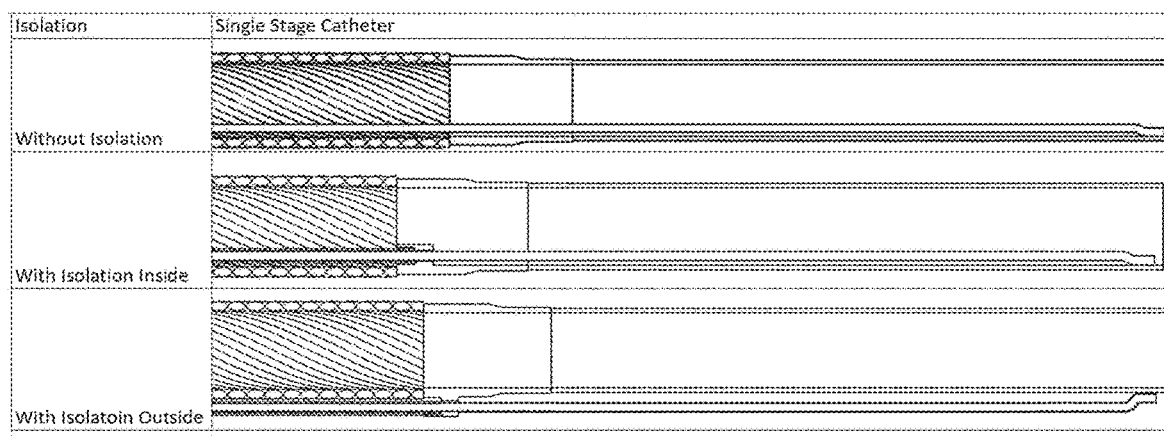
FIG. 41A shows a steering wire/cable for a single-stage catheter with and without the optional isolation coils.

FIG. 41A shows the steering wire/cable in cross-section without and with isolation for a single-stage catheter.

Dual Stage Catheters without/with Isolation

Figure 41B:
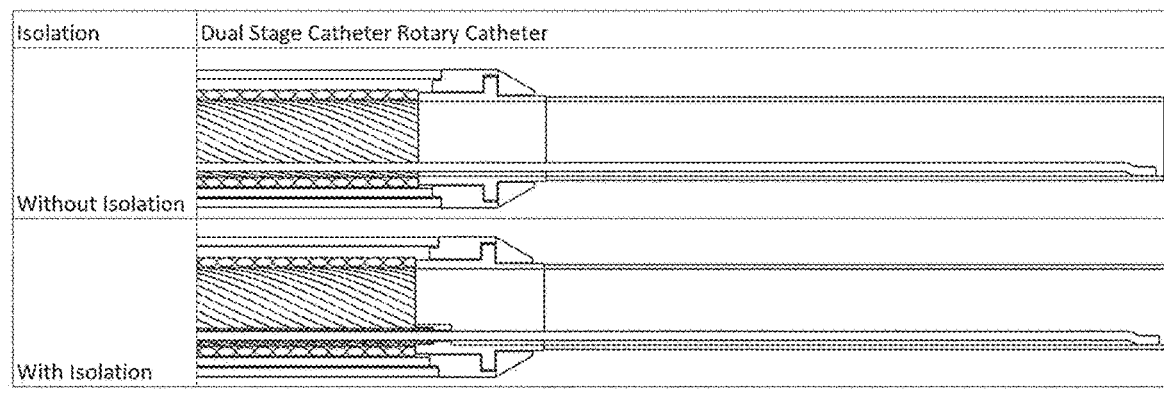
FIG. 41B shows the tensioning/steering wire/cable for a dual-stage rotary catheter with and without the optional isolation coils.

FIG. 41B shows the tensioning/steering wire/cable in cross-section without and with isolation for a dual-stage rotary catheter.

Steering Cables/Wires

Figure 41C:
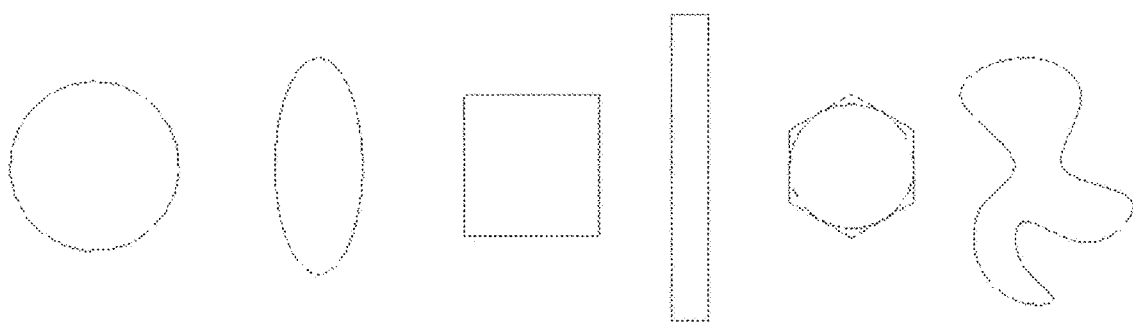
FIG. 41C shows that the steering cables or wires can be configured in many different shapes.

Steering cables or wires, also known as tensioning cables or wires can be made from stranded wires or from a single wire. As shown in FIG. 41C, the cables or wires can come in many different shapes as shown below. The tensioning cables/wires (braided or single filament) can be made from steel (such as stainless steel), nitinol, polymers or aramid/carbon or other natural or synthetic fibers. The shapes can range from round, oval, square, rectangular (flat), hexagonal, octagonal, or any shape imaginable that allows for efficient cost, load rating, directionally biased stiffness, or smallest cross-sectional area.

Tips Shapes, Hollow Through, and Non-Through

The distal tip of the catheter can be open or closed. The edge of the open version can be square, rounded, or created by an additional ring, which can be radio-opaque made from Platinum or other Noble metal. There can be a tool plate with openings for various tools, cameras, or therapy delivery. The tip can be round, pointed, closed, or with a small port for various tools, cameras, or therapy delivery.

FIG. 42 shows an example of various types of catheter distal tips in cross-section. Note that in at least some embodiments, the distal region of the catheter is any of solid or hollow.

Tracking the System of Catheters

For the Rotary-Linear Robotic Cather System with Independently Rotatable, Flexing, and Slidable Catheters, it will often be useful to provide a method of tracking catheter location in real-time while the catheter is in the patient.

In some embodiments, each catheter stage may include a radio-opaque component, such as a platinum ring. When used with an imaging system, such as Real-time CT, these radio-opaque elements enable the position of each catheter tip to be tracked. Thus, the far distal axis of the catheter is defined by two points at any time. This allows the position of the far distal ring of the catheter section and the next proximal ring to be determined.

The invention claimed is:

1. A catheter steering device configured to steer a sterile catheter through internal body passages, said catheter steering device comprising:
    at least one motorized rotary actuator;
    at least one motorized steering cable actuator;
    said at least one rotary actuator and at least one steering cable actuator connected by at least one slidable coupling;
    an axis of rotation;
    said catheter steering device configured to reversibly attach to a sterile catheter comprising at least a proximal region, a distal region, and at least one steering cable;
    wherein at least one said steering cable actuator is configured to reversibly attach to said at least one steering cable and provide force to said at least one steering cable through at least one steering element;
    said at least one steering element configured to connect to said rotary actuator through a slidable coupling about said axis of rotation;
    wherein said device is configured so that for said catheter, at least one said rotary actuator, at least one said steering cable, and at least one said steering cable actuator:
    said rotary actuator is configured to couple to said proximal region of said catheter;
    said rotary actuator is configured to transmit torque, independently of said force provided by said steering cable actuator, about said axis, to rotate said at least one slidable coupling and at least one region of said catheter, thus producing at least one rotated catheter region;
    said steering cable actuator is configured to apply said force to said at least one steering element to transmit force to said steering cable, independently of said rotary actuator's said torque, to induce at least a portion of said catheter to flex and unflex; and
    wherein, for any rotation caused by said rotary actuator about said axis, said rotary actuator is configured to rotate, through said slidable coupling, at least a portion of said at least one steering cable actuator and at least one said steering cable along with at least one said rotated catheter region.

2. The device of claim 1, wherein said catheter is a single-stage catheter.

3. The device of claim 1, wherein said catheter is at least a dual-stage catheter comprising a proximal first stage connected to a distal second stage;
    any of said proximal first stage and said distal second stage comprises at least one said steering cable;

said at least one rotary actuator comprises any of a proximal first stage rotary actuator and a distal second stage rotary actuator;

said at least one steering cable actuator comprises any of a proximal first stage steering cable actuator and a distal second stage steering cable actuator; and said connection comprises any of a transition housing and a rotary coupler.

4. The device of claim 3, wherein said proximal first stage is hollow, and wherein said proximal first stage further comprises a torque shaft configured to pass through said proximal first stage from a proximal end of said proximal first stage to a distal end of said proximal first stage and to at least a proximal end of said second distal stage;

at least one said rotary actuator configured to convey torque to said torque shaft, so that torque from at least one said rotary actuator is conveyed to said distal second stage.

5. The device of claim 3, wherein said at least one rotary actuator comprises a proximal stage rotary actuator and a distal stage rotary actuator;

said at least one steering cable comprises at least one proximal stage steering cable and at least one distal stage steering cable said at least one steering cable actuator comprises at least one proximal stage steering cable actuator and at least one distal stage steering cable actuator.

6. The device of claim 5, wherein at least one said proximal stage rotary actuator, at least one said distal stage rotary actuator, at least one said proximal stage steering cable actuator, and at least one said distal stage steering cable actuator are controlled by a processor configured to manipulate said actuators to operate in a processor coordinated mode to propel said catheter with any of twisting, spiraling, or wave motions.

7. The device of claim 1, wherein said catheter is an outer catheter configured to be hollow from its proximal region to its distal region;

further comprising a telescoping inner catheter configured to be slidable within said outer catheter from said outer catheter's said proximal region to said outer catheter's said distal region;

wherein said device is further configured so that at least some of said inner catheter can protrude thorough said outer catheter's said distal region and past an end of said outer catheter's said distal region.

8. The device of claim 1, further comprising an outer catheter configured to be hollow from its proximal region to its distal region;

wherein said catheter further comprises a telescoping inner catheter configured to be slidable within said outer catheter from said outer catheter's said proximal region to said outer catheter's said distal region;

wherein said device is further configured so that at least some of said inner catheter can protrude thorough said outer catheter's said distal region and past an end of said outer catheter's said distal region;

wherein said catheter steering device is configured to steer said inner catheter by using said at least one rotary actuator, said at least one steering cable, and said at least one steering cable actuator to traverse said internal body passages.

9. The device of claim 1, wherein said at least one rotary actuator comprises any of a contact/off-axis rotary actuator, a direct contact inline rotary actuator, a direct non-contact inline rotary actuator, a pulley/lever rotary actuator; or wherein said at least one steering cable actuator comprises any of a contact/off-axis steering cable actuator, a direct contact inline steering actuator, a direct non-contact inline steering cable actuator, a pulley/lever steering cable actuator.

10. The device of claim 1, wherein, for any rotation caused by said rotary actuator, said rotary actuator is configured to rotate at least one said steering cable and at least one said steering cable actuator along with at least one said region of said catheter by coupling, by either direct mechanical contact, electronic coupling, or by magnetic coupling, said rotary actuator with said steering cable actuator in a slidable manner.

11. The device of claim 1, wherein, for any rotation caused by a said rotary actuator, said rotary actuator is configured to rotate at least one said steering cable and at least one said steering cable actuator synchronously with at least one said region of said catheter.

12. The device of claim 1, wherein said motorized steering cable actuator is configured to only transmit force to a flexible distal section of said catheter.

13. The device of claim 1, wherein said steering cable actuator comprises a first rotatable portion configured to rotate with said rotary actuator and catheter, and a second non-rotatable portion that does not rotate with said rotary actuator and catheter.

14. A catheter steering device configured to steer a sterile catheter through internal body passages, said catheter steering device comprising:

a plurality of motorized rotary actuators;

a plurality of motorized steering cable actuators;

at least one of said rotary actuators and said steering cable actuators connected by at least one slidable coupling;

an axis of rotation;

said catheter steering device configured to reversibly attach to a sterile catheter comprising at least a proximal region, and a distal region, said catheter comprising a plurality of steering cables;

wherein said distal region of said catheter is any of solid or hollow;

wherein at least one said steering cable actuators is configured to reversibly attach to said at least one steering cable and provide force to said at least one steering cable through said at least one steering element;

said at least one steering element configured to connect to said rotary actuator through a slidable coupling about said axis of rotation;

wherein, said device is configured so that for said catheter, at least one said rotary actuator, at least one said steering cable, and at least one said steering cable actuator:

said rotary actuator is configured to couple to said proximal region of said catheter;

said rotary actuator is configured to transmit torque, independently of said force provided by said steering cable actuator, about said axis, to rotate said at least one slidable coupling and at least one region of said catheter, thus producing at least one rotated catheter region;

said steering cable actuator is configured to apply said force to said at least one steering element to transmit force to said steering cable, independently of said rotary actuator's said torque, to induce at least a portion of said catheter to flex and unflex; and wherein, for any rotation caused by said rotary actuator about said axis, said rotary actuator is configured to rotate through said slidable coupling, at least a portion of at least one said steering cable actuator and at least one said steering cable synchronously with at least one said rotated catheter region.

15. The device of claim 14, wherein said catheter is a single-stage catheter.

16. The device of claim 14, wherein said catheter is at least a dual-stage catheter comprising a proximal first stage connected to a distal second stage;
- any of said proximal first stage and said distal second stage comprises at least one said steering cable;
- at least one said rotary actuator comprises any of a proximal first stage rotary actuator and a distal second stage rotary actuator;
- at least one said steering cable actuator comprises any of a proximal first stage steering cable actuator and a distal second stage steering cable actuator; and
- said connection comprises any of a transition housing and a rotary coupler.

17. The device of claim 16, wherein said proximal first stage is hollow, and wherein said proximal first stage further comprises a torque shaft configured to pass through said proximal first stage from a proximal end of said proximal first stage to a distal end of said proximal first stage and to at least a proximal end of said second distal stage;
- at least one said rotary actuator configured to convey torque to said torque shaft,
- so that torque from at least one said rotary actuator is conveyed to said distal second stage.

18. The device of claim 14, wherein said catheter is an outer catheter configured to be hollow from its proximal region to its distal region;
- further comprising a telescoping inner catheter configured to be slidable within said outer catheter from said outer catheter's said proximal region to said outer catheter's said distal region;
- wherein said device is further configured so that at least some of said inner catheter can protrude thorough said outer catheter's said distal region and past an end of said outer catheter's said distal region.

19. The device of claim 14, further comprising an outer catheter configured to be hollow from its proximal region to its distal region;
- wherein said catheter further comprises a telescoping inner catheter configured to be slidable within said outer catheter from said outer catheter's said proximal region to said outer catheter's said distal region;
- wherein said device is further configured so that at least some of said telescoping inner catheter can protrude thorough said outer catheter's said distal region and past an end of said outer catheter's said distal region; and
- wherein said catheter steering device is configured to steer said telescoping inner catheter by using at least one said rotary actuator, at least one said steering cable, and at least one said steering cable actuator to traverse said internal body passages.

20. The device of claim 14, wherein at least one said rotary actuator comprises any of a contact/off-axis rotary actuator, a direct contact inline rotary actuator, a direct non-contact inline rotary actuator, and a pulley/lever rotary actuator, or
- wherein at least one said steering cable actuator comprises any of a contact/off-axis steering cable actuator, a direct contact inline steering actuator, a direct non-contact inline steering cable actuator, or a pulley/lever steering cable actuator.

21. The device of claim 14, wherein, for any rotation caused by said rotary actuator, said rotary actuator is configured to rotate at least one said steering cable and at least one said steering cable actuator along with at least one said region of said catheter by coupling, by either direct mechanical contact, electronic coupling, or by magnetic coupling, said rotary actuator with said steering cable actuator in a slidable manner.

22. The device of claim 14, wherein said steering cable actuator comprises a first rotatable portion configured to rotate with said rotary actuator and catheter, and a second non-rotatable portion that does not rotate with said rotary actuator and catheter.

* * * * *